United States Patent
Ahern et al.

(10) Patent No.: US 12,511,551 B2
(45) Date of Patent: Dec. 30, 2025

(54) COMPUTER-IMPLEMENTED SYSTEM AND METHOD FOR PREDICTING ACTIVITY OUTCOME

(71) Applicant: Palo Alto Research Center Incorporated, Palo Alto, CA (US)

(72) Inventors: Shane Ahern, Foster City, CA (US); Michael Roberts, Los Gatos, CA (US); Simon Tucker, Oakland, CA (US)

(73) Assignee: Xerox Corporation, Webster, NY (US)

( * ) Notice: Subject to any disclaimer, the term of this patent is extended or adjusted under 35 U.S.C. 154(b) by 199 days.

(21) Appl. No.: 17/403,716

(22) Filed: Aug. 16, 2021

(65) Prior Publication Data
US 2021/0374556 A1    Dec. 2, 2021

Related U.S. Application Data

(63) Continuation of application No. 15/203,740, filed on Jul. 6, 2016, now Pat. No. 11,093,834.

(51) Int. Cl.
*G06Q 30/016* (2023.01)
*G06N 5/02* (2023.01)
(Continued)

(52) U.S. Cl.
CPC .............. *G06N 5/02* (2013.01); *G06N 5/04* (2013.01); *G06Q 10/06316* (2013.01);
(Continued)

(58) Field of Classification Search
CPC ...... G06N 5/02; G06N 5/04; G06Q 10/06316; G06Q 10/0633; G06Q 30/016; H04W 4/38; H04W 4/80; H04W 67/02; H04W 4/023
See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| AU | 2017202840 | 5/2017 |
| CA | 2335801 | 5/2002 |

(Continued)

OTHER PUBLICATIONS

Asatiani et al. "Turning Robotic Process Automation Into Commercial Success—Case Opuscapita" (2016) (https://www.researchgate.net/publication/303460189_Turning_robotic_process_automation_into_commercial_success_-_Case_OpusCapita/link/5dd3f53a458515cd48a99b4d/download) (Year: 2016).*

(Continued)

*Primary Examiner* — Sujay Koneru
(74) *Attorney, Agent, or Firm* — Cesari and McKenna, LLP; Steven M. Mills

(57) ABSTRACT

A computer-implemented system and method for predicting activity outcome is provided. A set of outcome models is maintained. Contextual data of a user is collected via one or more computing devices associated with the user. An activity being performed by the user is determined based on the contextual data. The activity is compared to a set of outcome models. A predication is made that the activity will not be successfully completed by the user without assistance based on the comparison. The user is provided with one or more tasks for completion of the activity.

20 Claims, 4 Drawing Sheets

(51) Int. Cl.
*G06N 5/04* (2023.01)
*G06Q 10/0631* (2023.01)
*G06Q 10/0633* (2023.01)
*H04L 67/02* (2022.01)
*H04L 67/50* (2022.01)
*H04W 4/02* (2018.01)
*H04W 4/38* (2018.01)
*H04W 4/80* (2018.01)
*H04W 40/02* (2009.01)

(52) U.S. Cl.
CPC ....... *G06Q 10/0633* (2013.01); *G06Q 30/016* (2013.01); *H04L 67/02* (2013.01); *H04L 67/535* (2022.05); *H04W 4/023* (2013.01); *H04W 4/38* (2018.02); *H04W 4/80* (2018.02)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,361,340 A | 11/1994 | Kelly et al. |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 5,895,470 A | 4/1999 | Pirolli et al. |
| 5,966,534 A | 10/1999 | Cooke et al. |
| 6,021,403 A * | 2/2000 | Horvitz ................ G06N 5/00 706/45 |
| 6,037,976 A | 3/2000 | Wixson |
| 6,052,683 A | 4/2000 | Irwin |
| 6,085,320 A | 7/2000 | Kaliski, Jr. |
| 6,091,724 A | 7/2000 | Chandra |
| 6,131,110 A | 10/2000 | Bates et al. |
| 6,134,532 A | 10/2000 | Lazarus et al. |
| 6,173,364 B1 | 1/2001 | Zenchelsky |
| 6,175,831 B1 | 1/2001 | Weinreich et al. |
| 6,226,618 B1 | 5/2001 | Downs |
| 6,233,617 B1 | 5/2001 | Rothwein |
| 6,233,646 B1 | 5/2001 | Hahm |
| 6,249,807 B1 | 6/2001 | Shaw et al. |
| 6,320,495 B1 | 11/2001 | Sporgis |
| 6,332,158 B1 | 12/2001 | Risley |
| 6,338,066 B1 | 1/2002 | Martin et al. |
| 6,345,253 B1 | 2/2002 | Viswanathan |
| 6,366,988 B1 | 4/2002 | Skiba |
| 6,385,619 B1 | 5/2002 | Eichstaedt |
| 6,393,479 B1 | 5/2002 | Glommen et al. |
| 6,408,288 B1 | 6/2002 | Ariyoshi |
| 6,438,579 B1 | 8/2002 | Hosken |
| 6,456,234 B1 | 9/2002 | Johnson |
| 6,487,539 B1 | 11/2002 | Aggarwal et al. |
| 6,523,063 B1 | 2/2003 | Miller et al. |
| 6,526,351 B2 | 2/2003 | Whitham |
| 6,546,393 B1 | 4/2003 | Khan |
| 6,574,377 B1 | 6/2003 | Cahill |
| 6,587,835 B1 | 7/2003 | Treyz et al. |
| 6,654,735 B1 | 11/2003 | Eichstaedt |
| 6,654,792 B1 | 11/2003 | Verma |
| 6,667,957 B1 | 12/2003 | Corson |
| 6,680,675 B1 | 1/2004 | Suzuki |
| 6,681,220 B1 | 1/2004 | Kaplan |
| 6,681,326 B2 | 1/2004 | Son |
| 6,691,106 B1 | 2/2004 | Sathyanarayan |
| 6,714,778 B2 | 3/2004 | Nykänen et al. |
| 6,732,273 B1 | 5/2004 | Byers |
| 6,756,882 B2 | 6/2004 | Benes et al. |
| 6,769,066 B1 | 7/2004 | Botros |
| 6,772,333 B1 | 8/2004 | Brendel |
| 6,816,884 B1 | 11/2004 | Summers et al. |
| 6,853,982 B2 | 2/2005 | Smith et al. |
| 6,862,280 B1 | 3/2005 | Bertagna |
| 6,901,452 B1 | 5/2005 | Bertagna |
| 6,917,985 B2 | 7/2005 | Madruga |
| 6,968,179 B1 | 11/2005 | De Vries |
| 6,968,393 B1 | 11/2005 | Chen |
| 6,981,029 B1 | 12/2005 | Menditto |
| 6,981,040 B1 | 12/2005 | Konig et al. |
| 7,013,308 B1 | 3/2006 | Tunstall-Pedoe |
| 7,013,389 B1 | 3/2006 | Srivastava |
| 7,031,308 B2 | 4/2006 | Garcia-Luna-Aceves |
| 7,043,475 B2 | 5/2006 | Heer et al. |
| 7,061,877 B1 | 6/2006 | Gummalla |
| 7,130,622 B2 | 10/2006 | Vanska et al. |
| 7,152,094 B1 | 12/2006 | Jannu |
| 7,171,046 B2 | 1/2007 | Myers et al. |
| 7,177,646 B2 | 2/2007 | ONeill |
| 7,191,159 B2 | 3/2007 | Horvitz et al. |
| 7,194,454 B2 | 3/2007 | Hansen et al. |
| 7,200,637 B2 | 4/2007 | Klos et al. |
| 7,203,909 B1 | 4/2007 | Horvitz et al. |
| 7,206,860 B2 | 4/2007 | Murakami |
| 7,206,861 B1 | 4/2007 | Callon |
| 7,210,326 B2 | 5/2007 | Kawamoto |
| 7,213,260 B2 | 5/2007 | Judge |
| 7,231,607 B2 | 6/2007 | Neely et al. |
| 7,243,130 B2 | 7/2007 | Horvitz et al. |
| 7,246,159 B2 | 7/2007 | Aggarwal |
| 7,257,837 B2 | 8/2007 | Xu |
| 7,260,573 B1 | 8/2007 | Jeh et al. |
| 7,269,650 B2 | 9/2007 | Hamdan |
| 7,287,275 B2 | 10/2007 | Moskowitz |
| 7,305,436 B2 | 12/2007 | Willis |
| 7,315,541 B1 | 1/2008 | Housel |
| 7,315,883 B2 | 1/2008 | Fair et al. |
| 7,339,929 B2 | 3/2008 | Zelig |
| 7,346,668 B2 | 3/2008 | Willis |
| 7,346,703 B2 | 3/2008 | Cope |
| 7,349,827 B1 | 3/2008 | Heller et al. |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,401,087 B2 | 7/2008 | Copperman et al. |
| 7,430,755 B1 | 9/2008 | Hughes |
| 7,444,251 B2 | 10/2008 | Nikovski |
| 7,466,223 B2 | 12/2008 | Sefton |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,526,458 B2 | 4/2009 | Flinn et al. |
| 7,542,471 B2 | 6/2009 | Samuels |
| 7,543,031 B2 | 6/2009 | Heidloff et al. |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,565,425 B2 | 7/2009 | Van Vleet et al. |
| 7,567,547 B2 | 7/2009 | Mosko |
| 7,567,946 B2 | 7/2009 | Andreoli |
| 7,577,522 B2 | 8/2009 | Rosenberg |
| 7,580,971 B1 | 8/2009 | Gollapudi |
| 7,603,112 B2 | 10/2009 | Huomo et al. |
| 7,623,535 B2 | 11/2009 | Guichard |
| 7,639,840 B2 | 12/2009 | Hanna et al. |
| 7,647,507 B1 | 1/2010 | Feng |
| 7,652,594 B2 | 1/2010 | Lamont et al. |
| 7,660,324 B2 | 2/2010 | Oguchi |
| 7,668,885 B2 | 2/2010 | Wittke et al. |
| 7,685,290 B2 | 3/2010 | Satapati |
| 7,698,463 B2 | 4/2010 | Ogier |
| 7,698,559 B1 | 4/2010 | Chaudhury |
| 7,707,226 B1 | 4/2010 | Tonse |
| 7,716,651 B2 | 5/2010 | Cukierman et al. |
| 7,739,338 B2 | 6/2010 | Taylor |
| 7,739,602 B2 | 6/2010 | Feng et al. |

(56) References Cited

U.S. PATENT DOCUMENTS

| | | | |
|---|---|---|---|
| 7,743,050 B1 | 6/2010 | Bern et al. |
| 7,765,470 B2 | 7/2010 | Epstein |
| 7,769,887 B1 | 8/2010 | Bhattacharyya |
| 7,779,467 B2 | 8/2010 | Choi |
| 7,801,177 B2 | 9/2010 | Luss |
| 7,809,601 B2 | 10/2010 | Shaya et al. |
| 7,816,441 B2 | 10/2010 | Elizalde |
| 7,831,670 B2 | 11/2010 | Goodman et al. |
| 7,831,707 B2 | 11/2010 | Bardsley |
| 7,831,733 B2 | 11/2010 | Sultan |
| 7,831,928 B1 | 11/2010 | Rose et al. |
| 7,835,578 B2 | 11/2010 | Cheng et al. |
| 7,885,844 B1 | 2/2011 | Cohen et al. |
| 7,886,011 B2 | 2/2011 | Buchheit |
| 7,908,337 B2 | 3/2011 | Garcia-Luna-Aceves |
| 7,924,837 B1 | 4/2011 | Shabtay |
| 7,945,653 B2 | 5/2011 | Zuckerberg et al. |
| 7,949,574 B2 | 5/2011 | Patel et al. |
| 7,953,014 B2 | 5/2011 | Toda |
| 7,953,885 B1 | 5/2011 | Devireddy |
| 7,984,006 B2 | 7/2011 | Price |
| 8,000,267 B2 | 8/2011 | Solis |
| 8,010,669 B2 | 8/2011 | Sathish |
| 8,010,691 B2 | 8/2011 | Kollmansberger |
| 8,060,406 B2 | 11/2011 | Blegen |
| 8,074,289 B1 | 12/2011 | Carpentier |
| 8,095,523 B2 | 1/2012 | Brave et al. |
| 8,103,729 B2 | 1/2012 | Tornabene et al. |
| 8,117,441 B2 | 2/2012 | Kurien |
| 8,135,718 B1 | 3/2012 | Das et al. |
| 8,145,512 B1 | 3/2012 | Henne |
| 8,160,069 B2 | 4/2012 | Jacobson |
| 8,165,985 B2 | 4/2012 | Stefik |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,460 B2 | 8/2012 | Meek et al. |
| 8,255,468 B2 | 8/2012 | Vitaldevara et al. |
| 8,271,413 B2 | 9/2012 | Agarwal et al. |
| 8,271,578 B2 | 9/2012 | Sheffi |
| 8,296,351 B2 | 10/2012 | Lazaridis et al. |
| 8,307,029 B2 | 11/2012 | Davis et al. |
| 8,312,064 B1 | 11/2012 | Gauvin |
| 8,356,044 B2 | 1/2013 | Stefik et al. |
| 8,386,622 B2 | 2/2013 | Jacobson |
| 8,428,614 B2 | 4/2013 | Wolfe |
| 8,428,777 B1 * | 4/2013 | Poursohi .......... G05B 19/41865 |
| | | 700/247 |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,489,599 B2 | 7/2013 | Bellotti |
| 8,499,047 B2 | 7/2013 | Weyer et al. |
| 8,515,459 B2 | 8/2013 | Busch |
| 8,522,257 B2 | 8/2013 | Rupp et al. |
| 8,525,665 B1 | 9/2013 | Trundle et al. |
| 8,533,742 B2 | 9/2013 | Ginis et al. |
| 8,549,013 B1 | 10/2013 | Sarma et al. |
| 8,553,562 B2 | 10/2013 | Allan |
| 8,554,703 B1 | 10/2013 | Lin et al. |
| 8,572,214 B2 | 10/2013 | Garcia-Luna-Aceves |
| 8,589,494 B2 | 11/2013 | Garrett |
| 8,595,234 B2 | 11/2013 | Siripurapu et al. |
| 8,600,920 B2 | 12/2013 | Flynn |
| 8,606,297 B1 | 12/2013 | Simkhai et al. |
| 8,606,781 B2 | 12/2013 | Chi et al. |
| 8,620,764 B2 | 12/2013 | Moritz et al. |
| 8,654,649 B2 | 2/2014 | Vasseur |
| 8,661,046 B2 | 2/2014 | King |
| 8,665,757 B2 | 3/2014 | Kling |
| 8,667,172 B2 | 3/2014 | Ravindran |
| 8,676,929 B2 | 3/2014 | Lazaridis et al. |
| 8,677,451 B1 | 3/2014 | Bhimaraju |
| 8,688,619 B1 | 4/2014 | Ezick |
| 8,694,901 B2 | 4/2014 | Falchuk et al. |
| 8,699,350 B1 | 4/2014 | Kumar |
| 8,713,612 B2 | 4/2014 | Levy et al. |
| 8,718,055 B2 | 5/2014 | Vasseur |
| 8,719,391 B2 | 5/2014 | Hämäläinen et al. |
| 8,732,584 B2 | 5/2014 | Lee et al. |
| 8,738,431 B2 | 5/2014 | Elliott et al. |
| 8,750,820 B2 | 6/2014 | Allan |
| 8,761,022 B2 | 6/2014 | Chiabaut |
| 8,762,302 B1 | 6/2014 | Spivack |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,799,302 B2 | 8/2014 | Singerman et al. |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,472 B1 | 10/2014 | Lin et al. |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,938,503 B2 | 1/2015 | Shoen et al. |
| 8,972,969 B2 | 3/2015 | Gaither |
| 8,977,596 B2 | 3/2015 | Montulli |
| 9,015,099 B2 | 4/2015 | Nitz et al. |
| 9,071,498 B2 | 6/2015 | Beser |
| 9,081,853 B2 | 7/2015 | Rao et al. |
| 9,098,834 B2 | 8/2015 | Ramanathaiah et al. |
| 9,112,895 B1 | 8/2015 | Lin |
| 9,137,190 B2 | 9/2015 | Nairn et al. |
| 9,195,640 B1 | 11/2015 | Donneau-Golencer |
| 9,195,765 B2 | 11/2015 | Russell et al. |
| 9,195,989 B2 | 11/2015 | Bosworth et al. |
| 9,208,439 B2 | 12/2015 | Roberts et al. |
| 9,245,010 B1 | 1/2016 | Donneau-Golencer et al. |
| 9,245,238 B2 | 1/2016 | Mejia et al. |
| 9,256,785 B2 | 2/2016 | Qvarfordt |
| 9,280,911 B2 | 3/2016 | Sadeh-Koniecpol |
| 9,286,391 B1 | 3/2016 | Dykstra |
| 9,374,434 B2 | 6/2016 | Sylvain |
| 9,467,530 B2 | 10/2016 | Belimpasakis et al. |
| 9,507,851 B1 | 11/2016 | Marquie et al. |
| 9,589,560 B1 | 3/2017 | Vitaladevuni et al. |
| 9,600,561 B2 | 3/2017 | Bhargava et al. |
| 9,659,214 B1 | 5/2017 | Kennedy |
| 9,691,073 B2 | 6/2017 | Tseng et al. |
| 9,715,543 B2 | 7/2017 | Macadaan et al. |
| 9,906,539 B2 | 2/2018 | Higbee et al. |
| 10,095,988 B2 | 10/2018 | Tseng et al. |
| 10,242,258 B2 | 3/2019 | Guo et al. |
| 10,304,066 B2 | 5/2019 | Tseng et al. |
| 10,330,440 B2 | 6/2019 | Lyren |
| 10,394,919 B2 | 8/2019 | Reese et al. |
| 10,438,130 B2 | 10/2019 | Rossi et al. |
| 10,885,478 B2 | 1/2021 | Roberts et al. |
| 11,093,834 B2 | 8/2021 | Ahern et al. |
| 11,127,020 B2 | 9/2021 | Partridge |
| 11,301,524 B2 | 4/2022 | Bhargava et al. |
| 11,436,656 B2 | 9/2022 | Huang et al. |
| 11,475,360 B2 | 10/2022 | Rossi et al. |
| 11,477,302 B2 | 10/2022 | Roberts et al. |
| 11,550,455 B2 | 1/2023 | Rossi et al. |
| 11,599,709 B2 | 3/2023 | Maxwell et al. |
| 12,242,580 B1 * | 3/2025 | Philbrick ................ G06F 21/84 |
| 2001/0032193 A1 | 10/2001 | Ferber |
| 2002/0010795 A1 | 1/2002 | Brown |
| 2002/0022516 A1 | 2/2002 | Forden |
| 2002/0038296 A1 | 3/2002 | Margolus |
| 2002/0046281 A1 | 4/2002 | Cope et al. |
| 2002/0048269 A1 | 4/2002 | Hong |
| 2002/0052781 A1 | 5/2002 | Aufricht et al. |

(56) References Cited

U.S. PATENT DOCUMENTS

| | | |
|---|---|---|
| 2002/0054593 A1 | 5/2002 | Morohashi |
| 2002/0077988 A1 | 6/2002 | Sasaki |
| 2002/0078066 A1 | 6/2002 | Robinson |
| 2002/0082910 A1 | 6/2002 | Kontogouris |
| 2002/0098891 A1 | 7/2002 | Graham et al. |
| 2002/0103698 A1 | 8/2002 | Cantrell |
| 2002/0111172 A1 | 8/2002 | DeWolf et al. |
| 2002/0138551 A1 | 9/2002 | Erickson |
| 2002/0143802 A1 | 10/2002 | Chi et al. |
| 2002/0152305 A1 | 10/2002 | Jackson |
| 2002/0164977 A1 | 11/2002 | Link, II et al. |
| 2002/0167939 A1 | 11/2002 | Weissman-Berman et al. |
| 2002/0173295 A1 | 11/2002 | Nykanen et al. |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0063072 A1 | 4/2003 | Brandenberg et al. |
| 2003/0065731 A1 | 4/2003 | Mohammed et al. |
| 2003/0074409 A1 | 4/2003 | Bentley |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0163365 A1* | 8/2003 | Farnes ............... G06Q 10/1097 705/7.29 |
| 2003/0200192 A1 | 10/2003 | Bell et al. |
| 2003/0229632 A1 | 12/2003 | Harris |
| 2003/0229892 A1 | 12/2003 | Sardera |
| 2004/0012625 A1 | 1/2004 | Lei et al. |
| 2004/0019603 A1 | 1/2004 | Haigh et al. |
| 2004/0024879 A1 | 2/2004 | Dingman |
| 2004/0030602 A1 | 2/2004 | Rosenquist |
| 2004/0059626 A1 | 3/2004 | Smallwood |
| 2004/0059736 A1 | 3/2004 | Willse |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0111477 A1 | 6/2004 | Boss et al. |
| 2004/0139230 A1 | 7/2004 | Kim |
| 2004/0141003 A1 | 7/2004 | Nivers et al. |
| 2004/0176966 A1 | 9/2004 | Chen |
| 2004/0199587 A1 | 10/2004 | McKnight |
| 2004/0215509 A1 | 10/2004 | Perry |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg et al. |
| 2005/0050211 A1 | 3/2005 | Kaul |
| 2005/0074001 A1 | 4/2005 | Mattes |
| 2005/0138049 A1 | 6/2005 | Linden |
| 2005/0144000 A1 | 6/2005 | Yamasaki et al. |
| 2005/0149508 A1 | 7/2005 | Deshpande |
| 2005/0159823 A1 | 7/2005 | Hayes |
| 2005/0198351 A1 | 9/2005 | Nog |
| 2005/0216434 A1 | 9/2005 | Haveliwala et al. |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010240 A1 | 1/2006 | Chua |
| 2006/0010249 A1 | 1/2006 | Sabesan |
| 2006/0020662 A1 | 1/2006 | Robinson |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0095457 A1 | 5/2006 | Glasspool |
| 2006/0099973 A1 | 5/2006 | Nair |
| 2006/0109237 A1 | 5/2006 | Morita et al. |
| 2006/0129444 A1 | 6/2006 | Baeza |
| 2006/0129514 A1 | 6/2006 | Watanabe |
| 2006/0133343 A1 | 6/2006 | Huang |
| 2006/0143278 A1 | 6/2006 | Bauchot et al. |
| 2006/0146686 A1 | 7/2006 | Kim |
| 2006/0156222 A1 | 7/2006 | Chi et al. |
| 2006/0173831 A1 | 8/2006 | Basso |
| 2006/0193295 A1 | 8/2006 | White |
| 2006/0200523 A1 | 9/2006 | Tokuda et al. |
| 2006/0200834 A1 | 9/2006 | Cukierman et al. |
| 2006/0203804 A1 | 9/2006 | Whitmore |
| 2006/0206445 A1 | 9/2006 | Andreoli |
| 2006/0206569 A1 | 9/2006 | Heidloff et al. |
| 2006/0206578 A1 | 9/2006 | Heidloff et al. |
| 2006/0215684 A1 | 9/2006 | Capone |
| 2006/0223504 A1 | 10/2006 | Ishak |
| 2006/0224552 A1 | 10/2006 | Riezler et al. |
| 2006/0235689 A1 | 10/2006 | Sugihara |
| 2006/0235696 A1 | 10/2006 | Bennett |
| 2006/0256767 A1 | 11/2006 | Suzuki |
| 2006/0268792 A1 | 11/2006 | Belcea |
| 2007/0019619 A1 | 1/2007 | Foster |
| 2007/0038777 A1 | 2/2007 | Low et al. |
| 2007/0061195 A1 | 3/2007 | Liu et al. |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0124721 A1 | 5/2007 | Cowing et al. |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0185744 A1 | 8/2007 | Robertson |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0233736 A1 | 10/2007 | Xiong |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0260596 A1 | 11/2007 | Koran et al. |
| 2007/0260627 A1 | 11/2007 | Knittel et al. |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2007/0300174 A1* | 12/2007 | Macbeth ............... H04L 67/535 715/772 |
| 2008/0005056 A1 | 1/2008 | Stelzig |
| 2008/0010366 A1 | 1/2008 | Duggan |
| 2008/0037420 A1 | 2/2008 | Tang |
| 2008/0039203 A1 | 2/2008 | Ackley et al. |
| 2008/0040126 A1 | 2/2008 | Estrada et al. |
| 2008/0043989 A1 | 2/2008 | Furutono |
| 2008/0046340 A1 | 2/2008 | Brown |
| 2008/0059631 A1 | 3/2008 | Bergstrom |
| 2008/0077569 A1 | 3/2008 | Lee et al. |
| 2008/0080440 A1 | 4/2008 | Yarvis |
| 2008/0098420 A1 | 4/2008 | Khivesara et al. |
| 2008/0101357 A1 | 5/2008 | Iovanna |
| 2008/0107034 A1 | 5/2008 | Jetcheva |
| 2008/0107259 A1 | 5/2008 | Satou |
| 2008/0114639 A1 | 5/2008 | Meek et al. |
| 2008/0123862 A1 | 5/2008 | Rowley |
| 2008/0133444 A1 | 6/2008 | Gao et al. |

(56) References Cited

U.S. PATENT DOCUMENTS

| | | |
|---|---|---|
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0172363 A1 | 7/2008 | Wang et al. |
| 2008/0178081 A1* | 7/2008 | Reshef .................. G06F 16/957 715/700 |
| 2008/0186901 A1 | 8/2008 | Itagaki |
| 2008/0200153 A1 | 8/2008 | Fitzpatrick |
| 2008/0205775 A1 | 8/2008 | Brinker et al. |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0294617 A1 | 11/2008 | Chakrabarti et al. |
| 2008/0297589 A1* | 12/2008 | Kurtz ...................... H04N 7/15 348/E7.083 |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0064053 A1 | 3/2009 | Crawford et al. |
| 2009/0067429 A1 | 3/2009 | Nagai |
| 2009/0077000 A1 | 3/2009 | Begole et al. |
| 2009/0077001 A1 | 3/2009 | Macready et al. |
| 2009/0077027 A1 | 3/2009 | King |
| 2009/0077057 A1 | 3/2009 | Ducheneaut et al. |
| 2009/0077184 A1 | 3/2009 | Brewer |
| 2009/0089288 A1 | 4/2009 | Petersen |
| 2009/0092043 A1 | 4/2009 | Lapuh |
| 2009/0097631 A1 | 4/2009 | Gisby |
| 2009/0103515 A1 | 4/2009 | Pointer |
| 2009/0106040 A1 | 4/2009 | Jones |
| 2009/0113068 A1 | 4/2009 | Fujihira |
| 2009/0116393 A1 | 5/2009 | Hughes |
| 2009/0117922 A1 | 5/2009 | Bell |
| 2009/0125321 A1 | 5/2009 | Charlebois et al. |
| 2009/0132662 A1 | 5/2009 | Sheridan |
| 2009/0144272 A1 | 6/2009 | Adarsh et al. |
| 2009/0144300 A1 | 6/2009 | Chatley |
| 2009/0157828 A1 | 6/2009 | Agrawal |
| 2009/0157887 A1 | 6/2009 | Froment |
| 2009/0177541 A1 | 7/2009 | Martel et al. |
| 2009/0185745 A1 | 7/2009 | Momosaki |
| 2009/0193101 A1 | 7/2009 | Munetsugu |
| 2009/0204470 A1 | 8/2009 | Weyl et al. |
| 2009/0204471 A1 | 8/2009 | Elenbaas et al. |
| 2009/0210282 A1 | 8/2009 | Elenbaas et al. |
| 2009/0222344 A1 | 9/2009 | Greene |
| 2009/0224867 A1 | 9/2009 | O'Shaughnessy et al. |
| 2009/0228593 A1 | 9/2009 | Takeda |
| 2009/0234878 A1 | 9/2009 | Herz et al. |
| 2009/0234958 A1 | 9/2009 | Lee |
| 2009/0248819 A1 | 10/2009 | Hutchison et al. |
| 2009/0254572 A1 | 10/2009 | Redlich |
| 2009/0254971 A1 | 10/2009 | Herz et al. |
| 2009/0265764 A1 | 10/2009 | Schultz et al. |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Karnath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0024146 A1 | 2/2010 | Rosenzweig et al. |
| 2010/0027539 A1 | 2/2010 | Beverly |
| 2010/0036856 A1 | 2/2010 | Portilla |
| 2010/0046546 A1 | 2/2010 | Ram |
| 2010/0057929 A1 | 3/2010 | Merat |
| 2010/0058346 A1 | 3/2010 | Narang |
| 2010/0064015 A1 | 3/2010 | Sacks et al. |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0106752 A1 | 4/2010 | Eckhardt, III |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0228582 A1 | 9/2010 | King et al. |
| 2010/0232402 A1 | 9/2010 | Przybysz |
| 2010/0232439 A1 | 9/2010 | Dham |
| 2010/0235516 A1 | 9/2010 | Nakamura |
| 2010/0241464 A1 | 9/2010 | Amigo et al. |
| 2010/0246549 A1 | 9/2010 | Zhang |
| 2010/0250497 A1 | 9/2010 | Redlich |
| 2010/0250939 A1 | 9/2010 | Adams |
| 2010/0262650 A1 | 10/2010 | Chauhan et al. |
| 2010/0268782 A1 | 10/2010 | Zombek |
| 2010/0272107 A1 | 10/2010 | Papp |
| 2010/0274628 A1 | 10/2010 | Kunz et al. |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0299275 A1 | 11/2010 | Greenspan |
| 2010/0322249 A1 | 12/2010 | Thathapudi |
| 2011/0013637 A1 | 1/2011 | Xue |
| 2011/0016161 A1 | 1/2011 | Loeb |
| 2011/0016206 A1 | 1/2011 | Kodialam et al. |
| 2011/0019674 A1 | 1/2011 | Iovanna |
| 2011/0022812 A1 | 1/2011 | Vanderlinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0119302 A1 | 5/2011 | Gorman et al. |
| 2011/0125678 A1 | 5/2011 | Partridge |
| 2011/0138000 A1 | 6/2011 | Balasubramanian et al. |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161308 A1 | 6/2011 | Andersen |
| 2011/0161408 A1 | 6/2011 | Kim |
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |

(56) References Cited

U.S. PATENT DOCUMENTS

| | | |
|---|---|---|
| 2011/0246600 A1 | 10/2011 | Kageyama |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295612 A1 | 12/2011 | Donneau-Golencer et al. |
| 2011/0295783 A1 | 12/2011 | Zhao |
| 2011/0299454 A1 | 12/2011 | Krishnaswamy |
| 2011/0302169 A1 | 12/2011 | Brdiczka et al. |
| 2011/0320550 A1 | 12/2011 | Lawson et al. |
| 2012/0001919 A1 | 1/2012 | Lumer |
| 2012/0011170 A1 | 1/2012 | Elad |
| 2012/0011551 A1 | 1/2012 | Levy |
| 2012/0016875 A1 | 1/2012 | Jin et al. |
| 2012/0023113 A1 | 1/2012 | Ferren |
| 2012/0023226 A1* | 1/2012 | Petersen ............ H04L 67/2876 709/224 |
| 2012/0036180 A1 | 2/2012 | Thornton |
| 2012/0041969 A1 | 2/2012 | Priyadarshan et al. |
| 2012/0046966 A1 | 2/2012 | Chang et al. |
| 2012/0047361 A1 | 2/2012 | Erdmann |
| 2012/0066727 A1 | 3/2012 | Nozoe |
| 2012/0096114 A1 | 4/2012 | McColgan |
| 2012/0102121 A1 | 4/2012 | Wu et al. |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0131020 A1 | 5/2012 | Nitz et al. |
| 2012/0135751 A1 | 5/2012 | Mishra |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166377 A1 | 6/2012 | Sathish et al. |
| 2012/0170913 A1 | 7/2012 | Isozaki |
| 2012/0179653 A1 | 7/2012 | Araki |
| 2012/0191716 A1 | 7/2012 | Omoigui |
| 2012/0197690 A1 | 8/2012 | Agulnek |
| 2012/0198048 A1 | 8/2012 | Ioffe |
| 2012/0209654 A1* | 8/2012 | Romagnino ............ G16H 40/20 705/7.27 |
| 2012/0221150 A1 | 8/2012 | Arensmeier |
| 2012/0224487 A1 | 9/2012 | Hui |
| 2012/0226902 A1 | 9/2012 | Kim |
| 2012/0233207 A1 | 9/2012 | Mohajer |
| 2012/0257500 A1 | 10/2012 | Lynch |
| 2012/0257733 A1 | 10/2012 | Kosseifi et al. |
| 2012/0278127 A1 | 11/2012 | Kirakosyan et al. |
| 2012/0278300 A1 | 11/2012 | Soubbotin |
| 2012/0278388 A1* | 11/2012 | Kleinbart ............ G06Q 10/06 709/204 |
| 2012/0278473 A1 | 11/2012 | Griffiths |
| 2012/0284791 A1 | 11/2012 | Miller |
| 2012/0290520 A1* | 11/2012 | Frank ................ G06N 20/00 706/45 |
| 2012/0290669 A1 | 11/2012 | Parks |
| 2012/0290919 A1 | 11/2012 | Melnyk |
| 2012/0291102 A1 | 11/2012 | Cohen |
| 2012/0310587 A1 | 12/2012 | Tu et al. |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0324004 A1 | 12/2012 | Le et al. |
| 2012/0330975 A1 | 12/2012 | Lee et al. |
| 2012/0331112 A1 | 12/2012 | Chatani |
| 2013/0006991 A1 | 1/2013 | Nagano et al. |
| 2013/0009993 A1 | 1/2013 | Horseman |
| 2013/0018954 A1 | 1/2013 | Cheng |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0070928 A1 | 3/2013 | Ellis |
| 2013/0073552 A1 | 3/2013 | Rangwala |
| 2013/0074155 A1 | 3/2013 | Huh |
| 2013/0091539 A1 | 4/2013 | Khurana |
| 2013/0097664 A1 | 4/2013 | Herz |
| 2013/0110987 A1 | 5/2013 | Kim |
| 2013/0110992 A1 | 5/2013 | Ravindra et al. |
| 2013/0111063 A1 | 5/2013 | Lee |
| 2013/0125057 A1 | 5/2013 | Kashik et al. |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0159100 A1 | 6/2013 | Raina et al. |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0198197 A1 | 8/2013 | Sawhney et al. |
| 2013/0204813 A1* | 8/2013 | Master ................ G06N 20/00 706/12 |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0226865 A1 | 8/2013 | Munemann |
| 2013/0227114 A1 | 8/2013 | Vasseur |
| 2013/0227166 A1 | 8/2013 | Ravindran |
| 2013/0242996 A1 | 9/2013 | Varvello |
| 2013/0246050 A1 | 9/2013 | Yu et al. |
| 2013/0246383 A1* | 9/2013 | White ................ G06F 16/9535 707/723 |
| 2013/0250809 A1 | 9/2013 | Hui |
| 2013/0253913 A1 | 9/2013 | Tunstall-Pedoe |
| 2013/0262216 A1 | 10/2013 | Zhang et al. |
| 2013/0262365 A1 | 10/2013 | Dolbear |
| 2013/0271454 A1 | 10/2013 | Lyons et al. |
| 2013/0273941 A1 | 10/2013 | Grokop |
| 2013/0282854 A1 | 10/2013 | Jang |
| 2013/0282860 A1 | 10/2013 | Zhang |
| 2013/0282889 A1 | 10/2013 | Tito |
| 2013/0282920 A1 | 10/2013 | Zhang |
| 2013/0290369 A1* | 10/2013 | Sayers ................ G06F 16/954 707/769 |
| 2013/0304758 A1 | 11/2013 | Gruber |
| 2013/0304937 A1 | 11/2013 | Lee |
| 2013/0325858 A1 | 12/2013 | Xu |
| 2013/0325888 A1 | 12/2013 | Oneppo |
| 2013/0325970 A1 | 12/2013 | Roberts et al. |
| 2013/0329696 A1 | 12/2013 | Xu |
| 2013/0336103 A1 | 12/2013 | Vasseur |
| 2013/0336323 A1 | 12/2013 | Srinivasan |
| 2013/0338995 A1 | 12/2013 | Elkins et al. |
| 2013/0339481 A1 | 12/2013 | Hong |
| 2013/0343408 A1 | 12/2013 | Cook |
| 2014/0003232 A1 | 1/2014 | Guichard |
| 2014/0006012 A1 | 1/2014 | Zhou et al. |
| 2014/0006354 A1 | 1/2014 | Parkison |
| 2014/0006565 A1 | 1/2014 | Muscariello |
| 2014/0016820 A1 | 1/2014 | Roberts et al. |
| 2014/0029445 A1 | 1/2014 | Hui |
| 2014/0032714 A1 | 1/2014 | Liu |
| 2014/0040370 A1 | 2/2014 | Buhr |
| 2014/0040505 A1 | 2/2014 | Barton |
| 2014/0040628 A1 | 2/2014 | Fort |

(56) References Cited

U.S. PATENT DOCUMENTS

| | | |
|---|---|---|
| 2014/0043325 A1 | 2/2014 | Ruble et al. |
| 2014/0046983 A1 | 2/2014 | Galloway |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089048 A1 | 3/2014 | Bruich |
| 2014/0089454 A1 | 3/2014 | Jeon |
| 2014/0096249 A1 | 4/2014 | Dupont |
| 2014/0108313 A1 | 4/2014 | Heidasch |
| 2014/0108445 A1 | 4/2014 | Oztekin |
| 2014/0108474 A1 | 4/2014 | David |
| 2014/0115037 A1 | 4/2014 | Liu |
| 2014/0129736 A1 | 5/2014 | Yu |
| 2014/0136508 A1 | 5/2014 | Lyngbaek |
| 2014/0136528 A1 | 5/2014 | Anima et al. |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156282 A1 | 6/2014 | Madere et al. |
| 2014/0156396 A1 | 6/2014 | deKozan |
| 2014/0156567 A1 | 6/2014 | Scholtes |
| 2014/0156654 A1* | 6/2014 | Dutta .................. G06F 16/9535 707/727 |
| 2014/0156681 A1 | 6/2014 | Lee et al. |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0199663 A1 | 7/2014 | Sadeh-Koniecpol |
| 2014/0214942 A1 | 7/2014 | Ozonat |
| 2014/0233575 A1 | 8/2014 | Xie |
| 2014/0237085 A1 | 8/2014 | Park |
| 2014/0237595 A1 | 8/2014 | Sridhara |
| 2014/0245359 A1 | 8/2014 | DeFoy |
| 2014/0254595 A1 | 9/2014 | Luo |
| 2014/0257540 A1 | 9/2014 | Pacione et al. |
| 2014/0280208 A1 | 9/2014 | McConky et al. |
| 2014/0280214 A1 | 9/2014 | Han et al. |
| 2014/0280823 A1 | 9/2014 | Varvello |
| 2014/0281489 A1 | 9/2014 | Peterka |
| 2014/0281505 A1 | 9/2014 | Zhang |
| 2014/0282257 A1 | 9/2014 | Nixon et al. |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337266 A1 | 11/2014 | Kalns |
| 2014/0337276 A1 | 11/2014 | Iordanov |
| 2014/0365550 A1 | 12/2014 | Jang |
| 2015/0006316 A1 | 1/2015 | Zhou |
| 2015/0006528 A1 | 1/2015 | Rao |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0049591 A1 | 2/2015 | Adams |
| 2015/0063802 A1 | 3/2015 | Bahadur |
| 2015/0066554 A1 | 3/2015 | Red et al. |
| 2015/0089081 A1 | 3/2015 | Thubert |
| 2015/0095182 A1 | 4/2015 | Zhou et al. |
| 2015/0095481 A1 | 4/2015 | Ohnishi |
| 2015/0095514 A1 | 4/2015 | Yu |
| 2015/0131850 A1 | 5/2015 | Qvarfordt |
| 2015/0134612 A1 | 5/2015 | Silberstein |
| 2015/0149484 A1 | 5/2015 | Kelley |
| 2015/0178626 A1* | 6/2015 | Pielot .................. H04L 51/046 706/12 |
| 2015/0188770 A1 | 7/2015 | Naiksatam |
| 2015/0193695 A1 | 7/2015 | Cruz Mota et al. |
| 2015/0195149 A1 | 7/2015 | Vasseur |
| 2015/0207633 A1 | 7/2015 | Ravindran |
| 2015/0207864 A1 | 7/2015 | Wilson |
| 2015/0261867 A1 | 9/2015 | Singal et al. |
| 2015/0262067 A1 | 9/2015 | Sridhara |
| 2015/0277846 A1 | 10/2015 | Yen et al. |
| 2015/0289797 A1 | 10/2015 | Pacione |
| 2015/0309769 A1* | 10/2015 | Greene .................. G06Q 10/06 717/104 |
| 2015/0324686 A1 | 11/2015 | Julian et al. |
| 2015/0356462 A1 | 12/2015 | Fawaz |
| 2016/0042539 A1 | 2/2016 | Ye et al. |
| 2016/0048500 A1 | 2/2016 | Hebert |
| 2016/0093154 A1 | 3/2016 | Bytnar et al. |
| 2016/0119364 A1 | 4/2016 | Zolli |
| 2016/0140481 A1 | 5/2016 | Huang et al. |
| 2016/0142435 A1 | 5/2016 | Bernstein et al. |
| 2016/0147892 A1 | 5/2016 | Gilbert et al. |
| 2016/0180438 A1 | 6/2016 | Boston et al. |
| 2016/0196335 A1 | 7/2016 | Vee |
| 2016/0203002 A1* | 7/2016 | Kannan .................. G06F 9/453 715/708 |
| 2016/0222459 A1 | 8/2016 | Keating |
| 2016/0234143 A1 | 8/2016 | Choudhary |
| 2016/0253710 A1 | 9/2016 | Publicover |
| 2016/0283887 A1 | 9/2016 | Jagyasi et al. |
| 2016/0314627 A1 | 10/2016 | Fish et al. |
| 2016/0321616 A1 | 11/2016 | Gedge et al. |
| 2016/0335683 A1 | 11/2016 | Roberts |
| 2016/0335686 A1 | 11/2016 | AthuluruTlrumala |
| 2016/0350662 A1 | 12/2016 | Jin et al. |
| 2016/0358065 A1 | 12/2016 | Gedge et al. |
| 2016/0359993 A1 | 12/2016 | Hendrickson et al. |
| 2016/0379136 A1 | 12/2016 | Chen et al. |
| 2017/0032248 A1 | 2/2017 | Dotan-Cohen et al. |
| 2017/0085672 A1 | 3/2017 | Liu |
| 2017/0111237 A1 | 4/2017 | Shah et al. |
| 2017/0126963 A1 | 5/2017 | Todasco |
| 2017/0140285 A1 | 5/2017 | Dotan-Cohen et al. |
| 2017/0154282 A1 | 6/2017 | Rossi et al. |
| 2017/0163503 A1 | 6/2017 | Black |
| 2017/0177833 A1 | 6/2017 | Lewallen et al. |
| 2017/0178024 A1 | 6/2017 | Kida |
| 2017/0187807 A1 | 6/2017 | Clernon |
| 2017/0201779 A1 | 7/2017 | Publicover |
| 2017/0242920 A1* | 8/2017 | Neland .................. G06N 20/00 |
| 2017/0277559 A1* | 9/2017 | Mullins .............. G06Q 10/0633 |
| 2017/0279827 A1 | 9/2017 | Savalle et al. |
| 2017/0289769 A1 | 10/2017 | Ceker et al. |
| 2017/0309196 A1 | 10/2017 | Vangala et al. |
| 2017/0323233 A1 | 11/2017 | Bencke et al. |
| 2017/0323463 A1 | 11/2017 | Leiba |
| 2017/0337177 A1 | 11/2017 | Maxwell, III et al. |
| 2018/0307995 A1 | 10/2018 | Conroy et al. |
| 2019/0311718 A1* | 10/2019 | Huber .................. G10L 15/22 |
| 2021/0275023 A1* | 9/2021 | Kalantarian .......... G16H 50/30 |
| 2023/0186192 A1 | 6/2023 | Xia |
| 2024/0054430 A1 | 2/2024 | Maikhuri |
| 2024/0135090 A1 | 4/2024 | Kapcar et al. |

FOREIGN PATENT DOCUMENTS

| | | |
|---|---|---|
| CA | 2378765 | 9/2002 |
| EP | 1024437 | 8/2000 |
| EP | 1077422 | 2/2001 |
| EP | 1850134 B1 | 10/2007 |
| EP | 2120402 | 11/2009 |
| EP | 2120419 | 11/2009 |
| EP | 2124415 | 11/2009 |
| EP | 2214357 | 8/2010 |
| EP | 2523436 | 11/2012 |
| JP | 2000112978 | 4/2000 |
| JP | 2000215023 A | 8/2000 |
| JP | 2003330697 A | 11/2003 |
| JP | 2006293830 | 10/2006 |

(56) References Cited

FOREIGN PATENT DOCUMENTS

| | | | |
|---|---|---|---|
| JP | 2016081140 A | | 5/2016 |
| KR | 20170036805 A | * | 4/2017 |
| WO | WO2001020481 | | 3/2001 |
| WO | 2003005288 | | 1/2003 |
| WO | 2003049369 | | 6/2003 |
| WO | WO2006104345 | | 10/2006 |
| WO | 2007144388 | | 12/2007 |
| WO | WO2008113425 | | 9/2008 |
| WO | WO2011019295 | | 2/2011 |
| WO | 2011049890 | | 4/2011 |
| WO | WO2011140701 | | 11/2011 |
| WO | WO2013059906 | | 5/2013 |
| WO | 2013123410 | | 8/2013 |

OTHER PUBLICATIONS

"5 Tips for Creating an Advertisement on Facebook," Facebook, Nov. 11, 2011, retrieved from https://web.archive.org/web/20111111002017/http:/www.advertisementinfacebook.com/advertisement-for-facebook.html.

"About Alarm Clock," Feb. 8, 2006, retrieved from https://web.archive.org/web/20060208031527/http://www.robbiehanson.com/alarmclock/index.html.

"About Alarm Clock," Oct. 11, 2007, retrieved from https://web.archive.org/web/20071011022121/http://www.robbiehanson.com/alarmclock/index.html.

"About PlaceIQ," 2012, retrieved from https://www.placeiq.com/about-placeiq/.

"About," Ad Revolver, Feb. 4, 2002, retrieved from https://web.archive.org/web/20020204042004/http://www.adrevolver.com:80/banner_manager/about.htm.

"Advertisement In Facebook Information," Facebook, Nov. 11, 2011, retrieved from https://web.archive.org/web/20111112062703/http:/www.advertisementinfacebook.com/index.html.

"Advisory Opinion re: Petition No. S050314A," New York State Department of Taxation and Finance, Office of Tax Policy Analysis Taxpayer Guidance Division, 2008, retrieved from https://www.tax.ny.gov/pdf/advisory_opinions/sales/a08_28s.pdf.

"Alcatel-Lucent, 1020 Placecast partner on location-based mobile advertising," Marketing Dive, retrieved from https://www.marketingdive.com/ex/mobilemarketer/cms/news/advertising/3305.html.

"Announcing the Twitter Ads API," Twitter, Feb. 23, 2013, retrieved from https://web.archive.org/web/20130223180647/http:/advertising.twitter.com/2013/02/announcing-twitter-ads-api_20.html.

"API Integration," Twitter, Feb. 9, 2012, retrieved from https://web.archive.org/web/20120209174437/https:/business.twitter.com/en/optimize/api/.

"Bear Group's Experience with DoubleClick," 2007, https://www.beargroup.com/system-integrations/ad-servers/doubleclick.

"CC/WC/WCP Detailed Specifications," Xerox Corporation, 2006, retrieved from https://www.office.xerox.com/latest/W55SS-01.PDF.

"Certified Products," Twitter, Mar. 7, 2013, retrieved from https://web.archive.org/web/20130307212611/https:/dev.twitter.com/programs/twitter-certified-products/products.

"Citysense," Sense Networks, Sep. 22, 2008, retrieved from https://web.archive.org/web/20080922000635/http://www.sensenetworks.com:80/citysense.php.

"DAFFODIL (Distributed Agents for User-Friendly Access of Digital Libraries): The Underlying Concepts," PowerPoint, Feb. 27, 2004.

"Document Security Xerox CopyCentre/WorkCentre/WorkCentre Pro 232/238/245/255/265/275," Xerox Corporation, 2006, retrieved from https://www.office.xerox.com/latest/W7XFS-03U.PDF.

"Documentation, " Twitter, Jul. 13, 2011, retrieved from https://web.archive.org/web/20110713041412/https://dev.twitter.com/docs/.

"Doubleclick Inc.," Encyclopedia.com, retrieved from https://www.encyclopedia.com/economics/encyclopedias-almanacs-transcripts-and-maps/doubleclick-inc.

"ESRI's Geospatial Computer-Aided Dispatch," Dec. 2007, ESRI.

"Facebook Unveils Facebook Ads," Facebook, Nov. 6, 2007, retrieved from www.about.fb.com/news/2007/11/facebook-unveils-facebook-ads/ (2007).

"FAQ," Ad Revolver, Feb. 4, 2002, retrieved from https://web.archive.org/web/20020204042401/http://www.adrevolver.com/banner_managerfaq.htm.

"Form 10-K," 2007, http://media.corporate-ir.net/media_files/NSD/DCLK/reports/10k99.pdf.

"Foursquare's 1st Pitch Deck," 2009, retrieved from https://www.slideshare.net/alkarmi/foursquare-1stpitch2009.

"Frequently Asked Questions," Oct. 11, 2007, retrieved from https://web.archive.org/web/20071011034339/http://robbiehanson.com/alarmclock/faq.html.

"Gender targeting for Promoted Products now available," Twitter, Oct. 28, 2012, retrieved from https://web.archive.org/web/20121028100012/http://advertising.twitter.com/2012/10/gender-targeting-for-promoted-products.html.

"Geo Developer Guidelines," Twitter, Jul. 13, 2011, retrieved from https://web.archive.org/web/201 10713045612/https://dev.twitter. com/terms/geo-developer-guidelines.

"GET geo/search," Twitter, Jul. 13, 2011, retrieved from https://web.archive.org/web/20110713042853/https://dev.twitter.com/docs/api/1/get/geo/search.

"GET Search, " Twitter, Dec. 23, 2011, retrieved from https://web.archive.org/web/20111223105655/https:/dev.twitter.com/docs/api/1/get/search.

"Getting Started," Twitter, Jul. 13, 2011, retrieved from https://web.archive.org/web/20110713043554/https://dev.twitter.com/start.

"Gimbal REST API," Gimbal Inc., 2013, available at https://docs.gimbal.com/rest.html.

"GNIP," Twitter, Dec. 14, 2012, retrieved from https://web.archive.org/web/20121214215529/https:/dev.twitter.com/programs/twitter-certified-products/gnip.

"Gowalla," Wikipedia, https://en.wikipedia.org/wiki/Gowalla.

"History of the REST & Search API," Twitter, Dec. 2, 2011, retrieved from https://web.archive.org/web/20111202041642/https:/dev.twitter.com/docs/history-rest-search-api.

"How Do You Advertise on Facebook?" Facebook, Nov. 11, 2011, retrieved from https://web.archive.org/web/20111111023735/http:/www.advertisementinfacebook.com/how-do-you-advertise-on-facebook.html.

"Improving performance on twitter.com," Twitter, May 29, 2012, retrieved from https://blog.twitter.com/engineering/en_us/a/2012/improving-performance-on-twittercom.html.

"In Pictures: All about Foursquare," Forbes, Apr. 7, 2010, retrieved from https://www.forbes.com/2010/04/07/iphone-mobile-android-technology-data-companies-10-foursquare_slide.html?sh=6a70a35328a2.

"Interest targeting: Broaden your reach, reach the right audience," Twitter, Aug. 30, 2012, retrieved from https://web.archive.org/web/20120831222534/http:/advertising.twitter.com/2012/08/interest-targeting-broaden-your-reach.html.

"Magitti on the move," The Economic Times, English Ed., retrieved from https://economictimes.indiatimes.com/as-you-like-it/magitti-on-the-move/printarticle/2568170.cms.

"Mapping a City's Rhythm—MIT Technology Review," MIT, retrieved from https://www.technologyreview.com/s/412529/mapping-a-citys-rhythm.

"Measure your impact," Twitter, Mar. 7, 2013, retrieved from https://web.archive.org/web/20130307211901/https:/business.twitter.com/measure-your-impact.

"Measurement," 2012, retrieved from https://www.placeiq.com/measurement/.

"More powerful tools for small business and self-service advertisers, " Twitter, Mar. 21, 2013, retrieved from https://web.archive.org/web/20130321053415/http:/advertising.twitter.com/2013/03/More-powerful-tools-for-small-business-and-self-service-advertisers.html.

"MPOS AdSpace," Aug. 8, 2008, retrieved from https://web.archive.org/web/20080808140616/http://www.xiam.com/xiam.products.adspace.shtml.

(56) References Cited

OTHER PUBLICATIONS

"Murder: Fast datacenter code deploys using BitTorrent," Twitter, Jul. 1, 2010, retrieved from https://blog.twitter.com/engineering/en_us/a/2010/murder-fast-datacenter-code-deploys-using-bittorrent.html.
"New Jersey Division of Criminal Justice's 'Handling a Domestic Violence Call: In-Service Training for Police Dispatchers'," May 8, 2003, New Jersey Division of Criminal Justice.
"Nike + ipod Exercise," HowStuffWorks 2007, retrieved from https://electronics.howstuffworks.com/gadgets/fitness/nike-ipod.htm.
"Nike + iPod Experience Coming to A Gym Near You," Nike News, Mar. 4, 2008, retrieved from https://news.nike.com/news/nike-ipod-experience-coming-to-a-gym-near-you.
"Nike Plus Review," Video, YouTube, Feb. 29, 2012, retrieved from https://www.youtube.com/watch?v=CkyecA7z4es.
"Nike+ SportBand User's Guide," 2008, retrieved from https://www.manualslib.com/manual/259083/Nike-NikePlus-Sportband.html.
"Personalization & Discovery," Qualcomm.com, Sep. 15, 2008, retrieved from https://web.archive.org/web/20080915111528/http://www.qualcomm.com/products_services/mobile_content_services/personalization_discovery.html.
"PIQ Conquest," 2013, retrieved from https://web.archive.org/web/20130405064340/http://www.placeiq.com/products/piq-conquest-piq-conquest/.
"PIQ Customer," 2013, retrieved from https://web.archive.org/web/20130405063947/http://www.placeiq.com/products/piq-customer-piq-customer/.
"PIQ Segments," 2013, retrieved from https://web.archive.org/web/20130404211709/http://www.placeiq.com/products/piq-segments-piq-segments/.
"PlaceIQ—Shyenne Horras," 2012, retrieved from https://shyennehorras.com/tag/placeiq/.
"PlaceIQ Blog," 2013, retrieved from https://web.archive.org/web/20130413102103/https://www.placeiq.com/blog/.
"Pricing," Twitter, Mar. 7, 2013, retrieved from https://web.archive.org/web/20130307212012/https:/business.twitter.com/products/pricing.
"Privacy," 2012, retrieved from https://www.placeiq.com/privacy/.
"Project Ringing in the Rain—Overview," MIT Media Lab, Jan. 2007, retrieved from https://www.media.mit.edu/projects/ringing-in-the-rain/overview.
"Promoted Accounts," Twitter, Sep. 9, 2010, retrieved from https://web.archive.org/web/20101009232719/http:/support.twitter.com/articles/282154.
"Promoted Products: now more mobile," Twitter, Feb. 29, 2012, retrieved from https://web.archive.org/web/20120229030349/http:/blog.twitter.com/2012/02/promoted-products-now-more-mobile.html.
"Promoted Trends," Twitter, Oct. 10, 2010, retrieved from https://web.archive.org/web/20101010145232/https:/support.twitter.com/articles/282142.
"Promoted Tweets on mobile: more options, starting today," Twitter, Mar. 20, 2012, retrieved from https://web.archive.org/web/20120320192505/http:/advertising.twitter.com/2012/03/promoted-tweets-on-mobile-more-options.html.
"Proximity Overview," Gimbal Inc., 2013, retrieved from https://docs.gimbal.com/proximity_overview.html.
"PVR Capture Apr. 2013," 2013, retrieved from https://web.archive.org/web/20130411042334 /http://www.placeiq.com/products/pvr.
"Qualcomm Acquires Xiam Technologies Limited, Leading Provider of Wireless Content Discovery and Recommendations Technology," Xiam Technologies, Mar. 11, 2008, retrieved from https://web.archive.org/web/20080808140641/http://www.xiam.com/press/2008-03-11-QualcommXiam.shtml.
"Quick Reference Guide," 2009, retrieved from https://silo.tips/download/quick-reference-guide-21.
"REST API v. 1.1 Resources," Twitter, Mar. 25, 2013, retrieved from https://web.archive.org/web/20130325202324/https://dev.twitter.com/docs/api/1.1.
"REST API v1.1 Resources," Twitter, Dec. 14, 2012, retrieved from https://web.archive.org/web/20121214124240/https:/dev.twitter.com/docs/api/1.1.
"Ringing in the Rain: An Agent Based Weather Warning System," MIT, Jan. 2008, retrieved from alumni.media.mit.edu/~ccchang/RITR/RingingInTheRain.htm.
"Screen Shots," Oct. 11, 2007, retrieved from https://web.archive.org/web/20071011044752/http://robbiehanson.com/alarmclock/screenShots.html.
"ScreenTonic—At a glance," ScreenTonic SA, Feb. 9, 2008, retrieved from https://web.archive.org/web/ 20080209135205/http://www.screentonic.com/at-a-glance1.htm.
"Smarter Security Systems for Indian Banks," Business Wire India, Aug. 29, 2012, retrieved from https://www.businesswireindia.com/smarter-security-systems-for-indian-banks-32474.html.
"Sponsor Breakfast Presentation PlaceIQ," 2012, retrieved from https://www.slideshare.net/mediapostlive/place-iq-25647368.
"ss1.jpg", Oct. 11, 2007, retrieved from https://web.archive.org/web/20071011044752im_/ http://robbiehanson.com/alarmclock/images/ss1.jpg.
"ss2.jpg", Oct. 11, 2007, retrieved from https://web.archive.org/web/20071011044752im_/http://robbiehanson.com/alarmclock/images/ss2.jpg.
"ss3.jpg", Oct. 11, 2007, retrieved from https://web.archive.org/web/20071011044752im_/http://robbiehanson.com/alarmclock/images/ss3.jpg.
"ss4.jpg", Oct. 11, 2007, retrieved from https://web.archive.org/web/20071011044752im_/http://robbiehanson.com/alarmclock/images/ss4.jpg.
"ss5.jpg", Oct. 11, 2007, retrieved from https://web.archive.org/web/20071011044752im_/http://robbiehanson.com/alarmclock/images/ss5.jpg.
"ss6.jpg", Oct. 11, 2007, retrieved from https://web.archive.org/web/20071011044752im_/http://robbiehanson.com/alarmclock/images/ss6.jpg.
"ss7.jpg", Oct. 11, 2007, retrieved from https://web.archive.org/web/20071011044752im_/http://robbiehanson.com/alarmclock/images/ss7.jpg.
"ss8.jpg", Oct. 11, 2007, retrieved from https://web.archive.org/web/20071011044752im_/http://robbiehanson.com/alarmclock/images/ss8.jpg.
"ss9.jpg", Oct. 11, 2007, retrieved from https://web.archive.org/web/20071011044752im_/http://robbiehanson.com/alarmclock/images/ss9.jpg.
"ss10.jpg", Oct. 11, 2007, retrieved from https://web.archive.org/web/20071011044752im_/http://robbiehanson.com/alarmclock/images/ss10.jpg.
"ss11.jpg", Oct. 11, 2007, retrieved from https://web.archive.org/web/20071011044752im_/http://robbiehanson.com/alarmclock/images/ss11.jpg.
"ss12.jpg", Oct. 11, 2007, retrieved from https://web.archive.org/web/20071011044752im_/http://robbiehanson.com/alarmclock/images/ss12.jpg.
"ss13.jpg", Oct. 11, 2007, retrieved from https://web.archive.org/web/20071011044752im_/http://robbiehanson.com/alarmclock/images/ss13.jpg.
"ss14.jpg", Oct. 11, 2007, retrieved from https://web.archive.org/web/20071011044752im_/http://robbiehanson.com/alarmclock/images/ss14.jpg.
"Stamp-Technology," ScreenTonic SA, Feb. 13, 2008, retrieved from https://web.archive.org/web/ 20080213054711/http://www.screentonic.com/stamp-technology.htm.
"Start Advertising," Twitter, Feb. 6, 2012, retrieved from https://web.archive.org/web/20120206021953/https:/business.twitter.com/en/advertise/start/.
"Streaming API Concepts," Twitter, Dec. 2, 2011, retrieved from https://web.archive.org/web/20111202024252/https://dev.twitter.com/docs/streaming-api/concepts.
"Streaming API," Twitter, Dec. 2, 2011, retrieved from https://web.archive.org/web/20111202024242/ https://dev.twitter.com/docs/streaming-api.

(56) References Cited

OTHER PUBLICATIONS

"Targeted Mobile Advertising," Nov. 21, 2008, retrieved from https://web.archive.org/web/20081121201849/http://www.xiam.com/xiam.solutions.targeted.advertising.shtml.
"Targeting," Twitter, Mar. 7, 2013, retrieved from https://web.archive.org/web/20130307212103/https://business.twitter.com/targeting.
"The new Twitter Ads center," Twitter, Mar. 16, 2013, retrieved from https://web.archive.org/web/20130316005334/http:/advertising.twitter.com/2013/03/The-new-Twitter-Ads-center.html.
"The Streaming APIs, " Twitter, Jan. 19, 2013, retrieved from https://web.archive.org/web/20130119212721/https://dev.twitter.com/docs/streaming-apis.
"Things Every Developer Should Know," Twitter, Dec. 2, 2011, retrieved from https://web.archive.org/web/20111202041631/https://dev.twitter.com/docs/things-every-developer-should-know.
"Twitter Ads Full Service Analytics," Twitter, on Mar. 7, 2013, retrieved from https://web.archive.org/web/20130307212052/https:/business.twitter.com/products/analytics-full-service.
"Twitter Ads self service," Twitter, Mar. 7, 2013, retrieved from https://web.archive.org/web/20130307211550/https:/business.twitter.com/products/twitter-ads-self-service.
"Twitter Advertising: Introducing Keyword Targeting in Timelines," Twitter, Apr. 18, 2013, retrieved from https://web.archive.org/web/20130418114422/http://advertising.twitter.com/2013/ 04/Introducing-Keyword-Targeting-in-Timeline.html.
"Twitter Advertising: New enhanced geo-targeting for marketers, " Twitter, Sep. 14, 2012, retrieved at https://web.archive.org/web/20120914024230/http:/advertising.twitter.com/2012/ 09/new-enhanced-geo-targeting-for-marketers.html.
"Twitter Advertising: New targeting adds greater relevant to your Promoted Tweets," Twitter, Jul. 22, 2012, retrieved from https://web.archive.org/web/20120722044622/http:/ advertising.twitter.com/2012/07/ new-targeting-adds-greater-relevance-to.html.
"Twitter Blog: Hello World", Twitter, Apr. 16, 2010, retrieved from https://web.archive.org/web/ 20100416111723/http://blog.twitter.com/2010/04/hello-world.html.
"Two new features for self-service advertisers," Twitter, Sep. 11, 2012, retrieved from https://web.archive.org/web/ 20120911135519/http:/advertising.twitter.com/2012/09/two-new-features-for-self-service.html.
"UK Carrier O2 Teams with Placecast for LBS Opt-In Marketing to a Million Consumers," Internet 2 Go, Oct. 14, 2010, retrieved from http://internet2go.net/news/carriers/uk-carrier-o2-teams-placecast-lbs-marketing-million-consumers.
"User Streams," Twitter, Dec. 2, 2011, retrieved from https://web.archive.org/web/20111202041744/https:/dev.twitter.com/docs/streaming-api/user-streams.
"User Streams," Twitter, Jul. 12, 2012, retrieved from https://web.archive.org/web/20120712073356/https://dev.twitter.com/docs/streaming-apis/streams/user.
"Visa enhances fraud detection service for VisaNet processing platform," The PayPers, Jan. 20, 2011, retrieved from https://thepaypers.com/cards/visa-enhances-fraud-detection-service-for-visanet-processing-platform--742952.
"Visa Strategy Manager Boosts Issuer Fraud Detection," VISA, Apr. 11, 2012, retrieved from https://usa.visa.com/about-visa/newsroom/press-releases.releaseId.9101.html.
"Visa Transaction Alerts make North American debut," Nov. 17, 2009, retrieved from https://www.finextra.com/ pressarticle/31025/visa-transaction-alerts-make-north-american-debut.
"We've just made the 'Places' screen smarter!" retrieved from https://web.archive.org/web/20100531082001/ http://blog.foursquare.com:80/post/589698188/weve-just-made-the-places-screen-smarter.
"What are Promoted Trends?" Twitter, Mar. 26, 2013, retrieved from https://web.archive.org/web/20130326131656/https:/support.twitter.com/articles/282142.
"What's New," Oct. 11, 2007, retrieved from https://web.archive.org/web/20071011034402/http://robbiehanson.com/alarmclock/whatsNew.html.

"Why Should You Advertise on Facebook?" Facebook, Nov. 11, 2011, retrieved from https://web.archive.org/web/20111111002041/http:/www.advertisementinfacebook.com/why-advertise-on-facebook.html.
"Xerox Extensible Interface Platform (EIP)," Xerox Corporation, 2006, retrieved from https://www.comdat.ch/ download/pictures/0e/rv3wgtpblgfwvuit5x53eaztpe9at5/eip_your_work_just_got_easier.pdf.
"Advertiser Analytics," Twitter, Sep. 30, 2012, retrieved from https://web.archive.org/web/20120930215459/https:/business.twitter.com/en/advertise/analytics/.
Abraham, "Business Intelligence from Web Usage Mining," PARC, 16 pgs. (2003).
Albino, "GPS-tracking apps: Helicopter parenting or smart solution?" Today's Parent, Nov. 1, 2013, retrieved from https://www.todaysparent.com/family/gps-tracking-kids/.
Armstrong et al., "WebWatcher: A Learning Apprentice for the World Wide Web," 1995 AAAI Spring Symposium on Information Gathering from Heterogenous, Distributed Environments, 1995.
Aun, "DoubleClick Aims to Give Deeper Insight into Rich Media Effectiveness," Click Z, Jan. 7, 2008, retrieved from https://www.clickz.com/doubleclick-aims-to-give-deeper-insight-into-rich-media-effectivness/58863/.
Balabanovic et al., "FAB: Content-Based, Collaborative Recommendation," 1997, retrieved from https://web.archive.org/web/19971021223905/http://fab.stanford.edu:80/.
BallBug, 2010, available at www.ballbug.com.
Banerjee et al., "Clickstream Clustering using Weighted Longest Common Subsequences," Proceedings of the Web Mining Workshop at the 1st SIAM Conference on Data Mining, Apr. 5-7, 2001.
Bausch et al., "Flickr Hacks," O'Reilly, 2006.
Beale et al., "Mobile Context Aware Systems: The Intelligence to Support Tasks and Effectively Utilise Resources," International Conference on Mobile Human-Computer Interaction, 2004, p. 240.
Bellotti et al., "Activity-Based Serendipitous Recommendations with the Magitti Mobile Leisure Guide," CHI 2008 Proceedings, 2008, pp. 1157-1166.
Belqasmi et al., "RESTful Web Services for Service Provisioning in Next-Generation Networks: A Survey," IEEE Communications Magazine, 2011, pp. 66-73, vol. 49, Issue 12.
Ben-Shaul et al., "Adding support for dynamic and focused search with Fetuccino," 1999.
Berendt et al., "Towards Semantic Web Mining," The Semantic Web—ISWC, ISWC 2002 Lecture Notes in Computer Science, 2002.
Bharat et al., "Personalized, interactive news on the Web," Multimedia Systems 6, 1997, 22 pages.
Blogniscient, 2010, available at www.blogniscient.com.
BlogRunner, 2010, available at www.blogrunner.com.
Bogers, "Movie Recommendation Using Random Walks over the Contextual Graph," Information Systems & Interactive Design; Royal School of Library and Information Science, 2010.
Butler, D., "Scientists Get Online News Aggregator," e! Science News, available at www.esciencenews.com, 1 pg. (2008).
Callihan, "Learn HTML In a Weekend," Prima Publishing, 1998, available at: https://archive.org/details/learnhtmlinweeke00call (Part 1 of 2).
Callihan, "Learn HTML In a Weekend," Prima Publishing, 1998, available at: https://archive.org/details/learnhtmlinweeke00call (Part 2 of 2).
Cetintemel et al., "Self-Adaptive User Profiles for Large Scale Data Delivery," ICDE '00: Proceedings of the 16th International Conference on Data Engineering, 2000.
Chakrabarti et al., "Focused crawling: a new approach to topic-specific Web resource discovery," WWW '99 Proceedings of the Eighth International Conference on World Wide Web, 1999.
Chang et al., "Mining the World Wide Web: An Information Search Approach," The Kluwer International Series on Information Retrieval, 2001.
Chen et al., "WebMate: A Personal Agent for Browsing and Searching," The Robotics Institute Carnegie Mellon University, 1997.

(56) References Cited

OTHER PUBLICATIONS

Chi et al., "LumberJack: Intelligent Discovery and Analysis of Web User Traffic Composition," WEBKDD 2002—Mining Web Data for Discovering Usage Patterns and Profiles Conference, 2002.
Chi et al., "Using Information Scent to Model User Information Needs and Actions on the Web," ACM SIGCHI Conference on Human Factors in Computing Systems, 2001.
Chirita et al., "PROS: A Personalized Ranking Platform for Web Search," AH 2004: Adaptive Hypermedia and Adaptive Web-Based Systems, 2004.
Cloudee, 2010, available at www.cloudrunner.com.
Coburn, "Gowalla for the iPad: Map Views and Consumption," May 1, 2010, The Next Web, retrieved from https://thenextweb.com/insider/2010/05/01/gowalla-ipad-map-views-consumption/.
Collection of Flickr web pages publicly available on archive.org.
Collection of LiveJournal web pages publicly available on archive.org. (Pt. 1-171 pgs.).
Collection of LiveJournal web pages publicly available on archive.org. (Pt. 2-174 pgs.).
Collection of MySpace web pages publicly available on archive.org.
Collins, "The Little Book of Twitter," Michael O'Mara Books, 2009.
Cooley, "Data Preparation for Mining World Wide Web Browsing Patterns," WebMiner, 1999.
Cooley, "Discovery of Interesting Usage Patterns from Web Data," WebSIFT, 1999.
Cooley, "Web Mining: Information and Pattern Discovery on the World Wide Web," WebMiner, 1997.
Curtiss et al., "Unicorn: A System for Searching the Social Graph," The 39th International Conference on Very Large Data Bases, Aug. 26-30, 2013, Facebook, Inc.
Daylife, 2010, available at www.daylife.com.
Dey et al., "CybreMinder: A Context-Aware System for Supporting Reminders," 2000, Georgia Tech, retrieved from https://www.cc.gatech.edu/projects/infosphere/papers/CybreMinder.pdf.
Dickinson, "Why Gay Guys Love Using Grindr to Hook Up and Make Friends," Insider, Feb. 14, 2012, retrieved from https://www.businessinsider.com/why-gay-guys-love-using-grindr-to-hook-up-and-make-friends-2012-1.
Diligenti et al., "Focused Crawling Using Context Graphs," Proceedings of the 26th VLDB Conference, 2000, 8 pages, Cairo, Egypt.
Downey, "Minority Report advertising is already here: privacy at CES 2013, Day 1," Abine, Jan. 9, 2013, retrieved from https://www.abine.com/blog/2013/privacy-at-ces-day-1/.
El-Bishouty et al., "PERKAM: Personalized Knowledge Awareness Map for Computer Supported Ubiquitous Learning," Educational Technology & Society, 2007, pp. 122-134, vol. 10, No. 3.
Facebook Website as it existed and was publicly available prior to the effective filing date of the '190 patent, Facebook, Inc., retrieved from www.facebook.com, 2008.
Fitton et al., "Twitter for Dummies," Wiley Publishing, Inc., 27 pgs. (2009).
Forrest, "Citysense: Lets You Know What Everybody's Doing," Sense Networks, retrieved from https://web.archive.org/web/20080701034213/http://radar.oreilly.com/archives/2008/06/citysense-reality-mining-iphone.html.
Freitag et al., "WebWatcher: Knowledge Navigation in the World Wide Web," AAAI Technical Report FS-95-03, 1995.
Froelich et al., "MyExperience: A System for in situ Tracing and Capturing of User Feedback on Mobile Phones," MobiSys '07, 2007, vol. 57.
Gaudin, "New PARC software turns a cell phone into a personal assistant," Computerworld, Nov. 21, 2007.
Giles, "How to Use Flickr: The Digital Photography Revolution," Thomson Course Technology PTR, 2006.
Glinton, "From Grindr Team, a Meet-'N'-Greet App for the Rest," WBUR News, Dec. 12, 2011, retrieved from https://www.wbur.org/npr/143585501/from-grindr-team-a-meet-n-greet-app-for-the-rest.

Greene, "Smart Phone Suggests Things to Do," MIT Technology Review, Nov. 13, 2007, retrieved from https://www.technologyreview.com/2007/11/13/128685/smart-phone-suggests-things-to-do/.
Guinard et al., "Towards the Web of Things: Web Mashups for Embedded Devices," WWW 2009, Apr. 20-24, 2009.
Harris, "How Does the Nike Plus Work?" Livestrong.com, 2006, retrieved from https://www.livestrong.com/article/533191-how-does-the-nike-plus-work/.
Heer et al., "Identification of Web User Traffic Composition using Multi-Modal Clustering and Information Scent," Proceedings of the Workshop on Web Mining, SIAM Conference on Data Mining, 2001.
Hersovici et al., "The shark-search algorithm - An application: tailored Web site mapping," Computer Networks and ISDN Systems, 1998, vol. 30, Issues 1-7.
Hickman, "How I became a Foursquare Cyberstalker," The Guardian, Jul. 23, 2010, retrieved from https://www.theguardian.com/technology/2010/jul/23/foursquare.
Hristova et al., "Ad-me: Wireless Advertising Adapted to the User Location, Device and Emotions," Proc. Of the 37th HI Int'l Conf. On System Sciences, 2004, retrieved from http://citeseerx.ist.psu.edu/viewdoc/download;jsessionid=2CD78FA3E058EB3BD48812F5EA10553B?doi=10.1.1.129.2870&rep=rep1&type=pdf.
Hsu et al., "Ranking Comments on the Social Web," 2009 Int'l Conf. Computational Sci. & Engineering, 2009, vol. 4.
Joachims et al., "WebWatcher: A Tour Guide for the World Wide Web," CMU-CS-96, 1996.
Joachims et al., "WebWatcher: Machine Learning and Hypertext," Carnegie Mellon University, 1995, 5 pages.
Kamba et al., "An interactive, personalized, newspaper on the WWW," Multimedia Computing and Networking, 1996.
Kamba et al., "Anatagonomy: a personalized newspaper on the World Wide Web," Int'l J. Human Computer Studies, 1997, p. 789-803, vol. 46.
Kamba et al., "The Krakatoa Chronicle—An Interactive, Personalized, Newspaper on the Web," GVU Center Technical Reports, 1995.
Keenoy et al., "Personalisation of Web Search," Intelligent Techniques for Web Personalization IJCAI 2003 Workshop, 2003.
Kelly, "Business Models Based on Advertising," Technical Business, and Legal Dimensions of Protecting Children from Pornography on the Internet: Proceedings of a Workshop, 2002, retrieved from https://www.nap.edu/read/10324/chapter/17#105.
Kim, "Pebble watch: Smartwatch Review," PCMag, Dec. 7, 2016, retrieved from https://www.pcmag.com/reviews/pebble-smartwatch.
Kirk, "Microsoft buys mobile advertising company ScreenTonic," Computerworld, May 3, 2007, retrieved from https://www.computerworld.com/article/2544849/microsoft-buys-mobile-advertising-company-screentonic.html.
Kosala et al., "Web Mining Research: A Survey," ACM SIGKDD Explorations Newsletter, 2000, vol. 2.
Kovach, "How to Use Gowalla to Check-In With Foursquare," Business Insider, Dec. 3, 2010, retrieved from https://www.businessinsider.com/heres-a-tour-of-gowallas-latest-iphone-app-2010-12.
Lazerow, "Twitter's Ads API is Here: So What and Now What?" Ad Age, Feb. 20, 2013, retrieved from https://web.archive.org/web/20130223013656/http:/adage.com/article/digitalnext/twitter-s-ads-api/239913/.
Lerman et al., "Social Browsing on Flickr," International Conference on Weblogs and Social Media, 2006.
Lieberman et al., "Exploring the Web with Reconnaissance Agents," Communications of the ACM, 2001, vol. 44, No. 8.
Lieberman et al., "Let's Browse: A Collaborative Web Browsing Agent," IUI '99: Proceedings of the 4th International Conference on Intelligent User Interfaces, 1998, pp. 65-68.
Lieberman, "Autonomous Interface Agents," CHI 97, Mar. 22-27, 1997.
Lieberman, "Letizia: An Agent That Assists Web Browsing," IJCAI '95: Proceedings of the 14th Int'l Joint Conf. on Artificial Intelligence, 1995, vol. 1.

(56) References Cited

OTHER PUBLICATIONS

Lieberman, "Letizia: An Agent That Assists Web Browsing," The Lieberary: Henry Lieberman's On-Line Library, retrieved from https://web.archive.org/web/20040426134417/http://web.media.mit.edu~lieber/Lieberary/Lieberary.html.

LiveJournal Source Code, LiveJournal, 1999.

Loecher et al., "CitySense: multiscale space time clustering of GPS points and trajectories," Joint Statistical Meeting (JSM), 2009, retrieved from http://www1.cs.columbia.edu~jebara/papers/CitySense. JSM2009.pdf.

Loreto et al., "Known Issues and Best Practices for the Use of Long Polling and Streaming in Bidrectional HTTP," Internet Engineering Task Force, 2011.

Maarek et al., "WebCutter: A System for Dynamic and Tailorable Site Mapping," 1998.

Maia et al., "LOCCAM—Loosely Coupled Context Acquisition Middleware," 28th Annual ACM Symposium on Applied Computing (SAC '13) (Mar. 18-22, 2013), 2013.

Malik, "Using the iPhone to Mine for Gold & Sense," Gigaom.com, Jun. 9, 2008, retrieved from https://gigaom.com/2008/06/09/sense-networks-citysense.

Manber et al., "WebGlimpse—Combining Browsing and Searching," Usenix Technical Conference, 1997.

Marmasse et all., "Safe & Sound: A Wireless Leash," Short Talk: Trust, Security & Safety, Apr. 5-10, 2003, pp. 726-727, CHI 2003: New Horizons, Ft. Lauderdale, USA.

McFedries et al., "MySpace Visual Quick Tips," Wiley Publishing, Inc., 2006.

Memeorandum, 2010, available at www.memeorandum.com.

Meyers et al., "The Downloader's Companion for Windows," Prentice Hall PTR, 1995.

Miami Staff, "Grindr Anyone?" Miami Herald, Mar. 26, 2010, retrieved from https://www.miamiherald.com/miami-com/things-to-do/article225856080.html.

Miller, "Take a Step Closer for an Invitation to Shop," New York Times, Feb. 22, 2010, retrieved from https://www.nytimes.com/2010/02/23/business/media/23adco.html.

Millhollon et al., "Microsoft Internet Explorer 3.0 F," Coriolis Group, 1996, available at: https://archive.org/details/microsoftinterne0000mill/.

Mladenic, "Machine Learning Used by Personal WebWatcher," Proceedings of ACAI-99 Workshop on Machine Learning and Intelligent Agents, 1999.

Mladenic, "Personal WebWatcher: Design and Implementation," Technical Report IJS-DP-7472, 1996.

Mladenic, "Text Learning and Related Intelligent Agents: A Survey," IEEE Intelligent Systems and Their Applications, 1999, pp. 44-54, vol. 14, Issue 4.

Mladenic, "Machine Learning for Better Web Browsing," AAAI Technical Report SS-00-01, 2000.

Mladenic, "Using Text Learning to Help Web Browsing," Proceedings of the Ninth Int'l Conf. on Human-Computer Interaction, 2001.

Mobasher et al., "Integrating Web Usage and Content Mining for More Effective Personalization," EC-Web 2000: Proceedings of the First International Conference on Electronic Commerce and Web Technologies, 2000.

MyExperience, Jun. 1, 2007, retrieved from www.myexperience.sourceforge.net.

Newcomb, "Yahoo SmartAds: Super-Targeted Display Ads," Search Engine Watch, Jul. 2, 2007, retrieved from https://www.searchenginewatch.com/2007/07/02/yahoo-smartads-super-targeted-display-ads/.

Olston et al., "ScentTrails: Integrating Browsing and Searching on the Web," ACM Transactions on Computer-Human Interactions, 2003, pp. 1-21, vol. 10, No. 3.

Paliouras et al., "PNS: A personalized news aggregator on the web," Intelligent Interactive Systems in Knowledge-based Environments, 2008.

Paliouras et al., "PNS: Personalized multi-source news delivery," International Conference on Knowledge-Based and Intelligent Information and Engineering Systems, 2006.

Pant et al., "Crawling the Web," Web Dynamics, 2004, Springer, Berlin, Germany.

Patel, "Pebble Smartwatch Review," The Verge, Jan. 28, 2013, retrieved from https://www.theverge.com/2013/1/28/3924904/pebble-smartwatch-review.

Pazzani et al., "Adaptive Web Site Agents," Autonomous Agents and Multi-Agent Systems, 2002, Kluwer Academic.

Pazzani et al., "Syskill and Webert: Identifying Interesting Websites," AAAI-96 Proceedings, 1996, pp. 54-61.

Pazzani et al., "Learning and Revising User Profiles: The Identification of Interesting Web Sites," Machine Learning, 1997, pp. 313-331, vol. 27.

Pazzani et al., "Machine Learning for User Modeling," User Modeling and User-Adapted Interaction, 2001, pp. 19-29, vol. 11.

Perkowitz, "Adaptive Web Sites: Conceptual Cluster Mining," 1999.

Perkowitz, "Towards Adaptive Web Sites: Conceptual Framework and Case Study," 2000.

Petersen et al., "PALLAS: Personalised Language Learning on Mobile Devices," Fifth IEEE International Conference on Wireless, Mobile, and Ubiquitous Technology in Education, 2006.

Piquepaille, "A phone that tells you what to do," ZDNet, Nov. 14, 2007, retrieved from https://www.zdnet.com/article/a-phone-that-tells-you-what-to-do.

Pirolli et al., "Silk from a Sow's Ear: Extracting Usable Structures from the Web," Conference on Human Factors in Computing Systems (CHI '96), Apr. 13-18, 1996.

Pitkow et al., "Mining Longest Repeating Subsequences to Predict World Wide Web Surfing," Proceedings of USITS' 99: The 2nd USENIX Symposium on Internet Technologies & Systems, 1999.

Pokraev et al., "Service Platform for Rapid Development and Deployment of Context-Aware, Mobile Applications," Jul. 11-15, 2005, IEEE International Conference on Web Services (ICWS'05), vol. 646.

Prasad, "Magitti: The Intelligent Mobile Platform," Geospatial World, Nov. 24, 2010, retrieved from https://www.geospatialworld.net/article/magitti-the-intelligent-mobile-platform/.

Ramakrishnan, "The PointCast Network," PointCast Inc., retrieved from https://dl.acm.org/doi/abs/1 0.1145/276304.276361.

Rao, "Placecast Brings Location-Based Shopping Alerts to Retailer Smartphone Apps," TechCrunch, Aug. 22, 2011, retrieved from https://techcrunch.com/2011/08/22/placecast-brings-location-based-shopping-alerts-to-smartphone-apps/.

Rello et al., "Detecting Readers with Dyslexia Using Machine Learning with Eye Tracking Measures," May 18-20, 2015; W4A'15—Proceedings of the 112th Web For All Conference, pp. 1-8 (2015).

Ricci, "Mobile Recommender Systems," Information & Technology Tourism, 2010.

Riggsby et al., "Mastering Lotus Notes and Domino 6," Sybex, 2003.

Rodriguez, "RESTful Web Services: The Basics," IBM DeveloperWorks, 2008.

Saint, "What is Foursquare And How Do I Use it?" Business Insider, Jan. 28, 2010, retrieved from https://www.businessinsider.com/how-hit-location-based-social-app-foursquare-works-2010-1.

Schonfeld, "Liveblogging Facebook Advertising Announcement (Social Ads + Beacon + Insights)," Tech Crunch, Nov. 6, 2007, retrieved from https://techcrunch.com/2007/11/06/liveblogging-facebook-advertising- announcement/.

Schwab et al., "Adaptivity through Unobtrusive Learning," Special Issue on Adaptivity and User Modeling, 2002.

Schwinger et al., "Context-awareness in Mobile Tourism Guides—A Comprehensive Survey," 2005, Johannes Kepler Universität Linz, Technische Universität Wien.

Seo et al., "Learning User's Preferences by Analyzing Web-Browsing Behaviors," Proceedings of the Fourth International Conference on Autonomous Agents, 2000.

(56) References Cited

OTHER PUBLICATIONS

Shahabi et al., "A Framework for Efficient and Anonymous Web Usage Mining Based on Client- Side Tracking," WebKDD 2001—International Workshop of Mining Web Log Data Across All Customer Touch Points, 2002.
Shahabi et al., "Knowledge Discovery from Users Web-Page Navigation," Proceedings of the Seventh International Workshop of Research Issues in Data Engineering. High Performance Database Management for Large-Scale Applications, 1997.
Shapira et al., "ePaper—the Personalized Mobile Newspaper," J. Am. Soc. Info. Sci. & Tech., 2009, vol. 60.
Sharp et al., "Establishing Requirements for a Mobile Learning System," Mobilearn Case Study 10.2, 2007.
Sharples et al., "Big Issues in Mobile Learning," Report of a Workshop by Kaleidoscope Network of Excellence Mobile Learning Initiative, 2006.
Sharples et al., "Towards a Theory of Mobile Learning," MLEARN, 2005.
Srivastava et al., "Web Usage Mining: Discovery and Applications of Usage Patterns from Web Data," ACM SIGKDD, Jan. 2000.
Sterling, "New SmartAds: The Future of Graphical Advertising at Yahoo," Search Engine Land, Jul. 2, 2007, retrieved from https://searchengineland.com/new-smartads-the-future-of-graphical-advertising-at-yahoo-11607.
Stern, "Pebble Watch: Behind the Smartwatch Sensation," ABC News, Jul. 10, 2012, retrieved from https://abcnews.go.com/Technology/pebble-watch-smartwatch-iphone-android/story?id=16750944.
Stevens, "Nike + iPod Sports Kit review," CNET, Jan. 23, 2007, retrieved from https://www.cnet.com/reviews/nike-plus-ipod-sport-kit-review/.
Sugiyama et al., "Adaptive Web Search Based on User Profiles Constructed without Any Effort from Users," WWW 2004, 2004.
Takeuchi et al., "An Outdoor Recommendation System based on User Location History," ubiPCMM, 2006, retrieved from https://citeseerx.ist.psu.edu/viewdoc/download?doi=10.1.1.91.813&rep=rep1&type=pdf.
TechMeme, 2010, available at www.techmeme.com.
Technorati, 2010, available at www.technorati.com.
Theobald et al., "BINGO! And DAFFODIL: Personalized Exploration of Digital Libraries and Web Sources," 2004.
Van Setten et al., "Context-Aware Recommendations in the Mobile Tourist Application COMPASS," Proceedings of the Adaptive Hypermedia and Adaptive Web-Based Systems, Third International Conference, and Lecture Notes in Computer Science, 2004, pp. 235-244, vol. 3137, Springer-Verlag Berlin Heidelberg.
Verbert et al., "Context-Aware Recommender Systems for Learning: A Survey and Future Challenges," IEEE Transactions on Learning Technologies, 2012.
Vo et al., "A Survey of Context-Aware Recommendation Systems," Semantic Scholar, 2013.
Vrettos et al., "A Fuzzy Rule-Based Agent for Web Retrieval-Filtering," WI 2001: Web Intelligence: Research and Development, 2001.
Wancho, "Digest Message Format," 1990.
Wang et al., "Unified relevance models for rating prediction in collaborative filtering," ACM Transactions on Information Systems, 2008.
Wang et al., "Unifying user-based and item-based collaborative filtering approaches by similarity fusion," Proceedings of the 29th annual international ACM SIGIR Conference on Research and Development in Information Retrieval, 2006.
Wang, "Beginning Programming for Dummies," 1999, IDG Books Worldwide, Inc.
Wattanajantra, "Nike+ GPS app for iPhone: Track runs without a sensor in your shoe," CNET, Sep. 8, 2010, retrieved from https://www.cnet.com/news/nike-gps-app-for-iphone-track-runs-without-a-sensor-in-your-shoe/.
We Smirch, 2010, available at www.wesmirch.com.
WebGlimpse Website, retrieved from https://web.archive.org/web/20000815205534/http://webglimpse.org:80/.
WebMate website, retrieved from https://web.archive.org/ web/20010210064517/http://www.cs.cmu.edu/~softagents/webmate/Introduction.html.
Weiss, "A Hierarchical Network Search Engine that Exploits Content-Link Hypertext Clustering," 1996.
Wilkinson, "Flickr Mashups," Wiley Publishing, Inc., 2007.
Williams et al., "Role of a Personal Assistant in Delivering Personalised Context-Aware Services to Young People," 2002, retrieved from https://citeseerx.ist.psu.edu/viewdoc/download?doi=10.1.1.11.8614&rep=rep1&type=pdf.
Wolber et al., "Exposing Document Context in the Personal Web," IUI '02: 7th International Conference on Intelligent User Interfaces, Jan. 13-16, 2002.
Wolber, "Navigating to Personal Web," JCDL Conference '04, 2004.
Wortham, "How Grindr is Changing the Way We Connect," The New York Times Mar. 10, 2013, retrieved from https://bits.blogs.nytimes.com/2013/03/10/how-grindr-is-changing-the-way-we-all-connect/.
Wu, "SpeedTracer: A Web Usage Mining and Analysis Tool," 1998.
Xiang et al., "Temporal Recommendation on Graphs via Long- and Short-term Preference Fusion," ACM KDD '10, Jul. 25-28, 2010.
Yan et al., "From User Access Patterns to Dynamic Hypertext Linking," Computer Networks and ISDN Systems, 1996.
Yao et al., "PagePrompter: An Intelligent Agent for Web Navigation Created Using Data Mining Techniques," 2002.
Yao et al., "PagePrompter: An Intelligent Web Agent Created Using Data Mining Techniques, Rough Sets and Current Trends in Computing," Third International Conference RSTC, 2002, pp. 506-513.
Yao et al., "Personalized Recommendation on Multi-Layer Context Graph," 2013, Springer-Verlag Berlin Heidelberg.
Yau et al., "A context-aware and adaptive learning schedule framework for supporting learners' daily routines," Second International Conference on Systems, 2007.
Yeung et al., "A proactive personalised mobile recommendation system using analytic hierarchy process and Bayesian network," J. Internet Serv. Appl. 2012, p. 195-214, retrieved from https://link.springer.com/article/10.1007/s13174-012-0061-3.
Young, "Getting the Message: How the Internet is Changing Advertising," Harvard Business School, retrieved at https://hbswk.hbs.edu/item/ getting-the-message-how- the-internet-is-changing- advertising.
Zabala et al., "CALVIN: A Personalized Web-Search Agent based on Monitoring User Actions," GI Jahrestagung, 2001.
Zafra, "Yahoo! Steps Up Online Advertising with SmartAds," Search Engine Journal, Jul. 2, 2007, retrieved from https://www.searchenginejournal.com/yahoo-steps-up-online-advertising-with-smartads/5245/#close.
Zaiane et al., "Discovering Web Access Patterns and Trends by Applying OLAP and Data Mining Technology on Web Logs," Proceedings IEEE International Forum on Research and Technology Advances in Digital Libraries—ADL '98, 1998.
Zee, "Foursquare who? 'Gowalla' might just be where it's at.," Gowalla, Sep. 22, 2009, retrieved from https://thenextweb.com/2009/09/22/square-gowalla/.
Zeff et al., "Advertising on the Internet," Robert Ipsen, 1999.
Zheng et al., "Collaborative Location and Activity Recommendations with GPS History Data," ACM International Conference on World Wide Web, 2010, pp. 1029-1038.
Zuckerman, "Convention Highlights 'Push' Software for Web Browsers," Technology Cybertimes, New York Times, Feb. 16, 1996, retrieved from https://archive.nytimes.com/www.nytimes.com/library/cyber/week/1209software.html.
Vo et al., "Towards Context-Aware Task Recommendation," 2009 Joint Conferences on Pervasive Computing (JCPC). doi:10.1109/jcpc.2009.5420173 (2009).
Hastie et al., "Automatic Evaluation: Using a DATE Dialogue Act Tagger for User Satisfaction and Task Completion," 2002, Proc. Lang. Resources Eval. Conf. pp. 1-8 (2002).

(56) References Cited

OTHER PUBLICATIONS

Elvazi et al., "Predicting Problem-Solving Behavior and Performance Levels from Visual Attention Data," Feb. 13, 2012, 2nd Workshop on Eye Gaze in Intelligent Human Machine Interaction, pp. 9-16 (2012).
Ratwani et al., "A Real-Time Eye Tracking System for Predicting and Preventing Postcompletion Errors," Human-Computer Interaction, vol. 26, pp. 205-245 (2011).
Excerpts from Microsoft Computer Dictionary, 5th ed., pp. 1-15, 2002.
Excerpts from The New Penguin Dictionary of Computing, pp. 1-9, 2001.
Wang, excerpts from "Beginning Programming for Dummies," IDG Books Worldwide, Inc. (pub.), pp. 1-40, 1999.
Wolfe, U.S. Appl. No. 60/819,576, filed Jul. 10, 2006, pp. 1-27.
Affidavit of Duncan Hall, pp. 1-18, 2021.
Affidavit of Duncan Hall, pp. 1-21, 2021.
Affidavit of Duncan Hall, pp. 1-23, 2021.
Affidavit of Duncan Hall, pp. 1-7, 2021.
Affidavit of Duncan Hall, pp. 1-14, 2021.
Affidavit of Duncan Hall, pp. 1-60 (part 1 of 2).
Affidavit of Duncan Hall, pp. 1-79 (part 2 of 2).
Declaration of Bamshad Mobasher for U.S. Pat. No. 7,043,475, pp. 1-53, 2021.
Declaration of Christopher M. Schmandt for U.S. Pat. No. 8,489,599 pp. 1-154, 2021.
Declaration of Christopher M. Schmandt for U.S. Pat. No. 8,732,584, pp. 1-105, 2021.
Declaration of Christopher M. Schmandt for U.S. Pat. No. 9,137,190 pp. 1-173, 2021.
Declaration of Christopher M. Schmandt for U.S. Pat. No. 9,208,439, pp. 1-119, 2021.
Declaration of Duncan Hall for U.S. Pat. No. 7,043,475, pp. 1-13, 2021.
Declaration of Edward A. Fox for U.S. Pat. No. 7,043,475, pp. 1-290, 2021.
Declaration of Edward A. Fox for U.S. Pat. No. 8,606,781, pp. 1-288, 2021.
Declaration of Gordon MacPherson for U.S. Pat. No. 8,489,599, pp. 1-14, 2021.
Declaration of Megan Raymond for U.S. Pat. No. 7,043,475, pp. 1-3, 2021.
Declaration of Michael F. Milea for U.S. Pat. No. 7,043,475, pp. 1-3, 2021.
Declaration of Michael F. Milea for U.S. Pat. No. 8,489,599, pp. 1-31, 2021.
Declaration of Sayem Osman for U.S. Pat. No. 7,043,475, pp. 1-7, 2021.
Declaration of Sayem Osman for U.S. Pat. No. 8,489,599, pp. 1-8, 2021.
Declaration of Sayem Osman for U.S. Pat. No. 9,208,439, pp. 1-8, 2021.
Declaration of Steve Smoot for U.S. Pat. No. 8,489,599, pp. 1-137, 2021.
Declaration of Steve Smoot for U.S. Pat. No. 9,208,439, pp. 1-142, 2021.
Declaration of Sylvia Hall-Ellis for U.S. Pat. No. 7,043,475, pp. 1-385, 2021.
Declaration of Sylvia Hall-Ellis for U.S. Pat. No. 8,489,599, pp. 1-101, 2021.
Declaration of Sylvia Hall-Ellis for U.S. Pat. No. 8,606,781, pp. 1-157, 2021.
Declaration of Sylvia Hall-Ellis for U.S. Pat. No. 8,732,584, pp. 1-122, 2021.
Declaration of Sylvia Hall-Ellis for U.S. Pat. No. 9,137,190, pp. 1-151, 2021.
Declaration of Sylvia Hall-Ellis for U.S. Pat. No. 9,208,439, pp. 1-123, 2021.
Declaration of Tanya S. Manno for U.S. Pat. No. 7,043,475, pp. 1-3, 2021.
Expert Declaration of Don Turnbull PhD for U.S. Pat. No. 7,043,475, pp. 1-439, 2021.
Expert Declaration of Don Turnbull PhD for U.S. Pat. No. 8,489,599, pp. 1-565, 2021.
Expert Declaration of Don Turnbull PhD for U.S. Pat. No. 9,208,439, pp. 1-353, 2021.
Complaint for Patent Infringement, Case No. 2:20-cv-10753, *Palo Alto Research Center Inc.* v. *Facebook, Inc.*, pp. 1-70, 2021.
Complaint for Patent Infringement, Case No. 2:20-cv-10754, *Palo Alto Research Center Inc.* v. *Twitter, Inc.*, pp. 1-61, 2021.
Complaint for Patent Infringement, Case No. 2:20-cv-10755, *Palo Alto Research Center Inc.* v. *Snap Inc.*, pp. 1-31, 2021.
Order re: Joint Stipulation Re Stay Pending Inter Partes Review, Case No. 2:20-cv-10753-AB-MRW, pp. 1-2, 2021.
Order re: Joint Stipulation Re Stay Pending Inter Partes Review, Case No. Case No. 2:20-cv-10754-AB-MRW, pp. 1-2, 2021.
Plaintiff's Disclosure of Asserted Claims and Infringement Contentions, Exhibit FB04, U.S. Pat. No. 8,606,781, *Palo Alto Research Center Inc.* v. *Facebook, Inc.*, Case No. 2:20-cv-10753-AB (C.D. Cal.), pp. 1-123.
Plaintiff's Disclosure of Asserted Claims and Infringement Contentions, Exhibit SN01, U.S. Pat. No. 8,489,599, *Palo Alto Research Center Inc.* v. *Snap, Inc.*, Case No. 2:20-cv-10755-AB (C.D. Cal.), pp. 1-99.
Plaintiff's Disclosure of Asserted Claims and Infringement Contentions, Exhibit SN02, U.S. Pat. No. 9,208,439, *Palo Alto Research Center Inc.* v. *Snap, Inc.*, Case No. 2:20-cv-10755-AB (C.D. Cal.), pp. 1-74.
Plaintiff's Disclosure of Asserted Claims and Infringement Contentions, Exhibit TW01, U.S. Pat. No. 8,489,599,, *Palo Alto Research Center Inc.* v. *Twitter, Inc.*, Case No. 2:20-cv-10754-AB (C.D. Cal.), pp. 1-133.
Wayback Machine Capture of "5 Tips for Creating an Advertisement on Facebook," retrieved from URL: https://web.archive.org/web/20111111002017/http:/www.advertisementinfacebook.com/advertisement-for-facebook.html, 2 pgs. (Nov. 11, 2011).
Abraham, "Business Intelligence from Web Usage Mining," Journal of Information & Knowledge Management, vol. 2, No. 4, pp. 375-390 (2003).
Screen Capture of "About PlaceIQ," retrieved from URL: https://www.placeiq.com/about-placeiq, 1 pg. (2012).
Wayback Machine Capture of "Alarm Clock 2: What's New," retrieved from URL: https://web.archive.org/web/20071011034402/http://robbiehanson.com/alarmclock/whatsNew.html, 5 pgs. (Oct. 11, 2007).
Wayback Machine Capture of "Alarm Clock 2: FAQ," retrieved from URL: https://web.archive.org/web/20071011034339/http://robbiehanson.com/alarmclock/faq.html, 4 pgs. (2007).
Wayback Machine Capture of "Alarm Clock 2: Index," retrieved from URL: https://web.archive.org/web/20060208031527/http://www.robbiehanson.com/alarmclock/index.html, 2 pgs. (2006).
Wayback Machine Capture of "Alarm Clock 2: Index," retrieved from URL: https://web.archive.org/web/20071011022121/http://www.robbiehanson.com/alarmclock/index.html, 2 pgs. (2007).
Wayback Machine Capture of "Alarm Clock 2: Screen Shots," retrieved from URL: https://web.archive.org/web/20071011044752/http://www.robbiehanson.com/alarmclock/screenShots.html, 2 pgs. (2007).
Wayback Machine Capture of "AdRevolver Banner Manager," retrieved from URL: https://web.archive.org/web/20020204042004/http://www.adrevolver.com:80/banner_manager/about.htm, 1 pg. (Feb. 4, 2002).
Wayback Machine Capture of "AdRevolver Banner Manager: FAQ," retrieved from URL: https://web.archive.org/web/20020204042401/http:/www.adrevolver.com/banner_manager/faq.htm, 3 pgs. (2002).
Wayback Machine Capture of "Advertisement in Facebook Information," retrieved from https://web.archive.org/web/20111112062703/http:/www.advertisementinfacebook.com/index.html, 2 pgs. (Nov. 11, 2011).
"Advisory Opinion re: Petition No. S050314A," New York State Department of Taxation and Finance, Office of Tax Policy Analysis Taxpayer Guidance Division, retrieved from URL: https://www.tax.ny.gov/pdf/ advisory_opinions/sales/a08_28s.pdf, 6 pgs. (2008).

(56) References Cited

OTHER PUBLICATIONS

Albino, M., "GPS-tracking apps: Helicopter parenting or smart solution?" Today's Parent, retrieved from URL: https://www.todaysparent.com/family/gps-tracking-kids, 4 pgs. (Nov. 1, 2013).
"Alcatel-Lucent, 1020 Placecast partner on location-based mobile advertising," Marketing Dive, retrieved from URL: https://www.marketingdive.com/ex/mobilemarketer/cms/news/advertising/3305.html, 4 pgs. (2009).
Wayback Machine Capture of "Advertiser Analytics: Twitter for Business," retrieved from URL: https://web.archive.org/web/20120930215459/https:/ business.twitter.com/en/advertise/analytics/, 3 pgs. (Sep. 30, 2012).
Wayback Machine Capture of "Analytics," Twitter, retrieved from URL: https://web.archive.org/web/20130307212005/https:/business.twitter.com/products/analytics-self-service, 3 pgs. (Mar. 7, 2013).
Wayback Machine Capture of "Announcing the Twitter Ads API," retrieved from URL: https://web.archive.org/web/20130223180647/http:/advertising.twitter.com/2013/02/announcing-twitter-ads-api_20.html, 3 pgs. (Feb. 23, 2013).
Wayback Machine Capture of "API Integration," retrieved from URL: https://web.archive.org/web/20120209174437/https:/business.twitter.com/en/optimize/api, 2 pgs. (Feb. 9, 2012).
"Apple introduces the New iPhone 3G," Apple Newsroom, retrieved from URL: https://www.apple.com/newsroom/2008/06/09Apple-introduces-the-New-iPhone-3G, 4 pgs. (Jun. 9, 2008).
Armstrong et al., "WebWatcher: A Learning Apprentice for the World Wide Web," 1995 AAAI Spring Symposium on Information Gathering from Heterogenous, Distributed Environments, 7 pgs. (1995).
Aun, F., "DoubleClick Aims to Give Deeper Insight into Rich Media Effectiveness," Click Z, retrieved from URL: https://www.clickz.com/doubleclick-aims-to-give-deeper-insight-into-rich-media-effectivness/58863, 13 pgs. (Jan. 7, 2008).
Balabanovic et al., "FAB: Content-Based, Collaborative Recommendation," Communications of the ACM, vol. 40, No. 3, 7 pgs. (1997).
Wayback Machine Capture of "BallBug," 6 pgs., retrieved from URL: https://web.archive.org/web/20080105010049/ http://ballbug.com:80/#a071102p10, 10 pgs. (2008).
Banerjee et al., "Clickstream Clustering using Weighted Longest Common Subsequences," Proceedings of the Web Mining Workshop at the 1st SIAM Conference on Data Mining, 8 pgs. (Apr. 5-7, 2001).
Bausch et al., excerpts from "Flickr Hacks," O'Reilly Media, Inc. (pub.), 12 pgs. (2006).
Beale et al., "Mobile Context Aware Systems: The Intelligence to Support Tasks and Effectively Utilise Resources," Mobile HCI 2004: Mobile Human-Computer Interaction—MobileHCI 2004, DOI:10.1007/978-3-540-28637-0_21, 12 pgs. (2004).
"Bear Group's Experience with DoubleClick," retrieved from URL: https://www.beargroup.com/system-integrations/ad-servers/doubleclick, 3 pgs. (2007).
Bellotti et al., "Activity-Based Serendipitous Recommendations with the Magitti Mobile Leisure Guide," CHI 2008 Proceedings, 10 pgs. (2008).
Belqasmi et al., "RESTful Web Services for Service Provisioning in Next-Generation Networks: A Survey," IEEE Communications Magazine, vol. 49, iss. 12, 8 pgs. (2011).
Ben-Shaul et al., "Adding support for dynamic and focused search with Fetuccino," Elsevier Science B. V. (pub.), 13 pgs. (1999).
Berendt et al., "Towards Semantic Web Mining," The Semantic Web—ISWC, ISWC 2002 Lecture Notes in Computer Science, 15 pgs., (2002).
Bharat et al., "Personalized, interactive news on the Web," Multimedia Systems 6, 22 pgs. (1997).
Bharat et al., "Personalized, interactive news on the Web," Multimedia Systems 6, pp. 349-358, https://doi.org/10.1007/s005300050098] (1998).

Wayback Machine Capture of "Blogniscient," retrieved from URL: https://web.archive.org/web/20070704140750/ http://www.blogniscient.com/tb.html, 8 pgs. (2007).
Wayback Machine Capture of "BlogRunner," retrieved from URL: https://web.archive.org/web/20080614113547/ http://www.blogrunner.com, 10 pgs. (2008).
Bogers, T., "Movie Recommendation Using Random Walks over the Contextual Graph," Information Systems & Interactive Design; Royal School of Library and Information Science, 5 pgs. (2010).
Butler, D., "Scientists Get Online News Aggregator," Nature, vol. 453, No. 26 [e! Science News: www.esciencenews.com], 1 pg. (Jun. 2008).
Callihan, S., excerpts from "Learn HTML In a Weekend," Prima Publishing, [Part 1 of 2, 103 pgs.] (1998).
Callihan, S., excerpts from "Learn HTML In a Weekend," Prima Publishing, [Part 2 of 2, 87 pgs.] (1998).
Carlson, "Eclipse Distilled," Addison-Wesley, pub., 12 pgs. (2005).
Wayback Machine Capture of "Certified Products," retrieved from URL: https://web.archive.org/web/20130307212611/https:/dev.twitter.com/programs/twitter-certified-products/products, 5 pgs. (Mar. 7, 2013).
Cetintemel et al., "Self-Adaptive User Profiles for Large Scale Data Delivery," ICDE '00: Proceedings of the 16th International Conference on Data Engineering, 12 pgs. (2000).
Chakrabarti et al., "Focused crawling: a new approach to topic-specific Web resource discovery," WWW '99 Proceedings of the Eighth International Conference on World Wide Web, 18 pgs., (1999).
Chang et al., "Mining the World Wide Web: An Information Search Approach," The Kluwer International Series on Information Retrieval, 179 pgs. (2001).
Chen et al., "WebMate: A Personal Agent for Browsing and Searching, " The Robotics Institute Carnegie Mellon University, 16 pgs., (1997).
Chen et al., "Multi-Modal Browsing of Images in Web Documents," Proceedings vol. 3651, Document Recognition and Retrieval VI; DOI:10.1117/12.335809 [Event: Electronic Imaging '99, 1999, San Jose, CA, United States], 12 pgs. (1999).
Chi et al., "An Operator Interaction Framework for Visualization Systems," Proceedings IEEE Symposium on Information Visualization (Cat. No.98TB100258), DOI: 10.1109/INFVIS.1998.729560, 8 pgs. (1998).
Chi et al., "Using Information Scent to Model User Information Needs and Actions on the Web," ACM SIGCHI'01, Mar. 31-Apr. 4, 2001, Seattle, WA, USA, 8 pgs., (2001).
Chi et al., "LumberJack: Intelligent Discovery and Analysis of Web User Traffic Composition," WEBKDD 2002—Mining Web Data for Discovering Usage Patterns and Profiles Conference, 15 pgs. (Jul. 23, 2002).
Chirita et al., "PROS: A Personalized Ranking Platform for Web Search," AH 2004: Adaptive Hypermedia and Adaptive Web-Based Systems, 10 pgs. (2004).
Wayback Machine capture of "Citysense," retrieved from URL: https://web.archive.org/web/20080922000635/http://www.sensenetworks.com:80/citysense.php, 2 pgs. (Sep. 22, 2008).
Wayback Machine Capture of "Cloudee Alpha—About," retrieved from URL: https://web.archive.org/web/20080227033022/ http://www.cloudee.com:80/about.php, 1 pg. (2008).
Wayback Machine Capture of "Cloudee Alpha," retrieved from URL: https://web.archive.org/web/20080227033020/ http://www.cloudee.com:80, 2 pgs. (2008).
Coburn, "Gowalla for the iPad: Map Views and Consumption," The Next Web, retrieved from https://thenextweb.com/insider/2010/05/01/gowalla-ipad-map-views-consumption, 6 pgs. (May 1, 2010).
Collection of Flickr web pages publicly available on archive.org, 69 pgs. (2009).
Collins, T., excerpts from "The Little Book of Twitter," Michael O'Mara Books, 5 pgs. (2009).
Collection of LiveJournal web pages publicly available on archive.org, (2008). (Pt. 1-171 pgs.).
Collection of LiveJournal web pages publicly available on archive.org, (2008). (Pt. 2-174 pgs.).

(56) References Cited

OTHER PUBLICATIONS

Collection of MySpace web pages publicly available on archive.org, 32 pgs. (2009).
Cooley, R. et al., "Data Preparation for Mining World Wide Web Browsing Patterns," Knowledge and Information Systems 1, DOI:10.1007/BF03325089, 28 pgs. (1999).
Cooley, R. et al., "Discovery of Interesting Usage Patterns from Web Data," International Workshop on Web Usage Analysis and User Profiling, WebKDD 1999, 20 pgs. (1999).
Cooley, R et al., "Web Mining: Information and Pattern Discovery on the World Wide Web," Proceedings Ninth IEEE International Conference on Tools with Artificial Intelligence, DOI:10.1109/TAI.1997.632303, 10 pgs. (1997).
Cradler, D., excerpts from "Hacker's Guide to Navigator," Waite Group Press, Corte Madera, California, USA, 25 pgs. (1997).
Curtiss et al., "Unicorn: A System for Searching the Social Graph," Proc. Of the VLDB Endowment, vol. 6, No. 11, The 39th International Conference on Very Large Data Bases, 12 pgs. (Aug. 26-30, 2013).
Fuhr, N., "DAFFODIL (Distributed Agents for User-Friendly Access of Digital Libraries): The Underlying Concepts," Univ. of Duisburg-Essen, Germany, PowerPoint presentation, 38 pgs. (Feb. 27, 2004).
Dargie, W. (ed.), "Context-Aware Computing and Self-Managing Systems," CRC Press, 202 pgs. (2009).
Wayback Machine Capture of "Daylife.com," retrieved from URL: https://web.archive.org/web/20080317095538/http://www.daylife.com:80, 3 pgs. (2008).
Dey et al., "CybreMinder: A Context-Aware System for Supporting Reminders," International Symposium on Handheld and Ubiquitous Computing, HUC 2000: Handheld and Ubiquitous Computing, DOI: 10.1007/3-540-39959-3_13f, 15 pgs. (2000).
Dickinson, "Why Gay Guys Love Using Grindr to Hook Up And Make Friends," Business Insider, retrieved from URL: https://www.businessinsider.com/why-gay-guys-love-using-grindr-to-hook-up-and-make-friends-2012-1, 9 pgs. (Feb. 14, 2012).
Diligenti et al., "Focused Crawling Using Context Graphs," Proceedings of the 26th VLDB Conference, Cairo, Egypt, 8 pgs. (2000).
Wayback Machine Capture of "Documentation: Twitter Developers," retrieved from URL: https://web.archive.org/web/20110713041412/https://dev.twitter.com/docs, 2 pgs. (Jul. 13, 2011).
Screen Capture of "Doubleclick Inc.," Encyclopedia.com, retrieved from URL: https://www.encyclopedia.com/economics/encyclopedias-almanacs-transcripts-and-maps/doubleclick-inc, 8 pgs. (2001).
Downey, S. "Minority Report advertising is already here: privacy at CES 2013, Day 1," Abine.com, retrieved from URL: https://www.abine.com/blog/201 3/privacy-at-ces-day-1, 4 pgs. (Jan. 9, 2013).
Wayback Machine Capture of "Eclipse.org," retrieved from URL: https://web.archive.org/web/20080307093622 /https://www.eclipse.org, 1 pg. (2008).
El-Bishouty et al., "PERKAM: Personalized Knowledge Awareness Map for Computer Supported Ubiquitous Learning," Educational Technology & Society, vol. 10, No. 3, 13 pgs. (2007).
"ESRI's Geospatial Computer-Aided Dispatch," ESRI White Paper, J-9699, 24 pgs., (Dec. 2007).
Wayback Machine Capture of "Fab" homepage, available at URL: https://web.archive.org/web/19971021223905/http://fab.stanford.edu:80, 1 pg. (Oct. 21, 1997).
Wayback Machine Capture of "Facebook Unveils Facebook Ads," retrieved from URL: www.about.fb.com/news/2007/11/ facebook-unveils-facebook-ads, 7 pgs. (Nov. 6, 2007).
Fitton et al., excerpts from "Twitter for Dummies," Wiley Publishing, Inc., 27 pgs. (2009).
Doubliclick, Inc. 1999 Form 10-K Annual Report, retrieved from URL: http://media.corporate-ir.net/media_files/NSD/DCLK/reports/10k99.pdf, 77 pgs. (retrieved 2007).
Forrest, "Citysense: Lets You Know What Everybody's Doing," retrieved from URL: https://web.archive.org/web/ 20080701034213/http://radar.oreilly.com/archives/2008/06/citysense-reality-mining-iphone.html, 4 pgs. (2008).

"Foursquare's 1st Pitch Deck," retrieved from URL: https://www.slideshare.net/alkarmi/foursquare-1stpitch2009, 15 pgs. (2009).
Freitag, D. et al., "WebWatcher: Knowledge Navigation in the World Wide Web," AAAI Technical Report FS-95-03, 1 pg., (1995).
Froelich, J. et al., "MyExperience: A System for In situ Tracing and Capturing of User Feedback on Mobile Phones," MobiSys '07: Proceedings of the 5th international conference on Mobile systems, applications and services, DOI:10.1145/1247660.1247670, 14 pgs. (Jun. 2007).
Gaudin, S., "New PARC software turns a cell phone into a personal assistant," Computerworld, 3 pgs., (Nov. 21, 2007).
Wayback Machine Capture of "Gender targeting for Promoted Products now available," retrieved from URL: https://web.archive.org/web/20121028010012/http:/advertising.twitter.com/2012/10/gendertargeting-for-promotedproducts.html, 3 pgs. (Oct. 28, 2012).
Wayback Machine Capture of "Geo Developer Guidelines," retrieved from URL: https://web.archive.org/web/20110713045612/https://dev.twitter.com/terms/geo-developerguidelines, 3 pgs., (Jul. 13, 2011).
Wayback Machine Capture of "GET geo/search," retrieved from URL: https://web.archive.org/web/20110713042853/https://dev.twitter, 3 pgs. (Jul. 13, 2011).
Wayback Machine Capture of "GET search," retrieved from URL: https://web.archive.org/web/20111223105655/https:/dev.twitter.com/docs/api/1/get/search, 11 pgs. (Dec. 23, 2011).
Wayback Machine Capture of "Getting Started," retrieved from URL: https://web.archive.org/web/20110713043554/https://dev.twitter.com/start, 2 pgs. (Jul. 13, 2011).
Giles, "How to Use Flickr: The Digital Photography Revolution," Thomson Course Technology PTR (pub.), 20 pgs. (2006).
"Gimbal REST API," Gimbal Inc., retrieved from URL: https://docs.gimbal.com/rest.html, 9 pgs. (2013).
Glinton, S., "From Grindr Team, a Meet-'N'-Greet App for the Rest," WBUR News, retrieved from https://www.wbur.org/npr/143585501/from-grindr-team-a-meet-n-greet-app-for-the-rest, 8 pgs. (Dec. 12, 2011).
Wayback Machine Capture of "GNIP," retrieved from URL: https://web.archive.org/web/20121214215529/https:/dev.twitter.com/programs/twitter-certified-products/gnip, 3 pgs. (Dec. 14, 2012).
Google Scholar results for 2001-2002 articles citing Jeffrey Heer and Ed H. Chi, "Identification of Web User Traffic Composition Using Multi-Modal Clustering and Information Scent," published as part of the Proceedings of the Workshop on Web Mining, First SIAM Conference on Data Mining (SMD 2001), Chicago, Illinois; retrieved from URL: https://scholar.google.com/scholar?cluster=18250606965757252436&hl=en&as_sdt=400005&sciodt=0,14&as_ylo=2001&as_yhi=2002, 4 pgs. (Apr. 7, 2001).
Screen Capture of "Gowalla," retrieved from URL: https://en.wikipedia.org/wiki/Gowalla, 3 pgs. (2021).
Greene, "Smart Phone Suggests Things to Do," MIT Technology Review, retrieved from URL: https://www.technologyreview.com/2007/11/13/128685/smart-phone-suggests-things-to-do/, 10 pgs. (Nov. 13, 2007).
Greene, K. "Mapping a City's Rhythm—MIT Technology Review," MIT, retrieved from URL: https://www.technologyreview.com/s/412529/mapping-a-citys-rhythm, 6 pgs. (Mar. 13, 2009).
Guinard et al., "Towards the Web of Things: Web Mashups for Embedded Devices," WWW 2009, 8 pgs. (Apr. 20-24, 2009).
Hahn, J. and Kaufman, R., "Evaluating Web Site Performance in Internet-Based Selling from a Business Value Perspective," 2001 International Conference on Electronic Commerce, Vienna, Austria, 25 pgs. (Oct. 2001).
Harris, "How Does the Nike Plus Work?" retrieved from URL: https://www.livestrong.com/article/533191-how-does-the-nike-plus-work/, 18 pgs. (2006).
Hazel, P., excerpts from "EXIM: The Mail Transfer Agent," O'Reilly & Assoc., pub., 182 pgs. (2001) [Pts. 1 & 2].
Heer et al., "Identification of Web User Traffic Composition using Multi-Modal Clustering and Information Scent," Proceedings of the Workshop on Web Mining, SIAM Conference on Data Mining, 13 pgs. (Apr. 7, 2001).
Heer, J., "Capturing and Analyzing the Web Experience," 2002 Workshop CHI, 5 pgs. (Apr. 2002).

(56) References Cited

OTHER PUBLICATIONS

Hersovici et al., "The shark-search algorithm—An application: tailored Web site mapping," Computer Networks and ISDN Systems, vol. 30, 10 pgs. (1998).
Hickman, L., "How I became a Foursquare Cyberstalker," retrieved from URL: https://www.theguardian.com/technology/2010/jul/23/foursquare, 6 pgs. (Jul. 23, 2010).
Wayback Machine Capture of "History of the REST & Search API," retrieved from URL: https://web.archive.org/web/20111202041642/https:/dev.twitter.com/docs/history-rest-search-api, 2 pgs. (Dec. 2, 2011).
Wayback Machine Capture of "How Do You Advertise on Facebook?" retrieved from URL: https://web.archive.org/web/20111111023735/http:/www.advertisementinfacebook.com/how-do-you-advertise-on-facebook.html, 2 pgs. (Nov. 11, 2011).
Hristova et al., "Ad-me: Wireless Advertising Adapted to the User Location, Device and Emotions," Proc. Of the 37th HI Int'l Conf. On System Sciences, retrieved from URL: http://citeseerx.ist.psu.edu/viewdoc/download;jsessionid=2CD78FA3E058EB3BD48812F5EA10553B?doi=10.1.1.129.2870&rep=rep1&type=pdf, 10 pgs. (2004).
Hsu et al., "Ranking Comments on the Social Web," 2009 Int'l Conf. Computational Sci. & Engineering, vol. 4., 8 pgs. (2009).
IEEE Information re: ICONS International Conference on Systems and Yau, available at URL: https://ieeexplore.ieee.org/xpl/con-home/4196296/proceeding, 30 pgs. (2021).
IEEE Information re: Yau, available at https://ieeexplore.ieee.org/document/4196333, 3 pgs. (2021).
Wayback Machine Capture of "Improving performance on twitter. com," retrieved from URL: https://blog.twitter.com/engineer ing/en_us/a/2012/improving-performance-on-twittercom.html, 4 pgs. (May 29, 2012).
"In Pictures: All about Foursquare," Forbes, 11 pgs., retrieved from URL: https://www.forbes.com/2010/04/07/iphone-mobile-android-technology-data-companies-10-foursquare_slide.html?sh=6a70a35328a2, 11 pgs. (Apr. 7, 2010).
Wayback Machine capture of "Interest targeting: Broaden your reach, reach the right audience," retrieved from URL: https://web.archive.org/web/20120831222534/http:/advertising.twitter.com/2012/08/interest-targeting-broaden-your-reach.html, 3 pgs. (Aug. 30, 2012).
Joachims et al., "WebWatcher: Machine Learning and Hypertext," Carnegie Mellon University, 5 pgs. (1995).
Joachims et al., "WebWatcher: A Tour Guide for the World Wide Web," CMU-CS-96, 29 pgs., (1996).
Joachims et al., "WebWatcher: A Tour Guide for the World Wide Web," Proceedings of IJCAI97, 6 pgs. (Aug. 1997).
Kamba et al., "Anatagonomy: a personalized newspaper on the World Wide Web," Int'l J. Human Computer Studies, p. 789-803, vol. 46, (1997).
Kamba et al., "An interactive, personalized, newspaper on the WWW," Proceedings vol. 2667, Multimedia Computing and Networking 1996; DOI:10.1117/12.235880, 12 pgs. (1996). [Event: Electronic Imaging: Science and Technology, 1996, San Jose, CA, United States].
Kamba et al., "The Krakatoa Chronicle—An Interactive, Personalized, Newspaper on the Web," GVU Center Technical Reports, 15 pgs. (1995).
Keenoy et al., "Personalisation of Web Search," Intelligent Techniques for Web Personalization IJCAI 2003 Workshop, 29 pgs. (2003).
Kelly, C., "Business Models Based on Advertising," Technical, Business, and Legal Dimensions of Protecting Children from Pornography on the Internet: Proceedings of a Workshop, retrieved from URL: https://www.nap.edu/read/1 0324/chapter/17#105, 8 pgs. (2002).
Kim et al., "CASTmiddleware: Security Middleware of Context-Awareness Simulation Toolkit for Ubiquitous Computing Research Environment," ICIC2006, LNCIS 344, 8 pgs. (2006).

Kim, "Pebble watch: Smartwatch Review," PCMag, retrieved from URL: https://www.pcmag.com/reviews/pebble-smartwatch, 11 pgs. (Dec. 7, 2016).
Kirk, J. "Microsoft buys mobile advertising company ScreenTonic," Computerworld, retrieved from URL: https://www.computerworld.com/article/2544849/microsoft-buys-mobile-advertising-company-screentonic.html, 5 pgs. (May 3, 2007).
Kosala et al., "Web Mining Research: A Survey," ACM SIGKDD Explorations Newsletter, vol. 2, 15 pgs. (Nov. 2000).
Kovach, S., "How to Use Gowalla To Check-In With Foursquare," Business Insider, retrieved from URL: https://www.businessinsider.com/heres-a-tour-of-gowallas-latest-iphone-app-2010-12, 9 pgs. (Dec. 3, 2010).
Lazerow, "Twitter's Ads API is Here: So What and Now What?" Ad Age, retrieved from URL: https://web.archive.org/web/20130223013656/http:/adage.com/article/digitalnext/twitter-s-ads-api/239913/, 4 pgs. (Feb. 20, 2013).
Lerman et al., "Social Browsing on Flickr," International Conference on Weblogs and Social Media, 9 pgs. (2006).
Lieberman, "Letizia: An Agent That Assists Web Browsing," IJCAI '95: Proceedings of the 14th Int'l Joint Conf. on Artificial Intelligence, vol. 1, 6 pgs. (1995).
Lieberman, "Autonomous Interface Agents," CHI 97, 8 pgs. (Mar. 22-27, 1997).
Lieberman et al., "Let's Browse: A Collaborative Web Browsing Agent," IUI '99: Proceedings of the 4th International Conference on Intelligent User Interfaces, 4 pgs. (1999).
Lieberman et al., "Exploring the Web with Reconnaissance Agents," Communications of the ACM, vol. 44, No. 8, 7 pgs. (Aug. 2001).
Wayback Machine Capture of "Letizia: An Agent That Assists Web Browsing," The Lieberary: Henry Lieberman's On-Line Library, retrieved from URL: https://web.archive.org/web/20040426134417/http://web.media.mit.edu~lieber/Lieberary/Lieberary.html, 2 pgs. (2004).
Liu, M., "A Study of Mobile Sensing Using Smartphones," International Journal of Distributed Sensor Networks, vol. 2013, Article ID 272916, 11 pgs. (2013).
Screen Capture of "LiveJournal Server Source Code (stale history from before it went closed-source)," GitHub, [added May 3, 2015] retrieved from URL: https://github.com/apparentlymart/livejournal, 3 pgs. (retrieved Jun. 2021).
Loecher et al., "CitySense: multiscale space time clustering of GPS points and trajectories," Joint Statistical Meeting (JSM), retrieved from URL: http://www1.cs.columbia.edu~jebara/papers/CitySense.JSM2009.pdf, 10 pgs. (2009).
Loreto et al., "Known Issues and Best Practices for the Use of Long Polling and Streaming in Bidrectional HTTP," Internet Engineering Task Force (IETF), RFC: 6202, 19 pgs. (Apr. 2011).
Maarek et al., "WebCutter: A System for Dynamic and Tailorable Site Mapping," retrieved from URL: https://web.archive.org/web/20051024073316/http://www.ra.ethz.ch:80/CDstore/www6/Technical/Paper040/Paper40.html, 6 pgs. (1998).
"Magitti on the move," The Economic Times, English Ed., retrieved from URL: https://economictimes.indiatimes.com/as-you-like-it/magitti-on-the-move/printarticle/2568170.cms, 2 pgs. (Nov. 25, 2007).
Maia et al., "LOCCAM—Loosely Coupled Context Acquisition Middleware," 28th Annual ACM Symposium on Applied Computing (SAC '13), 8 pgs. (Mar. 18-22, 2013).
Malik, "Using the iPhone to Mine for Gold & Sense," Gigaom.com, retrieved from URL: https://gigaom.com/2008/06/09/sense-networks-citysense, 4 pgs. (Jun. 9, 2008).
Mallick, "Mobile and Wireless Design Essentials," Wiley Publishing, retrieved from URL: https://archive.org/details/mobilewirelessde0000mall, 51 pgs. (2003).
Manber et al., "WebGlimpse—Combining Browsing and Searching," in Conference Proceedings of the USENIX 1997 Technical Conference, 12 pgs. (Jan. 6-10, 1997).
Marmasse et al., "Safe & Sound: A Wireless Leash," Short Talk: Trust, Security & Safety, CHI 2003: New Horizons, Ft. Lauderdale, USA, 2 pgs. (Apr. 5-10, 2003).
McFedries et al., excerpts from "MySpace Visual Quick Tips," Wiley Publishing, Inc., 64 pgs. (2006).

(56) References Cited

OTHER PUBLICATIONS

Wayback Machine Capture of "Measure your impact," retrieved from URL: https://web.archive.org/web/20130307211901/https:/business.twitter.com/measure-your-impact, 3 pgs. (Mar. 7, 2013).
Wayback Machine Capture of "Measurement," retrieved from URL: https://www.placeiq.com/measurement, 1 pg., (2012).
Wayback Machine Capture of "Memeorandum," retrieved from URL: https://web.archive.org/web/20080203205518/http://www.memeorandum.com:80/#a080130p150, 13 pgs. (Feb. 3, 2008).
Meyers et al., excerpts from "The Downloader's Companion for Windows," Prentice Hall PTR, 41 pgs. (1995).
Miami Staff, "Grindr Anyone?" Miami Herald, retrieved from URL: https://www.miamiherald.com/miami-com/things-to-do/article225856080.html, 5 pgs. (Mar. 26, 2010).
Excerpts from Microsoft Computer Dictionary, 14 pgs. (5th ed., 2002).
Miller, M., excerpts from "Absolute Beginner's Guide to Computer Basics," 6 pgs. (4th ed., 2007).
Miller, "Take a Step Closer for an Invitation to Shop," New York Times, retrieved from URL: https://www.nytimes.com/2010/02/23/business/media/23adco.html, 4 pgs. (Feb. 22, 2010).
Millhollon et al., excerpts from "Microsoft Internet Explorer 3.0 Frontrunner," Coriolis Group Books, 49 pgs., (1996).
Mladenic, "Personal WebWatcher: Design and Implementation," Technical Report IJS-DP-7472, 18 pgs. (1996).
Mladenic, "Machine Learning for Better Web Browsing," AAAI Technical Report SS-00-01, 4 pgs. (2000).
Mladenic, "Using Text Learning to Help Web Browsing," Proceedings of the Ninth Int'l Conf. on Human-Computer Interaction, 5 pgs. (2001).
Mladenic, "Machine Learning Used by Personal WebWatcher," Proceedings of ACAI-99 Workshop on Machine Learning and Intelligent Agents, 9 pgs. (1999).
Mladenic, "Text Learning and Related Intelligent Agents: A Survey," IEEE Intelligent Systems and Their Applications, vol. 14, iss. 4, 11 pgs. (1999).
Mobasher et al., "Integrating Web Usage and Content Mining for More Effective Personalization," EC-Web 2000: Proceedings of the First International Conference on Electronic Commerce and Web Technologies, 12 pgs. (2000).
Wayback Machine Capture of "MPOS AdSpace," retrieved from URL: https://web.archive.org/web/20080808140616/http://www.xiam.com/xiam.products.adspace.shtml, 1 pg. (Aug. 8, 2008).
Wayback Machine Capture of "More powerful tools for small business and self-service advertisers," retrieved from URL: https://web.archive.org/web/20130321053415/http:/advertising.twitter.com/2013/03/More-powerful-tools-for-small-business-and-self-service-advertisers.html, 3 pgs. (Mar. 21, 2013).
Murchison, K., Request for Comments (RFC) 5233, retrieved from URL: https://web.archive.org/web/20080217091813/https:/www.ietf.org/rfc/rfc5233.txt, 5 pgs. (Jan. 2008).
Screen Capture of "Murder: Fast datacenter code deploys using BitTorrent," retrieved from URL: https://blog.twitter.com/engineering/en_us/a/2010/murder-fast-datacenter-code-deploys-using-bittorrent.html, 3 pgs. (Jul. 1, 2010).
"The MyExperience Tool," retrieved from URL: http://www.myexperience.sourceforge.net, 5 pgs. (Jun. 1, 2007).
Neufeld, G. et al., Request for Comments (RFC) 2369, Retrieved from: https://web.archive.org/web/20000411210542/ https:/www.ietf.org/rfc/rfc2369.txt, 10 pgs. (Jul. 1998).
Newcomb, "Yahoo SmartAds: Super-Targeted Display Ads," Search Engine Watch, retrieved from URL: https://www.searchenginewatch.com/2007/07/02/yahoo-smartads-super-targeted-display-ads, 4 pgs. (Jul. 2, 2007).
"New Jersey Division of Criminal Justice's 'Handling a Domestic Violence Call: In-Service Training for Police Dispatchers'," New Jersey Division of Criminal Justice, 11 pgs. (May 8, 2003).
"Nike + ipod Experience Coming to A Gym Near You," Nike News, retrieved from URL: https://news.nike.com/news/nike-ipod-experience-coming-to-a-gym-near-you, 4 pgs. (Mar. 4, 2008).
Screen Capture of "Nike Plus Review," YouTube, retrieved from URL: https://www.youtube.com/watch?v=CkyecA7z4es, 2 pgs. (Feb. 29, 2012).
"Nike+ SportBand User's Guide," retrieved from URL: https://www.manualslib.com/manual/259083/Nike-NikePlus-Sportband.html, 32 pgs. (2008).
"Nike + ipod Exercise," HowStuffWorks, retrieved from URL: https://electronics.howstuffworks.com/gadgets/fitness/nike-ipod.htm, 10 pgs. (2007).
Olston et al., "ScentTrails: Integrating Browsing and Searching on the Web," ACM Transactions on Computer-Human Interactions, vol. 10, No. 3, 21 pgs. (2003).
Paliouras et al., "PNS: Personalized multi-source news delivery," International Conference on Knowledge-Based and Intelligent Information and Engineering Systems, 10 pgs. (2006).
Paliouras et al., "PNS: A personalized news aggregator on the web," Intelligent Interactive Systems in Knowledge-based Environments, Virvou, M. and Lakhmi, C., eds., 22 pgs. (2008).
Pant et al., "Crawling the Web," Web Dynamics, Springer, Berlin, Germany, 25 pgs. (2004).
Patel, "Pebble Smartwatch Review," retrieved from URL: https://www.theverge.com/2013/1/28/3924904/pebble-smartwatch-review, 10 pgs. (Jan. 28, 2013).
Pazzani et al., "Syskill and Webert: Identifying Interesting Websites," AAAI-96 Proceedings, 8 pgs. (1996).
Pazzani et al., "Learning and Revising User Profiles: The Identification of Interesting Web Sites," Machine Learning, vol. 27, 19 pgs. (1997).
Pazzani et al., "Machine Learning for User Modeling," User Modeling and User-Adapted Interaction, vol. 11, 11 pgs. (2001).
Pazzani et al., "Adaptive Web Site Agents," Autonomous Agents and Multi-Agent Systems, Kluwer Academic, 14 pgs. (2002).
Excerpts from The New Penguin Dictionary of Computing, 6 pgs. (2001).
Perkowitz, "Adaptive Web Sites: Automatically Synthesizing Web Pages, " AAAI-98 Proc., 6 pgs. (1998).
Perkowitz, "Adaptive Web Sites: Conceptual Cluster Mining," Dept. of Computer Science and Engineering, Univ. of Washington, Seattle, Washington, 6 pgs. (1999).
Perkowitz, "Towards Adaptive Web Sites: Conceptual Framework and Case Study," Elsevier Science B. V. (pub.), 14 pgs. (2000).
Wayback Machine Capture of "Personalization & Discovery," retrieved from URL: https://web.archive.org/web/20080915111528/http://www.qualcomm.com/products_services/mobile_content_services/personalization_discovery.html, 3 pgs. (Sep. 15, 2008).
Petersen et al., "PALLAS: Personalised Language Learning on Mobile Devices, " Fifth IEEE International Conference on Wireless, Mobile, and Ubiquitous Technology in Education, 8 pgs. (2006).
Wayback Machine Capture of "PlaceIQ Blog," retrieved from URL: https://web.archive.org/web/20130413102103/https://www.placeiq.com/blog, 1 pg. (Apr. 13, 2013).
Wayback Machine Capture of "PIQ Conquest," retrieved from URL: https://web.archive.org/web/20130405064340/http://www.placeiq.com/products/piq-conquest-piq-conquest, 1 pg. (2013).
Wayback Machine Capture of "PIQ Customer," retrieved from URL: https://web.archive.org/web/ 20130405063947/http://www.placeiq.com/products/piq-customer-piq-customer, 1 pg. (2013).
Screen Capture of "PlaceIQ—Shyenne Horras," retrieved from URL: https://shyennehorras.com/tag/placeiq, 1 pg. (2012).
Screen Capture of "Privacy," PlaceIQ, retrieved from URL: https://www.placeiq.com/privacy, 1 pg. (2012).
Wayback Machine Capture of "PIQ Segments," retrieved from URL: https://web.archive.org/web/20130404211709/http://www.placeiq.com/products/piq-segments-piq-segments, 1 pg. (2013).
Piquepaille, "A phone that tells you what to do," ZDNet, retrieved from URL: https://www.zdnet.com/article/a-phone-that-tells-you-what-to-do, 5 pgs. (Nov. 14, 2007).
Pirolli et al., "Silk from a Sow's Ear: Extracting Usable Structures from the Web," Conference on Human Factors in Computing Systems (CHI '96), 8 pgs. (Apr. 13-18, 1996).

(56) References Cited

OTHER PUBLICATIONS

Pitkow et al., "Mining Longest Repeating Subsequences to Predict World Wide Web Surfing," Proceedings of USITS' 99: The 2nd USENIX Symposium on Internet Technologies & Systems, 13 pgs. (1999).
Pokraev et al., "Service Platform for Rapid Development and Deployment of Context-Aware, Mobile Applications," IEEE International Conference on Web Services (ICWS'05), vol. 646, 8 pgs. (Jul. 11-15, 2005).
Postel, J. et al., "Request for Comments 1543: Instructions to RFC Authors," 16 pgs. (Oct. 1993).
Powell, Thomas A., excerpts from "AJAX: The Complete Reference," McGraw Hill (pub.), 89 pgs. (2008).
Prasad, "Magitti: The Intelligent Mobile Platform," Geospatial World, retrieved from https://www.geospatialworld.net/article/magitti-the-intelligent-mobile-platform, 3 pgs. (Nov. 24, 2010).
Wayback Machine Capture of "Pricing," retrieved from URL: https://web.archive.org/web/20130307212012/https:/business.twitter.com/products/pricing, 3 pgs. (Mar. 7, 2013).
"Project Ringing in the Rain—Overview," MIT Media Lab, retrieved from URL: https://www.media.mit.edu/projects/ringing-in-the-rain/overview, 3 pgs. (Jan. 2007).
Wayback Machine Capture of "Twitter Help Center: Promoted Accounts," Twitter, retrieved from URL: https://web.archive.org/web/20101009232719/http:/support.twitter.com/articles/282154, 2 pgs. (Sep. 9, 2010).
Wayback Machine Capture of "Promoted Products: now more mobile," retrieved from URL: https://web.archive.org/web/20120229030349/http:/blog.twitter.com/2012/02/promoted-products-now-more-mobile.html, 3 pgs. (Feb. 29, 2012).
Wayback Machine Capture of "Promoted Trends," Twitter, retrieved from URL: https://web.archive.org/web/20101010145232/https:/support.twitter.com/articles/282142, 2 pgs. (Oct. 10, 2010).
Wayback Machine Capture of "Promoted Tweets on mobile: more options, starting today," retrieved from URL: https://web.archive.org/web/20120320192505/http://advertising.twitter.com/2012/03/promoted-tweets-on-mobile-more-options.html, 3 pgs. (Mar. 20, 2012).
Screen Capture of "Proximity Overview," Gimbal Inc., retrieved from URL: https://docs.gimbal.com/proximity_overview.html, 8 pgs. (2013).
Wayback Machine Capture of "Place Visit Rate (PVR)," retrieved from URL: https://web.archive.org/web/20130411042334/http://www.placeiq.com/products/pvr, 1 pg. (2013).
"Qualcomm Acquires Xiam Technologies Limited, Leading Provider of Wireless Content Discovery and Recommendations Technology," Xiam Technologies, retrieved from URL: https://web.archive.org/web/20080808140641/http://www.xiam.com/press/2008-03-11-QualcommXiam.shtml, 2 pgs. (Mar. 11, 2008).
"Quick Reference Guide," retrieved from URL: https://silo.tips/download/quick-reference-guide-21, 5 pgs. (2009).
Ramakrishnan, "The PointCast Network," PointCast Inc., retrieved from URL: https://dl.acm.org/doi/abs/1 0.1145/276304.276361, 1 pg. (1998).
Rao, "Placecast Brings Location-Based Shopping Alerts To Retailer Smartphone Apps," TechCrunch, retrieved from URL: https://techcrunch.com/2011/08/22/placecast-brings-location-based-shopping-alerts-to-smartphone-apps, 3 pgs. (Aug. 22, 2011).
Reardon, M., "Motion Sensing comes to mobile phones," CNET, 4 pgs. (Jun. 11, 2007).
Resnick, P., "Request for Comments 2822: Internet Message Format," 44 pgs. (Apr. 2001).
Wayback Machine Capture of "REST API v1.1 Resources," retrieved from URL: https://web.archive.org/web/20121214124240/https:/dev.twitter.com/docs/api/1.1, 8 pgs. (Dec. 14, 2012).
Wayback Machine Capture of "REST API v. 1.1 Resources," Twitter, retrieved from URL: https://web.archive.org/web/20130325202324/https://dev.twitter.com/docs/api/1.1, 8 pgs. (Mar. 25, 2013).
Ricci, "Mobile Recommender Systems," Information & Technology Tourism, 25 pgs. (Jan. 2010).
Richardson et al., excerpts from "RESTful Web Services," O'Reilly Media, Inc. (pub.), 74 pgs. (2007).
Riggsby et al., "Mastering Lotus Notes and Domino 6," Sybex, retrieved from URL: https://archive.org/details/masteringlotusno0000unse, 228 pgs. (2003).
"Ringing in the Rain: An Agent Based Weather Warning System," MIT, retrieved from URL: https:// alumni.media.mit.edu/~ccchang/RITR/RingingInTheRain.htm, 4 pgs. (Jan. 2008).
Rodriguez, "RESTful Web Services: The Basics." IBM DeveloperWorks, 11 pgs. (Nov. 6, 2008).
Saint, "What is Foursquare And How Do I Use it?," Business Insider, retrieved from URL: https://www.businessinsider.com/how-hit-location-based-social-app-foursquare-works-2010-1, 17 pgs. (Jan. 28, 2010).
Schonfeld, "Liveblogging Facebook Advertising Announcement (Social Ads + Beacon + Insights)," Tech Crunch, retrieved from URL: https://techcrunch.com/2007/11/06/liveblogging-facebook-advertising- announcement, 9 pgs. (Nov. 6, 2007).
Schwab et al., "Adaptivity through Unobtrusive Learning," KI 2002/3, Special Issue on Adaptivity and User Modeling, 8 pgs. (2002).
Schwinger et al., "Context-awareness in Mobile Tourism Guides—A Comprehensive Survey," Johannes Kepler Universität Linz, Technische Universität Wien, 20 pgs. (2005).
Wayback Machine Capture of "ScreenTonic—At a glance," retrieved from URL: https://web.archive.org/web/ 20080209135205/http://www.screentonic.com/at-a-glance1.htm, 1 pg. (Feb. 9, 2008).
Wayback Machine Capture of "ScreenTonic: Stamp Technology," retrieved from URL: https://web.archive.org/web/ 20080213054711/http://www.screentonic.com/stamp-technology.htm, 1 pg. (Feb. 13, 2008).
Seo et al., "Learning User's Preferences by Analyzing Web-Browsing Behaviors," Proceedings of the Fourth International Conference on Autonomous Agents, 7 pgs. (2000).
Shahabi et al., "Knowledge Discovery from Users Web-Page Navigation," Proceedings of the Seventh International Workshop of Research Issues in Data Engineering. High Performance Database Management for Large-Scale Applications, 10 pgs. (1997).
Shahabi et al., "A Framework for Efficient and Anonymous Web Usage Mining Based on Client-Side Tracking," WebKDD 2001—International Workshop of Mining Web Log Data Across All Customer Touch Points, 32 pgs. (2002).
Shalloway et al., excerpts from "Design Patterns Explained: A New Perspective on Object-Oriented Design," 84 pgs. (2nd ed., 2005).
Shapira et al., "ePaper—the Personalized Mobile Newspaper," J. Am. Soc. Info. Sci. & Tech., vol. 60, 7 pgs. (2009).
Sharp et al., "Establishing Requirements for a Mobile Learning System," Interaction Design 2nd Edition, 14 pgs. (2007).
Sharp et al., "Establishing Requirements for a Mobile Learning System," Mobilearn Case Study 10.2, 25 pgs. (2007).
Sharples et al., "Towards a Theory of Mobile Learning," MLEARN, 9 pgs. (2005).
Sharples et al., "Big Issues in Mobile Learning," Report of a Workshop by Kaleidoscope Network of Excellence Mobile Learning Initiative, 35 pgs. (2006).
Sizov et al., "BINGO!: Bookmark-Induced Gathering of Information," Proceedings of the Third International Conference on Web Information Systems Engineering, WISE 2002, 10 pgs., DOI:10.1109/WISE.2002.1181668 (2002).
Sizov et al., "The BINGO! System for Information Portal Generation and Expert Web Search," University of Saarland, Dept. of Computer Science, Saarbrucken, Germany, 12 pgs. (Jan. 5-8, 2003).
Sizov et al., "BINGO!: Bookmark-Induced Gathering of Information," Slide Presentation, 16 pgs., (Dec. 14, 2002).
"Smarter Security Systems for Indian Banks," retrieved from URL: https://www.businesswireindia.com/smarter-security-systems-for-indian-banks-32474.html, 3 pgs. (Aug. 29, 2012).
"Sponsor Breakfast Presentation PlaceIQ," retrieved from URL: https://www.slideshare.net/mediapostlive/place-iq-25647368, 17 pgs. (2012).

(56) References Cited

OTHER PUBLICATIONS

Springer Information re: Kim, available at URL: https://link.springer.com/bookseries/642, 1 pg. (2020).
Srivastava et al., "Web Usage Mining: Discovery and Applications of Usage Patterns from Web Data," SIGKDD Explorations, ACM SIGKDD vol. 1, iss. 2, 12 pgs. (Jan. 2000).
Wayback Machine Capture of "Start Advertising," retrieved from URL: https://web.archive.org/web/20120206021953/https:/business.twitter.com/en/advertise/start, 2 pgs. (Feb. 6, 2012).
Sterling, G., "New SmartAds: The Future of Graphical Advertising at Yahoo," Search Engine Land, retrieved from URL: https://searchengineland.com/new-smartads-the-future-of-graphical-advertising-at-yahoo-11607, 3 pgs. (Jul. 2, 2007).
Stern, "Pebble Watch: Behind the Smartwatch Sensation," retrieved from URL: https://abcnews.go.com/Technology/pebble-watch-smartwatch-iphone-android/story?id=16750944, 5 pgs. (Jul. 10, 2012).
Stevens, "Nike + iPod Sports Kit review," retrieved from URL: https://www.cnet.com/reviews/nike-plus-ipod-sport-kit-review, 5 pgs. (Jan. 23, 2007).
Story, L., "Online Customized Ads Move a Step Closer," New York Times, retrieved from URL: http://www.nytimes.com/2007/07/02/technology/02yahoo.html, 4 pgs. (Jul. 2, 2007).
Strang, T., "A Context Modeling Survey," First International Workshop on Advanced Context Modelling, Reasoning and Management at UbiComp 2004, Nottingham, England, 8 pgs. (Sep. 7, 2004).
Wayback Machine Capture of "Streaming API," retrieved from URL: https://web.archive.org/web/20111202024242/https:/dev.twitter.com/docs/streaming-api, 3 pgs. (Dec. 2, 2011).
Wayback Machine Capture of "Streaming API Concepts," retrieved from URL: https://web.archive.org/web/20111202024252/https://dev.twitter.com/docs/streaming-api/concepts, 6 pgs. (Dec. 2, 2011).
Sugiyama et al., "Adaptive Web Search Based on User Profiles Constructed without Any Effort from Users," WWW 2004, New York, New York, 10 pgs. (May 17-22, 2004).
Takeuchi et al., "An Outdoor Recommendation System based on User Location History," ubiPCMM, retrieved from URL: https://citeseerx.ist.psu.edu/viewdoc/download?doi=10.1.1.91.813&rep=rep1&type=pdf, 10 pgs. (2005).
Wayback Machine Capture of "Targeting, " Twitter, retrieved from URL: https://web.archive.org/web/20130307212103/https:/business.twitter.com/targeting, 3 pgs. (Mar. 7, 2013).
Wayback Machine Capture of "Targeted Mobile Advertising," retrieved from URL: https://web.archive.org/web/20081121201849/http://www.xiam.com/xiam.solutions.targeted.advertising.shtml, 1 pg. (Nov. 21, 2008).
Wayback Machine Capture of "TechMeme," retrieved from URL: https://web.archive.org/web/20080620082917/http://www.techmeme.com, 13 pgs. (2008).
Wayback Machine Capture of "Technorati: Front Page," retrieved from URL: https://web.archive.org/web/20080707232324/http://www.technorati.com, 2 pgs. (2008).
Wayback Machine Capture of "Technorati Support: Site Guide—Channels," retrieved from URL: https://web.archive.org/web/20080512023633/http://support.technorati.com/support/siteguide/channels, 1 pg. (2008).
Wayback Machine Capture of "The new Twitter Ads center," retrieved from URL: https://web.archive.org/web/20130316005334/http:/advertising.twitter.com/2013/03/The-new-Twitter-Ads-center.html, 3 pgs. (Mar. 16, 2013).
Theobald et al., "BINGO! And DAFFODIL: Personalized Exploration of Digital Libraries and Web Sources," Max-Planck Inst. Fur Informatik, Saarbrucken, Germany, 19 pgs. (2004).
Wayback Machine Capture of "The Streaming APIs," retrieved from URL: https://web.archive.org/web/20130119212721/https://dev.twitter.com/docs/streaming-apis, 3 pgs. (Jan. 19, 2013).
Wayback Machine Capture of "Things Every Developer Should Know: Twitter Developers," retrieved from URL: https://web.archive.org/web/20111202041631/https://dev.twitter.com/docs/things-every-developer-should-know, 3 pgs. (Dec. 2, 2011).
Wayback Machine Capture of "Twitter Advertising: Two new features for self-service advertisers," retrieved from URL: https://web.archive.org/web/20120911135519/http:/advertising.twitter.com/2012/09/two-new-features-for-self-service.html, 2 pgs. (Sep. 11, 2012).
Wayback Machine Capture of "Analytics: Twitter for Business," retrieved from URL: https://web.archive.org/web/20130307212052/https:/business.twitter.com/products/analytics-full-service, 4 pgs. (Mar. 7, 2013).
Wayback Machine Capture of "Twitter Ads self service: Twitter for Business," retrieved from URL: https://web.archive.org/web/20130307211550/https:/business.twitter.com/products/twitter-ads-self-service, 4 pgs. (Mar. 7, 2013).
Wayback Machine Capture of "Twitter Advertising: New targeting adds greater relevant to your Promoted Tweets," retrieved from URL: https://web.archive.org/web/20120722044622/http:/ advertising.twitter.com/2012/07/ new-targeting-adds-greater-relevance-to.html, 3 pgs. (Jul. 22, 2012).
Wayback Machine Capture of "Twitter Advertising: Introducing Keyword Targeting in Timelines," retrieved from URL: https://web.archive.org/web/20130418114422/http://advertising.twitter.com/2013/04/Introducing-Keyword-Targeting-in-Timeline.html, 3 pgs. (Apr. 18, 2013).
Wayback Machine Capture of "Twitter Advertising: New enhanced geo-targeting for marketers," retrieved from URL: https://web.archive.org/web/20120914024230/http:/advertising.twitter.com/2012/09/new-enhanced-geo-targeting-for-marketers.html, 2 pgs. (Sep. 14, 2012).
Wayback Machine Capture of "Twitter Blog: Hello World", retrieved from URL: https://web.archive.org/web/ 20100416111723/http://blog.twitter.com/2010/04/hello-world.html, 3 pgs. (Apr. 16, 2010).
"UK Carrier O2 Teams with Placecast for LBS Opt-In Marketing to a Million Consumers," Internet 2 Go, retrieved from URL: http://internet2go.net/news/carriers/uk-carrier-o2-teams-placecast-lbs-marketing-million-consumers, 2 pgs. (Oct. 14, 2010).
Wayback Machine Capture of "User Streams," retrieved from https://web.archive.org/web/20111202041744/https:/dev.twitter.com/docs/streaming-api/user-streams, 4 pgs. (Dec. 2, 2011).
Wayback Machine Capture of "User Streams," Twitter, retrieved from URL: https://web.archive.org/web/20120712073356/https://dev.twitter.com/docs/streaming-apis/streams/user, 3 pgs. (Jul. 12, 2012).
Van Setten et al., "Context-Aware Recommendations in the Mobile Tourist Application COMPASS," Proceedings of the Adaptive Hypermedia and Adaptive Web-Based Systems, Third International Conference, and Lecture Notes in Computer Science, vol. 3137, Springer-Verlag (pub.), 10 pgs. (2004).
Verbert et al., "Context-Aware Recommender Systems for Learning: A Survey and Future Challenges," IEEE Transactions on Learning Technologies, vol. 5, No. 4, 18 pgs. (Oct.-Dec. 2012).
"Visa DPS—Debit and ATM Processing: Quick Reference Guide," VISA, 5 pgs. (2012).
"Visa enhances fraud detection service for VisaNet processing platform," The PayPers, retrieved from URL: https://thepaypers.com/cards/visa-enhances-fraud-detection-service-for-visanet-processing-platform--742952, 3 pgs. (Jan. 20, 2011).
"Visa Strategy Manager Boosts Issuer Fraud Detection," VISA, retrieved from URL: https://usa.visa.com/about-visa/newsroom/press-releases.releaseId.9101.html, 2 pgs. (Apr. 11, 2012).
"Visa Transaction Alerts make North American debut," retrieved from URL: https://www.finextra.com/ pressarticle/31025/visa-transaction-alerts-make-north-american-debut, 3 pgs. (Nov. 17, 2009).
Vo et al., "A Survey of Context-Aware Recommendation Systems," Semantic Scholar, retrieved from URL: http://homepage.cs.latrobe.edu.au/ccvo/papers/16recommendation.pdf, 23 pgs. (2013).
Vrettos et al., "A Fuzzy Rule-Based Agent for Web Retrieval-Filtering," WI 2001: Web Intelligence: Research and Development, 6 pgs. (2001).
Wancho, F., "Digest Message Format," Networking Group Request for Comments: 1153, WSMR, 4 pgs. (1990).
Wang et al., "Unifying user-based and item-based collaborative filtering approaches by similarity fusion," Proceedings of the 29th

(56) References Cited

OTHER PUBLICATIONS annual international ACM SIGIR Conference on Research and Development in Information Retrieval, 8 pgs. (2006).
Wang et al., "Unified relevance models for rating prediction in collaborative filtering," ACM Transactions on Information Systems, 40 pgs. (2008).
Wang, W., excerpts from "Beginning Programming for Dummies," IDG Books Worldwide, Inc. (pub.), 27 pgs. (1999).
Wasfi et al., "Collecting User Access Patterns for Building User Profiles and Collaborative Filtering," IUI '99: Proceedings of the 4th International Conference on Intelligent User Interfaces, Dec. 1998, ACM 1999.
Wattanajantra, "Nike+ GPS app for iPhone: Track runs without a sensor in your shoe," CNET, retrieved from https://www.cnet.com/news/nike-gps-app-for-iphone-track-runs-without-a-sensor-in-your-shoe, 2 pgs. (Sep. 8, 2010).
Wayback Machine Capture of "WebGlimpse.org," retrieved from URL: https://web.archive.org/web/20000815205534/http://webglimpse.org:80, 1 pg. (2000).
Wayback Machine Capture of "WebMate: Introduction," retrieved from URL: https://web.archive.org/web/20010210064517/http://www.cs.cmu.edu:80/~softagents/webmate/Introduction.html, 2 pgs. (2001).
Excerpts from Webster's New World Dictionary of Computer Terms, 6 pgs. (7th ed., 1999).
Weiss et al., "HyPursuit: A Hierarchical Network Search Engine that Exploits Content-Link Hypertext Clustering," Hypertext'96, ACM (pub.), 14 pgs. (1996).
Wayback Machine Capture of "We Smirch," retrieved from URL: https://web.archive.org/web/20071031220029/http://www.wesmirch.com:80, 5 pgs. (2007).
Wayback Machine capture of "We've just made the 'Places' screen smarter!" retrieved from URL: https://web.archive.org/web/20100531082001/http://blog.foursquare.com:80/post/589698188/weve-just-made-the-places-screen-smarter, 1 pg. (2010).
Wayback Machine capture of "What are Promoted Trends?" retrieved from URL: https://web.archive.org/web/20130326131656/https://support.twitter.com/articles/282142, 2 pgs. (Mar. 26, 2013).
White, R., excerpts from "How Computers Work," QUE Corp. (pub.), 5 pgs. (6th ed., 2002).
Wayback Machine Capture of "Why Should You Advertise on Facebook?" retrieved from URL: https://web.archive.org/web/20111111002041/http:/www.advertisementinfacebook.com/why-advertise-on-facebook.html, 2 pgs. (Nov. 11, 2011).
Wilkinson, excerpts from "Flickr Mashups," Wiley Publishing, Inc., 7 pgs. (2007).
Williams et al., "Role of a Personal Assistant in Delivering Personalised Context-Aware Services to Young People," retrieved from https://citeseerx.ist.psu.edu/viewdoc/download?doi=10.1.1.11.8614&rep=rep1&type=pdf, 5 pgs. (2002).
Wolber et al., "Exposing Document Context in the Personal Web," IUI '02: 7th International Conference on Intelligent User Interfaces, 8 pgs. (Jan. 13-16, 2002).
Wolber et al., "Navigating the Personal Web," JCDL Conference '04, ACM (pub.), 10 pgs. (2004).
U.S. Appl. No. 60/819,576 to Jason H. Wolfe (provisional to U.S. Pat. No. 8,428,614 to Jason H. Wolfe), filed Jul. 10, 2006 (27 pgs.).
Wortham, "How Grindr is Changing the Way We Connect," The New York Times, retrieved from URL: https://bits.blogs.nytimes.com/2013/03/10/how-grindr-is-changing-the-way-we-all-connect, 3 pgs. (Mar. 10, 2013).
Wu, "SpeedTracer: A Web Usage Mining and Analysis Tool," IBM Systems Journal, vol. 37, No. 1, 17 pgs. (1998).
"Document Security Xerox CopyCentre/WorkCentre/WorkCentre Pro 232/238/245/255/265/275," Xerox Corporation, retrieved from URL: https://www.office.xerox.com/latest/W7XFS-03U.pdf, 4 pgs. (2006).
"CC/WC/WCP Detailed Specifications," Xerox Corporation, retrieved from URL: https://www.office.xerox.com/latest/W55SS-01.pdf, 21 pgs. (2006).

"Xerox Extensible Interface Platform (EIP)," Xerox Corporation, retrieved from URL: https://www.comdat.ch/download/pictures/0e/rv3wgtpblgfwvuit5x53eaztpe9at5/eip_your_work_just_got_easier.pdf.
Xiang et al., "Temporal Recommendation on Graphs via Long- and Short-term Preference Fusion," ACM KDD '10, 9 pgs. (Jul. 25-28, 2010).
Yan et al., "From User Access Patterns to Dynamic Hypertext Linking," Computer Networks and ISDN Systems, vol. 28, iss. 7-11, 11 pgs. (1996).
Yao et al., "Personalized Recommendation on Multi-Layer Context Graph," WISE 2013, Part I, LNCS 8180, X. Lin et al. (eds.), 14 pgs. (2013).
Yao et al., "PagePrompter: An Intelligent Web Agent Created Using Data Mining Techniques," LNAI 2475, 8 pgs. (2002).
Yao et al., "PagePrompter: An Intelligent Agent for Web Navigation Created Using Data Mining Techniques," 13 pgs. (2002).
Yau et al., "A context-aware and adaptive learning schedule framework for supporting learners' daily routines," Second International Conference on Systems (ICONS'07), IEEE, 6 pgs. (2007).
Yeung et al., "A proactive personalised mobile recommendation system using analytic hierarchy process and Bayesian network," J. Internet Serv. Appl. p. 195-214, retrieved from https://link.springer.com/article/10.1007/s13174-012-0061-3, 20 pgs. (2012).
Young, S., "Getting the Message: How the Internet is Changing Advertising," Harvard Business School, retrieved at https://hbswk.hbs.edu/item/getting-the-message-how-the-internet-is-changing-advertising, 4 pgs. (May 2000).
Zabala et al., "CALVIN: A Personalized Web-Search Agent based on Monitoring User Actions," Artificial Intelligence Group, Universidad Simon Bolivar, Caracas, Venezuela; GI Jahrestagung, 5 pgs. (2001).
Zafra, "Yahoo! Steps Up Online Advertising with SmartAds," Search Engine Journal, retrieved from URL: https://www.searchenginejournal.com/yahoo-steps-up-online-advertising-with-smartads/5245/#close, 16 pgs. (Jul. 2, 2007).
Zaiane et al., "Discovering Web Access Patterns and Trends by Applying OLAP and Data Mining Technology on Web Logs," Proceedings IEEE International Forum on Research and Technology Advances in Digital Libraries—ADL '98, 11 pgs. (1998).
Zee, "Foursquare who? 'Gowalla' might just be where it's at," retrieved from URL: https://thenextweb.com/2009/09/22/square-gowalla, 5 pgs. (Sep. 22, 2009).
Zeff et al., "Advertising on the Internet," 2nd Ed., Wiley Computer Publishing, 127 pgs. (1999).
Zheng et al., "Collaborative Location and Activity Recommendations with GPS History Data," ACM International Conference on World Wide Web, pp. 1029-1038 (2010).
Zuckerman, L., "Convention Highlights 'Push' Software for Web Browsers," Technology Cybertimes, New York Times, retrieved from URL: https://archive.nytimes.com/www.nytimes.com/library/cyber/week/1209software.html, 4 pgs. (Feb. 16, 1996).
Wayback Machine Capture of "ss1.jpg", Oct. 11, 2007, retrieved from https://web.archive.org/web/20071011044752im_/http://robbiehanson.com/alarmclock/images/ss1.jpg, 2 pgs.
Wayback Machine Capture of "ss2.jpg", Oct. 11, 2007, retrieved from https://web.archive.org/web/20071011044752im_/http://robbiehanson.com/alarmclock/images/ss2.jpg, 2 pgs.
Wayback Machine Capture of "ss3.jpg", Oct. 11, 2007, retrieved from https://web.archive.org/web/20071011044752im_/http://robbiehanson.com/alarmclock/images/ss3.jpg, 2 pgs.
Wayback Machine Capture of "ss4.jpg", Oct. 11, 2007, retrieved from https://web.archive.org/web/20071011044752im_/http://robbiehanson.com/alarmclock/images/ss4.jpg, 2 pgs.
Wayback Machine Capture of "ss5.jpg", Oct. 11, 2007, retrieved from https://web.archive.org/web/20071011044752im_/http://robbiehanson.com/alarmclock/images/ss5.jpg, 2 pgs.
Wayback Machine Capture of "ss6.jpg", Oct. 11, 2007, retrieved from https://web.archive.org/web/20071011044752im_/http://robbiehanson.com/alarmclock/images/ss6.jpg, 2 pgs.
Wayback Machine Capture of "ss7.jpg", Oct. 11, 2007, retrieved from https://web.archive.org/web/20071011044752im_/http://robbiehanson.com/alarmclock/images/ss7.jpg, 2 pgs.

(56) References Cited

OTHER PUBLICATIONS

Wayback Machine Capture of "ss8.jpg", Oct. 11, 2007, retrieved from https://web.archive.org/web/20071011044752im_/http://robbiehanson.com/alarmclock/images/ss8.jpg, 2 pgs.
Wayback Machine Capture of "ss9.jpg", Oct. 11, 2007, retrieved from https://web.archive.org/web/20071011044752im_/http://robbiehanson.com/alarmclock/images/ss9.jpg, 2 pgs.
Wayback Machine Capture of "ss10.jpg", Oct. 11, 2007, retrieved from https://web.archive.org/web/20071011044752im_/http://robbiehanson.com/alarmclock/images/ss10.jpg, 2 pgs.
Wayback Machine Capture of "ss11.jpg", Oct. 11, 2007, retrieved from https://web.archive.org/web/20071011044752im_/http://robbiehanson.com/alarmclock/images/ss11.jpg, 2 pgs.
Wayback Machine Capture of "ss12.jpg", Oct. 11, 2007, retrieved from https://web.archive.org/web/20071011044752im_/http://robbiehanson.com/alarmclock/images/ss12.jpg, 2 pgs.
Wayback Machine Capture of "ss13.jpg", Oct. 11, 2007, retrieved from https://web.archive.org/web/20071011044752im_/http://robbiehanson.com/alarmclock/images/ss13.jpg, 2 pgs.
Wayback Machine Capture of "ss14.jpg", Oct. 11, 2007, retrieved from https://web.archive.org/web/20071011044752im_/http://robbiehanson.com/alarmclock/images/ss14.jpg, 2 pgs.
Petition for Inter Partes Review of U. S. Pat. No. 9,208,439 (IPR2021-00986), 81 pgs. (2021).
Petition for Inter Partes Review of U.S. Pat. No. 8,489,599 (IPR2021-00987), 77 pgs. (2021).
Petition for Inter Partes Review of U.S. Pat. No. 7,043,475 (IPR2021-01264), 77 pgs. (2021).
Petition for Inter Partes Review of U.S. Pat. No. 8,489,599 (IPR2021-01294), 73 pgs. (2021).
Petition for Inter Partes Review of U.S. Pat. No. 7,043,475 (IPR2021-01398), 89 pgs. (2021).
Petition for Inter Partes Review of U. S. Pat. No. 9,208,439 (IPR2021-01430), 98 pgs. (2021).
Petition for Inter Partes Review of U.S. Pat. No. 8,732,584 (IPR2021-01434), 67 pgs. (2021).
Petition for Inter Partes Review of U.S. Pat. No. 8,489,599 (IPR2021-01458), 121 pgs. (2021).
Petition for Inter Partes Review of U.S. Pat. No. 8,489,599 (IPR2021-01459), 117 pgs. (2021).
Petition for Inter Partes Review of U.S. Pat. No. 9,208,439 (IPR2021-01461), 75 pgs. (2021).
Petition for Inter Partes Review of U.S. Pat. No. 8,606,781 (IPR2021-01467), 76 pgs. (2021).
Petition for Inter Partes Review of U.S. Pat. No. 9,137,190 (IPR2021-01472), 78 pgs. (2021).
Petition for Inter Partes Review of U.S. Pat. No. 8,489,599 (IPR2021-01536), 73 pgs. (2021).
Prosecution History of U.S. Pat. No. 9,137,190, 145 pgs.
Prosecution History of U.S. Pat. No. 9,208,439, 144 pgs.
Prosecution History of U.S. Pat. No. 7,043,475, 157 pgs.
Prosecution History of U.S. Pat. No. 8,489,599, 474 pgs.
Prosecution History for U.S. Pat. No. 8,606,781, 463 pgs. (Pts. 1 [146 pgs.], 2 [167 pgs.], 3 [150 pgs.].).
"Defendant's Initial Invalidity Contentions," *Palo Alto Research Center Inc. v. Facebook, Inc.*, Case No. 2:20-cv-10753-AB(MRWx), United States District Court, Central District of California, Western Division, 441 pgs. (Jun. 15, 2021).
"SNAP Inc.'s Initial Invalidity Contentions," *Palo Alto Research Center Inc. v. SNAP Inc.*, Case No. 2:20-cv-10755-AB-MRW, United States District Court, Central District of California, Western Division, 222 pgs. (Jun. 15, 2021).
"Twitter's Initial Invalidity Contentions," *Palo Alto Research Center Inc. v. Twitter, Inc.*, Case No. 2:20-cv-10754-AB(MRWx), United States District Court, Central District of California, Western Division, 331 pgs. (Jun. 15, 2021). (Pts. 1 & 2).
Adhikari et al., "Unreeling Netflix: Understanding and Improving Multi-CON Movie Delivery," In the Proceedings of IEEE INFOCOM 2012 (2012), 9 pages.
Adhikari et al., "Vivisecting Youtube: An Active Measurement Study," In INFOCOM12 Mini-conference (2012), 14 pages.
Afanasyev et al. "Interest flooding attack and countermeasures in Named Data Networking." IFIP Networking Conference (2013), 9 pages.
Ahlgren et al., "A Survey of Information-Centric Networking," IEEE Commun. Magazine, pp. 26-36 (2012), 26 pages.
Amadeo et al., "Design and Analysis of a Transport-Level Solution for Content-Centric VANETs," University "Mediterranea" of Reggio Calabria, Jun. 15, 2013, 6 pages.
Ateniese et al., "Improved Proxy Re-Encryption Schemes with Applications to Secure Distributed Storage," ACM Transactions on Information and System Security, vol. 9, iss. 1, pp. 1-30 (Feb. 2006), 25 pages.
Aumasson et al., "SipHash: a fast short-input PRF," Sep. 18, 2012, 20 pages.
Ballardie et al., "Core Based Trees (CBT)," Proc. ACM SIGCOMM '88, Aug. 1988, 11 pages.
Bari et al., "A survey of naming and routing in information-centric networks," Communications Magazine, IEEE 50.12 (2012): 44-53, 9 pages.
Baugher et al., "Self-Verifying Names for Read-Only Named Data", 2012 IEEE Conference on Computer Communications Workshops (INFOCOM WKSHPS), Mar. 2012, pp. 274-279, 6 pages.
Beben et al., "Content Aware Network based on Virtual Infrastructure," 2012 13th ACIS International Conference on Software Engineering, 6 pages.
Belotti et al., "Activity-Based Serendipitous Recommendations with the Magitti Mobile Leisure Guide," CHI '08: Proceedings of the SIGCHI Conference on Human Factors in Computing Systems, pp. 1157-1166, https://doi.org/10.1145/1357054.1357237 (Apr. 2008), 10 pages.
Bethencourt et al., "Ciphertext-policy attribute-based encryption," in Proc. IEEE Security & Privacy 2007, Berkeley, CA, USA, pp. 321-334 (May 2007), 15 pages.
Biradar et al., "Review of multicast routing mechanisms in mobile ad hoc networks," Aug. 16, Journal of Network and Computer Applications 35, pp. 221-229 (2012), 19 pages.
Blaze et al., "Divertible Protocols and Atomic Proxy Cryptography," EUROCRYPT 1998: Advances in Cryptology—EUROCRYPT'98, pp. 127-144 (1998), 18 pages.
Boneh et al., "Collusion Resistant Broadcast Encryption With Short Ciphertexts and Private Keys," CRYPTO 2005: Advances in Cryptology—CRYPTO 2005, pp. 258-275 (2005), 19 pages.
Boneh et al., "Hierarchical Identity Based Encryption with Constant Size Ciphertext," from Advances in Cryptology-EUROCRYPT 2005, vol. 3493 LNCS, pp. 440-456, (2005), 29 pages.
Boneh et al., "Identity-Based Encryption from the Weil Pairing," Advances in Cryptology—CRYPTO 2001, vol. 2139, Springer Berlin Heidelberg (2001), 31 pages.
Brambley, M., "A novel, low-cost, reduced-sensor approach for providing smart remote monitoring and diagnostics for packaged air conditioners and heat pumps," Pacific Northwest National Laboratory (2009), 19 pages.
Broder et al., "Multilevel Adaptive Hashing," SODA '90: Proceedings of the First Annual ACM-SIAM Symposium on Discrete Algorithms, pp. 43-53 (Jan. 1990), 11 pages.
Carzaniga et al., "A routing scheme for content-based networking," INFOCOM 2004, 23rd Annual Joint Conference of the IEEE Computer and Communications Societies, vol. 2 (2004), 18 pages.
"CCNx Technical Documentation Index," as retrieved from URL: http://ccnx.org/releases/latest/doc/technical/ (Apr. 24, 2015), 2 pages.
"CCNx-Trace," Screen Capture retrieved from URL: https://code.google.com/p/ccnx-trace/(Project Created 2012), 1 page.
Cherven, K., "Mastering Gephi Network Realization," [Excerpt] Mastering Gephi Network Realization, Packt Publishing (Jan. 2015), 50 pages.
Cho et al., "A survey on trust management for mobile ad hoc networks," Communications Surveys & Tutorials, IEEE 13.4: 562-583 (2011), 22 pages.
Chow et al., "Efficient Unidirectional Proxy Re- Encryption," Progress in Cryptology, AFRICACRYPT 2010, Springer Berlin Heidelberg (2010), 17 pages.

(56) References Cited

OTHER PUBLICATIONS

Compagno et al., "Poseidon: Mitigating interest flooding DDoS attacks in named data networking," 38th Conference on Local Computer Networks (LCN), (2013), 9 pages.
Conner et al., "A trust management framework for service-oriented environments," Proceedings of the 18th International Conference on World Wide Web, ACM (2009), 10 pages.
"Content Delivery Network", Wikipedia, Dec. 10, 2011, http://en.wikipedia.org/w/index.php?title=Content_delivery_network&oldid=465077460, 2 pages.
Dabirmoghaddam et al., "Understanding optimal caching and opportunistic caching at the edge of information-centric networks," Proceedings of the 1st International Conference on Information-Centric Networking, ACM (2014), 10 pages.
Data J Lab, "Gelphi Tutorial: Visualizing Facebook Network," YouTube Sep. 30, 2013, [online] Retrieved from URL: https://www.youtube.com/watch?v=kbLFMObmLNQ (2013), 4 pages.
Deering et al., "Multicast Routing in Internetworks and Extended LANs," Proc. ACM SIGCOMM '88 (Aug. 1988), 10 pages.
Deering et al., "The PIM architecture for wide-area multicast routing," IEEE/ACM Trans. on Networking, vol. 4, No. 2 (Apr. 1996), 11 pages.
Dely et al., "OpenFlow for Wireless Mesh Networks," Proceedings of 20th International Conference on Computer Communications and Networks, IEEE (Jul. 31, 2011), 6 pages.
Deng et al., "Chosen-Ciphertext Secure Proxy Re-Encryption without Pairings," CANS, Spring Lecture Notes in Computer Science, vol. 5339 (2008), 17 pages.
Despotify, "The Despotify Project," [online] Retrieved from URL: http://despotify.sourceforge.net/ (2012), 2 pages.
Detti et al., "CONET: a content centric inter-networking architecture," Proceedings of the ACM SIGCOMM Workshop on Information-Centric Networking, ACM (2011), 6 pages.
Detti et al., "Supporting the Web with an information centric network that routes by name", Computer Networks, vol. 56, pp. 3705-3702 (Aug. 2012), 48 pages.
Dierks, T., "The transport layer security (TLS) protocol version 1.2," IETF RFC 5246 (2008), 104 pages.
"Digital Signature," archived on Aug. 31, 2009 at http://web.archive.org/web/20090831170721/http://en.wikipedia.org/wiki/Digital_signature, 7 pages.
Dijkstra et al., "Termination detection for diffusing computations," Information Processing Letters, 11.1: 1-4 (1980), 4 pages.
Dijkstra et al., "Derivation of a termination detection algorithm for distributed computations," Control Flow and Data Flow: Concepts of Distributed Programming, Springer Berlin Heidelberg, pp. 507-512 (1986), 8 pages.
Eivazi et al., "Predicting Problem-Solving Behavior and Performance Levels from Visual Attention Data," 2nd Workshop on Eye Gaze in Intelligent Human Machine Interaction, pp. 9-16 (Feb. 13, 2012), 8 pages.
Fall et al., "DTN: an architectural retrospective," IEEE Journal on Selected Areas in Communications, vol. 28, No. 5, pp. 828-835 (Jun. 2008), 9 pages.
Fayazbakhsh et al., "Less pain, most of the gain: Incrementally deployable ICN," In ACM SIGCOMM Computer Communication Review, vol. 43, No. 4, pp. 147-158, ACM (Aug. 2013), 12 pages.
Fleseriu, G., "C++ Tutorial: A Beginner's Guide to std:: vector, Part 1," [Online] Retrieved from URL: https://www.codeguru.com/cpp/cpp/cpp_mfc/stl/article.php/c4027/C-Tutorial-A-Beginners-Guide-to-stdvector-Part-1.htm on Sep. 18, 2018, (Feb. 2003) 36 pages.
"The FP7 4WARD project," http://www.4ward-project.eu/. downloaded Mar. 11, 2015, 3 pages.
Garcia et al., "A resilient condition assessment monitoring system," 5th International Symposium on Resilient Control Systems (ISRCS), IEEE, (2012), 9 pages.
Garnepudi et al., "Proactive, reactive and hybrid multicast routing protocols for Wireless Mesh Networks," 2013 IEEE International Conference on Computational Intelligence and Computing Research, Enathi, India, pp. 1-7, DOI: 10.1109/ICCIC.2013.6724255 (2013), 7 pages.
Gasti et al., "DoS & DDoS in Named Data Networking," 2013 22nd International Conference on Computer Communication and Networks (ICCCN), Nassau, Bahamas, pp. 1-7, DOI: 10.1109/ICCCN.2013.6614127 (2013), 7 pages.
Gentry et al., "Hierarchical ID-Based Cryptography," Advances in Cryptology—ASIACRYPT 2002, LNCS 2501, pp. 548-566 (2002), 19 pages.
Getoor et al., "Chapter 5: Probabilistic Relational Models," in Introduction to Statistical Relational Learning, MIT Press (2007), 46 pages.
GFC LearnFree, [online] Retrieved from URL: www.gfclearnfree.org/windowsxp/working-with-windows-explorer/1/ (2018), 7 pages.
Ghali et al., "Needle in a Haystack: Mitigating Content Poisoning in Named-Data Networking," NDSS'14: Proceedings of NDSS Workshop on Security of Emerging Networking Technologies (SENT), pp. 1-10 (2014), 10 pages.
Ghodsi et al., "Information-centric networking: seeing the forest for the trees," HotNets-X: Proceedings of the 10th ACM Workshop on Hot Topics in Networks, Article No. 1, pp. 1-6, DOI: 10.1145/2070562.2070563 (Nov. 2011), 6 pages.
Ghodsi et al., "Naming in content-oriented architectures," SIGCOMM ICN'11: Proceedings of the ACM SIGCOMM workshop on Information-Centric Networking, Toronto, Ontario, CA, pp. 1-6 (Aug. 19, 2011), 9 pages.
Ghosh et al., "Automatic Routing Using Multiple Prefix Labels," IEEE Ad Hoc and Sensor Networking Symposium (2012), 6 pages.
Garcia-Luna-Aceves, J., "Name-Based Content Routing in Information Centric Networks Using Distance Information," ACM-ICN '14: Proceedings of the 1st ACM Conference on Information-Centric Networking, pp. 7-16, DOI: 10.1145/2660129.2660141 (Sep. 2014), 10 pages.
Garcia-Luna-Aceves, J., "A unified approach to loop-free routing using distance tectors or link states," ACM SIGCOMM Computer Communication Review, vol. 19, No. 4, ACM (1989), 12 pages.
Gopal et al., "Integrating content-based Mechanisms with hierarchical File systems," OSDI '99: Proceedings of the Third Symposium on Operating Systems Design and Implementation, pp. 265-278, (Feb. 1999), 15 pages.
Goyal et al., "Attribute-based encryption for fine- grained access control of encrypted data," CCS '06: Proceedings of the 13th ACM conference on Computer and Communications Security, pp. 89-98, DOI: 10.1145/1180405.1180418 (Oct. 2006), 28 pages.
Green et al., "Identity-based proxy re-encryption," in Proc. ACNS 2007, LNCS 4521, pp. 288-306, Zhuhai, China (Jun. 2007), 21 pages.
Guo et al., "Collaborative Forwarding and Caching in Content Centric Networks," Networking 2012, Lecture Notes in Computer Science, vol. 7289, Springer, Berlin, Heidelberg, DOI: 10.1007/978-3-642-30045-5_4 (2012), 15 pages.
Gupta et al., "Efficient Routing for Peer-to-Peer Overlays," NSDI'04: Proceedings of the 1st Conference on Symposium on Networked Systems Design and Implementation, vol. 1 (Mar. 2004), 14 pages.
Harley, A., "Slider Design: Rules of Thumb," Nielsen Norman Group, [online] Retrieved from URL: www.nngroup.com/articles/gui-slider-controls/ (Sep. 2015), 3 pages.
Hastie et al., "Automatic Evaluation: Using a DATE Dialogue Act Tagger for User Satisfaction and Task Completion," Proc. Lang. Resources Eval. Conf., pp. 1-8 (2002), 8 pages.
Heckerman et al., "Decision-Theoretic Troubleshooting," Communications of the ACM, vol. 38, No. 3 (Mar. 1995), 15 pages.
Heinemeier et al., "Uncertainties in Achieving Energy Savings from HVAC Maintenance Measures in the Field," ASHRAE Transactions, vol. 118, pt. 2 (Jun. 2012), 8 pages.
Herlich et al., "Optimizing Energy Efficiency for Bulk Transfer Networks," [online] Retrieved from URL: http://www.cs.uni-paderborn.de/fileadmin/informationik/ag-karl/publications/miscellaneous/optimizing.pdf on Mar. 9, 2012 (Apr. 2010), 3 pages.

(56) References Cited

OTHER PUBLICATIONS

Hoque et al., "NLSR: Named-data Link State Routing Protocol," ICN '13: Proceedings of the 3rd ACM SIGCOMM Workshop on Information-Centric Networking, Hong Kong, CN, pp. 15-20 (Aug. 2013), 6 pages.
Hur et al., "Attribute-based access control with efficient revocation in data outsourcing systems," IEEE Transactions on Parallel and Distributed Systems, vol. 22, No. 7, pp. 1214-1221, DOI: 10.1109/TPDS.2010.203 (Jul. 2011), 8 pages.
Hur, J., "Improving security and efficiency in attribute-based data sharing," IEEE Transactions on Knowledge and Data Engineering, vol. 25, No. 10, pp. 2271-2282, DOI: 10.1109/TKDE.2011.78 (Oct. 2013), 12 pages.
Intanagonwiwat et al., "Directed Diffusion: A Scalable and Robust Communication Paradigm For Sensor Networks," Proceedings of the 6th Annual International Conference on Mobile Computing and Networking, ACM (2000), 12 pages.
"Introducing JSON," http://www.json.org/. downloaded Mar. 11, 2015, 9 pages.
Ion et al., "Toward content-centric privacy in ICN: Attribute-based encryption and routing," SIGCOMM '13: Proceedings of the ACM SIGCOMM 2013 Conference on SIGCOMM, pp. 513-514, DOI: 10.1145/2486001.2491717 (Aug. 2013), 2 pages.
Ishiyama et al., "On the Effectiveness of Diffusive Content Caching in Content-Centric Networking", 2012 9th Asia-Pacific Symposium on Information and Telecommunication Technologies (APSITT), Santiago and Valparaiso, Chile, pp. 1-5 (2012).
Jacobson et al., "Content-Centric Networking, Whitepaper Describing Future Assurable Global Networks," Palo Alto Research Center, Inc. (PARC), pp. 1-9 (Jan. 2007), 10 pages.
Jacobson et al., "Custodian-Based Information Sharing," IEEE Communications Magazine, vol. 50, No. 7, pp. 38-43, DOI:10.1109/MCOM.2012.6231277 (Jul. 2012), 6 pages.
Jacobson et al., "Networking Named Content," CoNEXT '09: Proceedings of the 5th International Conference on Emerging Networking Experiments and Technologies, pp. 1-12, DOI: 10.1145/1658939.1658941 (Dec. 2009), 12 pages.
Jacobson et al., "VoCCN: Voice Over Content-Centric Networks," ReArch'09, Rome, Italy, ACM (Dec. 2009), 6 pages.
Jahid et al., "EASiER: Encryption-based access control in social network with efficient revocation," ASIACCS '11: Proceedings of the 6th ACM Symposium on Information, Computer and Communications Security, pp. 411-415, DOI: 10.1145/1966913.1966970 (Mar. 2011), 5 pages.
Javaid, N., "Analysis and design of quality link metrics for routing protocols in Wireless Networks", PhD Thesis Defense, Universete Paris-Est. (Dec. 15, 2010), 146 pages.
Ji et al., "Prognostics enabled resilient control for model-based building automation systems," Proceedings of Building Simulation 2011: Proceedings of the 12th Conference of International Building Performance Simulation Association, Sydney, AU, pp. 286-293 (Nov. 2011), 8 pages.
Kamara et al., "Cryptographic cloud storage," Financial Cryptography and Data Security, FC 2010, Lecture Notes in Computer Science, vol. 6054, pp. 136-149, Springer, Berlin, Heidelberg, DOI: 10.1007/978-3-642-14992-4_13 (2010), 14 pages.
Katipamula et al., "Review Article: Methods for Fault Detection, Diagnostics, and Prognostics for Building Systems—A Review, Part I," HVAC&R Research, 11:1, pp. 3-25, DOI: 10.1080/10789669.2005.10391123 (2005), 23 pages.
Katipamula et al., "Review Article: Methods for Fault Detection, Diagnostics, and Prognostics for Building Systems—A Review, Part II," HVAC&R Research 11:2, pp. 169-187 (2005), 19 pages.
Kaya et al., "A Low Power Lookup Technique for Multi-Hashing Network Applications," IEEE Computer Society Annual Symposium on Emerging VLSI Technologies and Architectures (ISVLSI'06), Karlsruhe, Germany, DOI: 10.1109/ISVLSI.2006.3 (2006), 6 pages.
Keranen et al., "Interactive Connectivity Establishment (ICE): A Protocol for Network Address Translator (NAT) Traversal for Offer/Answer Protocols," IETF (2013), 118 pages.

Koponen et al., "A Data-Oriented (and Beyond) Network Architecture," SIGCOMM '07: Proceedings of the 2007 Conference on Applications, Technologies, Architectures, and Protocols for Computer Communications, Kyoto, Japan, ACM, pp. 181-192, DOI:10.1145/1282380.1282402 (Aug. 27-31, 2007), 12 pages.
Kulkarni et al., "Implementation of a prototype active network," 1998 IEEE Open Architectures and Network Programming, San Francisco, CA, USA, pp. 130-142, DOI: 10.1109/OPNARC.1998.662049 (1998), 14 pages.
Kumar et al., "Peacock Hashing: Deterministic and Updatable Hashing for High Performance Networking," IEEE Infocom 2008—The 27th Conference on Computer Communications, Phoenix, AZ, USA, pp. 101-105, DOI: 10.1109/INFOCOM.2008.29 (2008), 9 pages.
Lee et al., "On-demand Multicast Routing Protocol in Multihop Wireless Mobile Networks," Mobile Networks and Applications, vol. 7, No. 6, pp. 441-453 (2002), 13 pages.
Liang et al., "A Ciphertext-policy attribute-based proxy re-encryption with chosen-ciphertext security," 2013 5th International Conference on Intelligent Networking and Collaborative Systems, Xi'an, CN, pp. 552-559, DOI: 10.1109/INCoS.2013.103 (2013), 21 pages.
Li et al., "Coping with node misbehaviors in ad hoc networks: A multi-dimensional trust management approach," 2010 Eleventh International Conference on Mobile Data Management, Kansas City, MO, USA, pp. 85-94, DOI:10.1109/MDM.2010.57 (2010), 10 pages.
Liu et al., "A TLV-Structured Data Naming Scheme for Content-Oriented Networking," IEEE International Conference on Communications (ICC), Ottawa, ON, Canada, 2012, pp. 5822-5827, DOI: 10.1109/ICC.2012.6364710 (2012), 6 pages.
Lopez et al., "Trust management systems for wireless sensor networks: Best practices," Computer Communications, vol. 33(9), pp. 1086-1093, DOI: 10.1016.j.comcom.2010.02.006 (Jun. 2010), 23 pages.
Lotspiech et al., "Anonymous Trust: Digital Rights Management Using Broadcast Encryption," Proc. IEEE, vol. 92, No. 6, pp. 898-909 (2004), 12 pages.
Mahadevan et al., "CCN-krs: A key resolution service for con, " ACM-ICN '14: Proceedings of the 1st ACM Conference on Information-Centric Networking, pp. 97-106, DOI: 10.1145/2660129.2660154 (Sep. 2014).
Mahadevan et al., "Orbis: rescaling degree correlations to generate annotated internet topologies," ACM SIGCOMM Computer Communication Review, vol. 37, iss. 4, pp. 325-336, DOI: 10.1145/1282427.1282417 (Oct. 2007).
Mahadevan et al., "Systematic topology analysis and generation using degree correlations," ACM SIGCOMM Computer Communication Review, vol. 36, iss. 4, pp. 135-146, DOI: 10.1145/1151659.1159930 (Oct. 2006).
Matocha et al., "A taxonomy of distributed termination detection algorithms," Journal of Systems and Software 43(3): 207-221 (1998), 15 pages.
McWilliams et al., "Home Energy Article: A Systems Approach to Retrofitting Residential HVAC Systems," Technical Report, Lawrence Berkeley National Laboratory, LBNL-57406, DOI: 10.2172/887199 (2005), 11 pages.
Merindol et al., "An efficient algorithm to enable path diversity in link state routing networks," Computer Networks, vol. 55, iss. 5, pp. 1132-1140 (Apr. 2011), 18 pages.
"Microsoft PlayReady," http://www.microsoft.com/playready/. downloaded Mar. 11, 2015, 1 page.
Misra et al., "Secure content delivery in information-centric networks: Design, implementation, and analyses," in Proc. ACM SIGCOMM ICN 2013, Hong Kong, China, pp. 73-78 (Aug. 2013), 6 pages.
Mobility First - Mobility First Project [online] Retrieved from URL: http://mobilityfirst.winlab.rutgers.edu/ on Mar. 9, 2015, 2 pages.
Moldovan, "Streaming Rows of SQL Server Data to a Table Valued Parameter Using a SQLDataReader," MSSQLTips.com, (Mar. 2011) URL: https://www.mssqltips.com/sqlservertip/2338/streaming-rows-of-sql-server-data-to-a-table-valued-parameter-using-a-sqldatareader/ (2011), 7 pages.

(56) References Cited

OTHER PUBLICATIONS

Naor et al., "Efficient trace and revoke schemes," In: Frankel, Y. (eds) Financial Cryptography, FC 2000, Lecture Notes in Computer Science, vol. 1962, Springer, Berlin, Heidelberg, DOI: 10.1007/3-540-45472-1_1 (2001), 20 pages.

Narasimhan et al., "HyDE-A General Framework for Stochastic and Hybrid Model-based Diagnosis," Proc. DX 7, pp. 162-169 (2007), 8 pages.

Named Data Networking—NDN Project [online] Retrieved from URL: http://www.named-data.net/ on Mar. 9, 2015, 7 pages.

Nystrom et al., "PKCS#12: Personal information exchange syntax v. 1.1," IETF RFC 7292, K. Moriarty, Ed., DOI: 10.17487/RFC7292 (Jul. 2014), 29 pages.

Parmar, H. (ed.) RTMP (2009). [online] Retrieved from URL: http://wwwimages.adobe.com/www.adobe.com/content/dam/Adobe/en/devnet/rtmp/pdf/rtmp specification 1.0.pdf (2012), 52 pages.

Parsa et al., "A Protocol for Scalable Loop-free Multicast Routing," IEEE Journal on Selected Areas in Communications, vol. 15, No. 3, pp. 316-331, DOI: 10.1109/49.564131 (Apr. 1997), 30 pages.

"PBC Library-Pairing-Based Cryptography-About," http://crypto.stanford.edu/pbc. downloaded Apr. 27, 2015, 2 pages.

PROJECT CCNx—Content Centric Networking Project (CCN) [online] Retrieved from URL: http://ccnx.org/releases/latest/ doc/technical/ on Mar. 9, 2015, 5 pages.

Psaras et al., "Modelling and evaluation of CCN-caching trees," Networking 2011, Lecture Notes in Computer Science, vol. 6640, Springer, Berlin, Heidelberg, DOI: 10.1007/978-3-642-20757-0_7 pp. 78-91 (May 2011), 14 pages.

"Pursuing a pub/sub internet (PURSUIT)," http://www.fp7-pursuit.ew/PursuitWeb/. downloaded Mar. 11, 2015, 1 page.

Ratwani et al., "A Real-Time Eye Tracking System for Predicting and Preventing Postcompletion Errors," Human-Computer Interaction, vol. 26, pp. 205-245 (2011), 42 pages.

Rello et al., "Detecting Readers with Dyslexia Using Machine Learning with Eye Tracking Measures," May 18-20, 2015; W4A'15—Proceedings of the 112th Web For All Conference (2015), 8 pages.

Rescorla et al., "Datagram transport layer security," IETF RFC 4347, (Apr. 2006), 25 pages.

Ricci et al., "Acquiring and Revising Preferences in a Critique-Based Mobile Recommender System," in IEEE Intelligent Systems, vol. 22, No. 3, pp. 22-29, DOI: 10.1109/MIS.2007.43 (May-Jun. 2007), 8 pages.

Rodriguez et al., "The Graph Traversal Pattern," Graph Data Management, pp. 29-46, DOI:10.4018/978-1-61350-053-8.ch002 (2010), 18 pages.

Rosenberg, J. "Interactive Connectivity Establishment (ICE): A Protocol for Network Address Translator (NAT) Traversal for Offer/Answer Protocols," Internet Engineering Task Force (IETF), RFC: 5245, Retrieved from URL: https://www.rfc-editor.org/rfc/rfc5245 (Apr. 2010), 117 pages.

Rossi et al., "Parallel Maximum Clique Algorithms with Applications to Network Analysis and Storage," Dec. 26, 2013, pp. 1-11 (2013), 28 pages.

Rossi et al., "Scalable Relational Learning for Large Heterogenous Networks," 2015, pp. 1-10 (2015), 10 pages.

Rossi et al., "Transforming Graph Data for Statistical Relational Learning," Journal of Artificial Intelligence Research vol. 45(1), pp. 363-441 (2012), 79 pages.

SAIL Project, "Scalable and Adaptive Internet Solutions (SAIL) Project," [online] Retrieved from URL: http://sail- project.eu/ on Mar. 9, 2015, 5 pages.

Sandvine, "Global Internet Phenomena Report—Spring 2012," [online] Retrieved from URL: https://www.sandvine.com/hubfs/Sandvine_Redesign_2019/Downloads/Internet%20Phenomena/2012-1h-global-internet-phenomena-report.pdf (2012), 36 pages.

Schein et al., "A Simulation Study of a Hierarchical, Rule-Based Method for System-Level Fault Detection and Diagnostics in HVAC Systems," NIST Interagency/Internal Report (NISTIR), National Institute of Standards and Technology, Gaithersburg, MD, [online], (NISTIR-7216), 23 pgs., URL: https://tsapps.nist.gov/publication/get_pdf.cfm?pub_id=860972 (Apr. 2005), 23 pages.

Schiller et al., "Location-Based Services," The Morgan Kaufmann Series in Data Management Systems, Morgan Kaufmann Publishers / Elsevier, DOI: 10.1016/B978-1-55860-929-7.X5000-6 (2004), 266 pages.

Shani et al., "A survey of point-based POMDP solvers," Autonomous Agents and Multi-Agent Systems, vol. 27, pp. 1-51 (2013), 51 pages.

Shao et al., "CCA-Secure Proxy Re-Encryption without Pairings," Public Key Cryptography—PKC 2009, Lecture Notes in Computer Science, vol. 5443, 20 pgs., Springer, Berlin, Heidelberg, DOI: 10.1007/978-3-642-00468-1_20 (2009), 22 pages.

Sheppard et al., "A formal analysis of fault diagnosis with d-matrices," Journal of Electronic Testing 23(4): 309-322 (2007), 14 pages.

Shih et al., "Wake on Wireless: An Event Driven Energy Saving Strategy for Battery Operated Devices," MobiCom '02: Proceedings of the 8th Annual International Conference on Mobile Computing and Networking, pp. 160-171 (Sep. 2002), 12 pages.

Shneyderman et al., "Mobile VPN: Delivering Advanced Services in Next Generation Wireless Systems," [Excerpt] (Jan. 2003), 30 pages.

Siddheswar Ray and Rose H Turi. "Determination of No. of Clusters in K-Means Clustering and Application in Colour Image Segmentation" 1999 [online] Retrieved from URL: http://citeseerx.ist.psu.edu/viewdoc/download?doi=10.1.1.587.3517&rep=rep1&type=pdf on Apr. 28, 2017, 7 pages.

Smetters et al., "CCNx Access Control Specifications," PARC, Tech. Rep., (Jul. 30, 2010), 37 pages.

Soh et al., "Efficient Prefix Updates for IP Router Using Lexicographic Ordering and Updateable Address Set," IEEE Transactions on Computers, vol. 57, No. 1, pp. 110-125, DOI: 10.1109/TC.2007.70776 (Jan. 2008), 16 pages.

Solis et al., "Robust content dissemination in disrupted environments," CHANTS '08: Proceedings of the third ACM workshop on Challenged networks, pp. 3-10, DOI: 10.1145/1409985.1409988 (Sep. 2008), 8 pages.

Soulie, J., "Variables. Data Types," Cplusplus.com Apr. 20, 2009 verified by wayback machine [online] Retrieved from URL: https://web.archive.org/web/20090420124459/http://www.cplusplus.com/doc/tutorial/variables/ on Feb. 6, 2018, 5 pages.

Su et al., "Drafting Behind Akamai: Inferring Network Conditions Based on CDN Redirections," IEEE/ACM Transactions on Networking, vol. 17, iss. 6, pp. 1752-1765 (Dec. 2009), 14 pages.

Sun et al., "A framework for model-based repair," AAAI'93: Proceedings of the eleventh national conference on Artificial intelligence, pp. 182-187 (Jul. 1993), 6 pages.

Takeuchi et al., "CityVoyager: An Outdoor Recommendation System Based on User Location History," Ubiquitous Intelligence and Computing Lecture Notes in Computer Science; LNCS, Springer, Berlin, DE, vol. 4159, (Jan. 1, 2006), pp. 625-636, 12 pages.

Techopedia, "Database Management Systems (DBMS)," (Jul. 23, 2011) Retrieved from URL: https://web.archive.org/web/20110723213424/https://www.techopedia.com/definition/24361/database-management-systems-dbms (2011), 3 pages.

Trossen et al., "Designing and realizing and information-centric internet," IEEE Communications Magazine, vol. 50, No. 7, pp. 60-67, DOI: 10.1109/MCOM.2012.6231280 (Jul. 2012), 8 pages.

Tzeng et al., "A public-key traitor tracing scheme with revocation using dynamic shares," In: Kim, K. (eds) Public Key Cryptography, PKC 2001, Lecture Notes in Computer Science, vol. 1992, pp. 207-224, Springer, Berlin, Heidelberg, DOI:10.1007/3-540-44586-2_16 (2001), 18 pages.

Varvello et al., "Caesar: A Content Router for High-Speed Forwarding," ICN'12, Second Edition on Information-Centric Networking, New York, (Aug. 2012), 6 pages.

Verma et al., "Probabilistic models for monitoring and fault diagnosis, " The Second IARP and IEEE/RAS Joint Workshop on Technical Challenges for Dependable Robots in Human Environments, Raja Chatila (ed.) (Oct. 2002), 10 pages.

(56) References Cited

OTHER PUBLICATIONS

Vo et al., "Towards Context-Aware Task Recommendation," 2009 Joint Conferences on Pervasive Computing (JCPC); DOI:10.1109/jgpg.2009.5420173 (2009), 4 pages.

Vutukury et al., "A simple approximation to minimum-delay routing," ACM SIGCOMM Computer Communication Review, vol. 29, iss. 4, pp. 227-238, DOI:10.1145/316194.316227 (Oct. 1999), 8 pages.

Waldvogel, M., "Fast Longest Prefix Matching: Algorithms, Analysis, and Applications," A dissertation submitted to the Swiss Federal Institute of Technology Zurich (2002), 174 pages.

Walfish et al., "Untangling the web from DNS," Conference: 1st Symposium on Networked Systems Design and Implementation (NSDI 2004), Mar. 29-31, 2004, San Francisco, California, USA, 14 pages.

Walker, I., "Best practices guide for residential HVAC Retrofits," Lawrence Berkeley National Lab. (LBNL), No. LBNL-53592, 31 pgs., Berkeley, CA (US) (Aug. 2003), 31 pages.

Wang et al., "DMND: Collecting Data from Mobiles Using Named Data," 2010 IEEE Vehicular Networking Conference, Jersey City, NJ, USA, pp. 49-56, DOI: 10.1109/VNC.2010.5698270 (2010), 8 pages.

Wang et al., "Hierarchical attribute-based encryption for fine-grained access control in cloud storage services," CCS'10: Proc. Of the 17th ACM Conference on Computer and Communications Security, pp. 735-737, DOI: 10.1145/1866307.1866414 (Oct. 2010), 3 pages.

Wang et al., "OSPFN: An OSPF Based Routing Protocol for Named Data Networking," NDN Technical Report NDN-0003, (2012), 15 pages.

Wetherall, D., "Active Network vision and reality: Lessons form a capsule-based system," 17th Symposium on Operating Systems Principles, pp. 64-79 (Dec. 1999), 16 pages.

Wolman et al., "On the scale and performance of cooperative web proxy caching," ACM SIGHOPS Operating Systems Review, vol. 33, No. 5, pp. 16-31, (Dec. 1999), 16 pages.

Wood, B., "Content Mediator Architecture for Content-aware Networks (COMET) Project," [online] Retrieved from URL: http://www.comet-project.org/ on Mar. 9, 2015, 1 page.

Wood et al., "Flexible end-to-end content security in CCN," 2014 IEEE 11th Consumer Communications and Networking Conference (CCNC), Las Vegas, NV, USA, 2014, pp. 858-865, DOI: 10.1109/CCNC.2014.6940528, 8 pages.

Xiong et al., "CloudSeal: End-to-End Content Protection in Cloud-based Storage and Delivery Services," In: Rajarajan et al. (eds) Security and Privacy in Communication Networks, SecureComm 2011, Lecture Notes of the Institute for Computer Sciences, Social Informatics and Telecommunications Engineering, vol. 96, Springer, Berlin, Heidelberg, DOI: 10.1007/978-3-642-31909-9_30 (2012), 10 pages.

Xylomenos et al., "A survey of information-centric networking research," IEEE Communications Surveys & Tutorials, vol. 16, No. 2, pp. 1024-1049, Second Quarter 2014, DOI: 10.1109/SURV.2013.070813.00063 (Jul. 2013), 26 pages.

Yu et al., "Achieving secure, scalable, and fine-grained data access control in cloud computing," 2010 Proceedings IEEE INFOCOM, San Diego, CA, USA, pp. 1-9 (2010), 9 pages.

Yi et al., "Adaptive forwarding in named data networking," ACM SIGCOMM Computer Communication Review, vol. 42, iss. 3, pp. 62-67 (2012), 6 pages.

Yi et al., "On the Role of Routing in Named Data Networking," NDN Technical Report NEN-0016 (2013), 10 pages.

Yi et al., "A case for stateful forwarding plane," Computer Communications, vol. 36, iss. 7, pp. 779-791 (2013), 14 pages.

Zahariadis et al., "Trust management in wireless sensor networks," European Transactions on Telecommunications, 21(4), pp. 386-395, DOI: 10.1002/ett.1413 (2010), 10 pages.

Zhang et al., "Named data networking," ACM SIGCOMM Computer Communication Review, vol. 44, iss. 3, pp. 66-73 (2014), 8 pages.

Zhang, et al., "Named Data Networking (NDN) Project", http://www.parc.com/publication/2709/named-data-networking-ndn-project.html, NDN-0001, PARC Tech Report (Oct. 2010), 26 pages.

Zhou et al., "Achieving secure role-based access control on encrypted data in cloud storage," IEEE Transactions on Information Forensics and Security, vol. 8, No. 12, pp. 1947-1960 (Dec. 2013), 14 pgs.

Zhuang et al., "Managing Ad Hoc Networks of Smartphones," International Journal of Information and Education Technology, vol. 3, No. 5, (Oct. 2013), 7 pages.

"Final Written Decision," *Snap Inc. v. Palo Alto Research Center LLC*, IPR2021-00986 of U.S. Pat. No. 9,208,439, Paper: 54, 68 pages. (2023).

"Final Written Decision," *Snap Inc. v. Palo Alto Research Center LLC*, IPR2021-00987 of U.S. Pat. No. 8,489,599; *Facebook Inc. v. Palo Alto Research Center LLC*, IPR2021-01294 of U.S. Pat. No. 8,489,599; and *Twitter Inc. v. Palo Alto Research Center LLC*, IPR2021-01458 of U.S. Pat. No. 8,489,599, Paper: 54, 165 pages. (2023).

"Final Written Decision," *Facebook Inc. v. Palo Alto Research Center LLC*, IPR2021-01264 of U.S. Pat. No. 7,043,475, Paper: 37, 60 pages. (2023).

"Final Written Decision," *Snap Inc. v. Palo Alto Research Center LLC*, IPR2021-00987 of U.S. Pat. No. 8,489,599; *Facebook Inc. v. Palo Alto Research Center LLC*, IPR2021-01294 of U.S. Pat. No. 8,489,599; and *Twitter Inc. v. Palo Alto Research Center LLC*, IPR2021-01458 of U.S. Pat. No. 8,489,599, Paper: 48, 165 pages. (2023).

"Final Written Decision," *Twitter Inc. v. Palo Alto Research Center LLC*, IPR2021-01398 of U.S. Pat. No. 7,043,475, Paper: 47, 93 pages. (2023).

"Final Written Decision," *Twitter Inc. v. Palo Alto Research Center LLC*, IPR2021-01430 of U.S. Pat. No. 9,208,439, Paper: 53, 62 pages. (2023).

"Final Written Decision," *Facebook Inc. v. Palo Alto Research Center LLC*, IPR2021-01434 of U.S. Pat. No. 8,732,584, Paper: 37, 38 pages. (2023).

"Final Written Decision," *Facebook Inc. v. Palo Alto Research Center LLC*, IPR2021-01461 of U.S. Pat. No. 9,208,439, Paper: 41, 65 pages. (2023).

"Final Written Decision," *Facebook Inc. v. Palo Alto Research Center LLC*, IPR2021-01467 of U.S. Pat. No. 8,606,781, Paper: 37, 46 pages. (2023).

"Final Written Decision," *Facebook Inc. v. Palo Alto Research Center LLC*, IPR2021-01472 of U.S. Pat. No. 9,137,190, Paper: 33, 52 pages. (2023).

Gephi 0.9.1 Release (Feb. 14, 2016), Github, URL:https://github.com/gephi/gephi/releases/tag/v0.9.1 (Year: 2016), 4 pages.

Gephi requirements, Dec. 8, 2015, Gephi.org, URL: https://web.archive.org/web/20151208052328/http://gephi.org:80/users/requirements/ (Year: 2015), 1 page.

Screenshots from Gephi 0.9.1 (May 9, 2023), 5 pages.

Heymann, S., "Gephi blog: GSoC mid-term: new visualization in API," Wordpress.com, URL: https://gephi.wordpress.com/2011/08/12gsoc-mid-term-new-visualization-api/ (Year: 2011), 6 pages.

Sauri et al., "TimeML Annotation Guidelines," Version 1.2.1, dated Jan. 31, 2006. Available at http://www.timeml.org/site/ , pp. 1-71.

Hristova et al., "Ad-me: Wireless Advertising Adapted to the User Location, Device and Emotions," 2204 [Online Downloaded Nov. 26, 2024 https://ieeeexplore.org/stamp/stamp.jsp?arnumber=1265673.

Stopher et al., "Processing GPS Data from Travel Surveys" 2005 [Online] Downloaded Nov. 26, 24 https://australasiantransportresearchforum.org.au/wp-content/uploads/2022/03/2005_Stopher_Jiang_FitzGerald.pdf.

Dongshan Xing "Efficient data mining for web navigation patterns"; 2002; Elsevier; pp. 55-63.

Zheng et al., "Mining Interesting Locations and Travel Sequences from GPS Trajectories" Apr. 24, 2009 [Online] Downloaded Nov. 26, 2024 https://dl.acm.org/doi/pdf/10.1145/1526816.

Awadallah Supporting Complex Search Tasks; ACM, pp. 829-838 (year 2014).

(56) References Cited

OTHER PUBLICATIONS

Lee et al., Context-Aware Recommendations on the Mobile Web. On the Move Meaningful Internet Systems 2005; OTM Workshops, 2005, pi 42-151 (Year 2005).
Shaban, Khaled, A Semantic Graph Model for Text Representation and Matching in Document Mining, 2006, A thesis presented to the University of Waterloo in fullfillment of the thesis requirement for the degree of Doctor of Philosophy in Electrical and Computer Engineering, Waterloo, Ontario, Canada, 2206, 1-140.
Francisco Claude; Fast and Compact Web Graph Representation; 2010; ACM; pp. 1-31.
mbastian. Gephi 0.9.1 Release Notes. Feb. 14, 2016. Github. < https://github.com/gephi/gephi/releases/tag/v0.9.1 > (Year: 2016).
Gephi 0.9.1 Requirements. 12/8/2015. Gephi.org. <https://web.archive.org/web/20151208052328/http://gephi.org:80/users/requirements/> (Year: 2015).
Screenshots from Gephi 0.9.1. Taken May 9, 2023. 1 (Year: 2023).
Heymann, Sebastien. "GSoC mid-term: new Visualization API". Feb. 25, 2015. Gephi blog. <https://gephi.wordpress.com/2011/08/12/ gsoc-mid-term-new-visualization-api/> (Year: 2015).
mbastion. "Edge weight range filter that also hides nodes". forum-gephi.org. Jul. 3, 20113 <https://forum-gephi.org/viewtopic.php?f=30&t=1174> (Year: 2011).
Morris, Scooter. "Edge weight range filter that also hides nodes". groups.google.com. Oct. 24, 2014. <https://groups.google.com/g/cytoscape-helpdesk/c/17kGmj IsAa E> (Year: 2014).

\* cited by examiner

COMPUTER-IMPLEMENTED SYSTEM AND METHOD FOR PREDICTING ACTIVITY OUTCOME

CROSS-REFERENCE TO RELATED APPLICATION

This application is a continuation of U.S. patent application Ser. No. 15/203,740, filed on Jul. 6, 2016, pending, the priority date of which is claimed and the disclosure of which is incorporated by reference.

FIELD

This application relates in general to monitoring context, and in particular to a computer-implemented system and method for predicting activity outcome based on user attention.

BACKGROUND

Often times, during the servicing or maintenance of a machine, a service provider may run into a problem with which he is not familiar and may require assistance to solve. In this type of situation, the service provider may need to consult an instruction manual, look for advice via the Internet, or call a different service provider to complete the servicing. Unfortunately, such actions require time and thus, increase the overall time for completing the servicing. The increased time for completion can result in a decrease in customer satisfaction and a potential loss of customers.

Preventing such unexpected problems is difficult because the service provider must first begin work on the object before a problem or need is encountered. For example, a cable repair technician is sent to a residence to fix a non-working Internet connection. However, the cable repair technician does not know what problems he will encounter until he attempts to repair the Internet connection. After attempting all known solutions and the Internet connection remains non-working, the repair technician may need additional help. Alternatively, the repair technician can identify the problem, but does not know how to fix the problem.

Existing technologies, such as machine understanding of human attention, fail to adequately address challenges of anticipating and preventing unexpected delay during service provisioning. Specifically, current means for machine understanding focuses on interaction with documents, gaze detection using cameras to observe a user's eye, or video analysis, which attempts to predict the probability of particular features of a video stream being the subject of a viewer's attention.

Therefore, there is a need for an approach to anticipating a need of a user during performance of a service and providing relevant recommendations or advice to fulfil the need to ensure that the service is successfully and timely completed. Preferably, any need of the user is identified by predicting an outcome of the service based on a subject of focus by the user during the service provisioning.

SUMMARY

To ensure that a service is timely completed, unexpected problems and need for assistance can be predicted based on an identified activity being performed by a service provider and a subject of focus by the service provider during the activity. Specifically, upon identifying the performed activity, a connection between the service provider and a remote expert is made such that the remote expert can provide assistance to the service provider. During this connection, actions of the service provider are monitored to determine the service provider's subject of focus. Based on the determined focus subject, an outcome for completion of the service is determined and assistance, if necessary, can be provided to the service provider based on the predicted outcome.

An embodiment provides a computer-implemented system and method for predicting activity outcome. A set of outcome models is maintained. Contextual data of a user is collected via one or more computing devices associated with the user. An activity being performed by the user is determined based on the contextual data. The activity is compared to a set of outcome models. A predication is made that the activity will not be successfully completed by the user without assistance based on the comparison. The user is provided with one or more tasks for completion of the activity.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

While performing a service for a customer, a service provider may run into unexpected problems or require assistance to complete the servicing. However, such problems or unexpected need for assistance increase the time for completing the service. The increased time for completion may then cause customer dissatisfaction and a potential loss of customers. To ensure that servicing is timely completed despite any unforeseen complications, an action being performed by the service provider during servicing is identified and a subject of focus of the service provider is determined. Subsequently, a prediction is made as to whether or not the service will be successfully completed. If an unsuccessful prediction is made, assistance can be provided to the service provider to facilitate successful completion. Alternatively, even if the prediction is for a successful outcome, recommendations can be made to expedite the servicing or perform additional servicing in an attempt to increase customer satisfaction.

Figure 1:
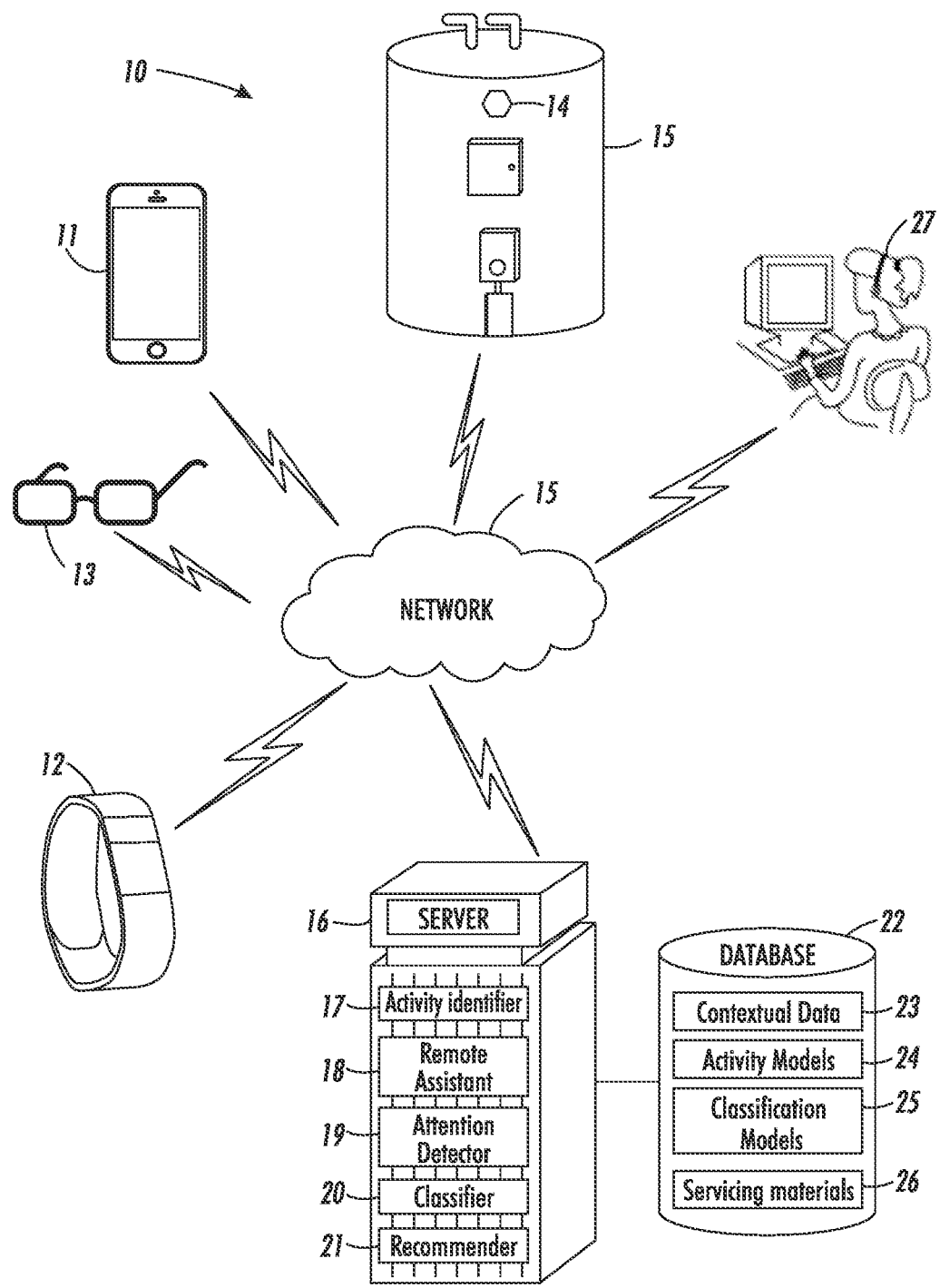
FIG. 1 is a block diagram showing a computer-implemented system for predicting activity outcome based on user attention, in accordance with one embodiment.

Determining whether a service will be successfully completed and providing necessary assistance to the service provider can maintain or reduce the amount of time needed to complete the service, which may eventually increase clientele. FIG. 1 is a block diagram showing a computer-implemented system 10 for predicting activity outcome based on user attention, in accordance with one embodiment. A customer (not shown) submits a request for a service. The service can be dependent on the type of company to which the request is submitted, such as repair companies, cable companies, cell phone companies, ride-sharing businesses, and stores, as well as other businesses, and can include, inter alia, requests for machine repair and cable installation. Once received, the service request is assigned to a service provider for attention and completion.

The service provider or user, to whom the request is assigned, can be associated with one or more mobile computing devices, including a smartphone 11, a smart watch 12, and a head-mounted computing device 13, such as Google Glass manufactured by Google Inc. Hereinafter, the terms "service provider" and "user" are used interchangeably with the same intended meaning, unless otherwise indicated. Using one or more of the mobile computing devices, the service provider can access an application for activity determination and outcome prediction prior to performing the service associated with the request. During servicing, each of the computing devices can collect contextual data 23 for the service provider, including one or more of location, acceleration, movement tracking, inventory, and other types of data related to the user's current surroundings. The contextual data 23 can be collected via sensors, such as an accelerometer or GPS, within the computing devices, as well as cameras, video recorders, and voice recorders.

Once collected, the contextual data 23 can be separately transmitted from each of the computing devices 11-13 to a server 16 for storing in a database 22 interconnected to the server 16. The server 16 includes an activity identifier 17, a remote assistant 18, an attention detector 19, a classifier 20, and a recommender 21. The activity identifier 17 accesses the contextual data 23 to identify one or more activities of the user currently being performed during the servicing. In one embodiment, the activities can be identified using a combination of activity recognition and semantic modeling. Specifically, low level activities can be determined directly from the context data itself, while high level activities can be identified using activity models 24 based on one or more of the low level activities. Identifying activities is further described in detail with reference to FIG. 3. Once identified, the activities of the user can be stored in the database 22 in an activity log (not shown).

During the activity, helpful advice can be provided to the service provider, regardless of whether a need for assistance by the service provider is identified. The helpful advice can be provided as a recommendation by the recommender 21 or as remote assistance, which can be initiated via the remote assistant 18. For example, if a particular activity is being performed by the service provider for an unusually long amount of time, the service provider may need assistance to complete the activity. The recommendation can include servicing material 26, such as reference materials, training manuals, or step-by-step instructions, as well as helpful hints or tips, and examples, for completing the activity. The particular type of servicing material to be recommended can be based on the identified activity, as described in further detail in commonly-owned U.S. Patent Application Publication No. 2018/0012229, abandoned, the disclosure of which is incorporated by reference.

Further, assistance can also be provided to a service provider or other individuals by identifying and notifying a group of individuals qualified to assist, as described in further detail in commonly-owned U.S. Pat. No. 10,885,478, issued Jan. 5, 2021, the disclosure of which is incorporated by reference. For instance, a user is identified as performing protein purification in which a hazardous chemical is used. The user is continually monitored throughout the purification process and further activities of the user are identified, including the user spilling the hazardous chemical. Based on the spill action, a recommendation is provided to the user to leave the room without cleaning the spill since the user is not experienced in cleaning chemical spills. Further, a group of individuals with knowledge and experience regarding proper chemical cleaning are identified and notified of the spill. One or more of the individuals can offer to or be selected to clean the spill.

Meanwhile, remote assistance, which is provided via the remote assistant 18 of the server 16, allows users to receive real-time assistance from experts and perform known procedures for resolving problems step-by-step under guidance of the expert. For instance, a need by the service provider is identified and an expert or other individual 27 with expertise in handling matters related to the need of the service provider is selected for connecting with the service provider. The connection can include an audio and video connection, such that the expert is able to obtain an understanding of the service provider's surroundings, including a view comparable to the service providers.

During the remote assistance, the computing devices 11-13 monitor the actions of the service provider and collect further contextual data 23 to determine outcome features. Using the outcome features, the attention detector 19 can determine a subject of focus of the service provider while performing the identified activity. In one embodiment, the outcome features include a distance of the service provider from a particular object 15 that is associated with a Bluetooth beacon 14, as well as a visual focus on an aspect of an object, person, or piece of content.

Subsequently, the classifier 20 utilizes the activity and subject of focus to provide a predicted outcome of the activity being performed by the user. Specifically, the classifier 20 uses outcome models 25 stored in the database 22 to classify whether the activity performed by service provider will be successfully completed based on the service provider's subject of focus. Based on the predicted outcome, the recommender 21 may provide a recommendation for completing the activity. For instance, the recommendation can include advice, as well as servicing materials 26, such as articles, manuals, training material, and step-by-step guidelines. Other types of information for providing with the recommendation are possible. The servicing material 26 can be stored in and accessed from the database 22. In a further embodiment, the recommendation can be provided to the expert for discussing with or instructing the service provider for successful completion of the activity during remote access.

The mobile computing devices 11-13 and server 16 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
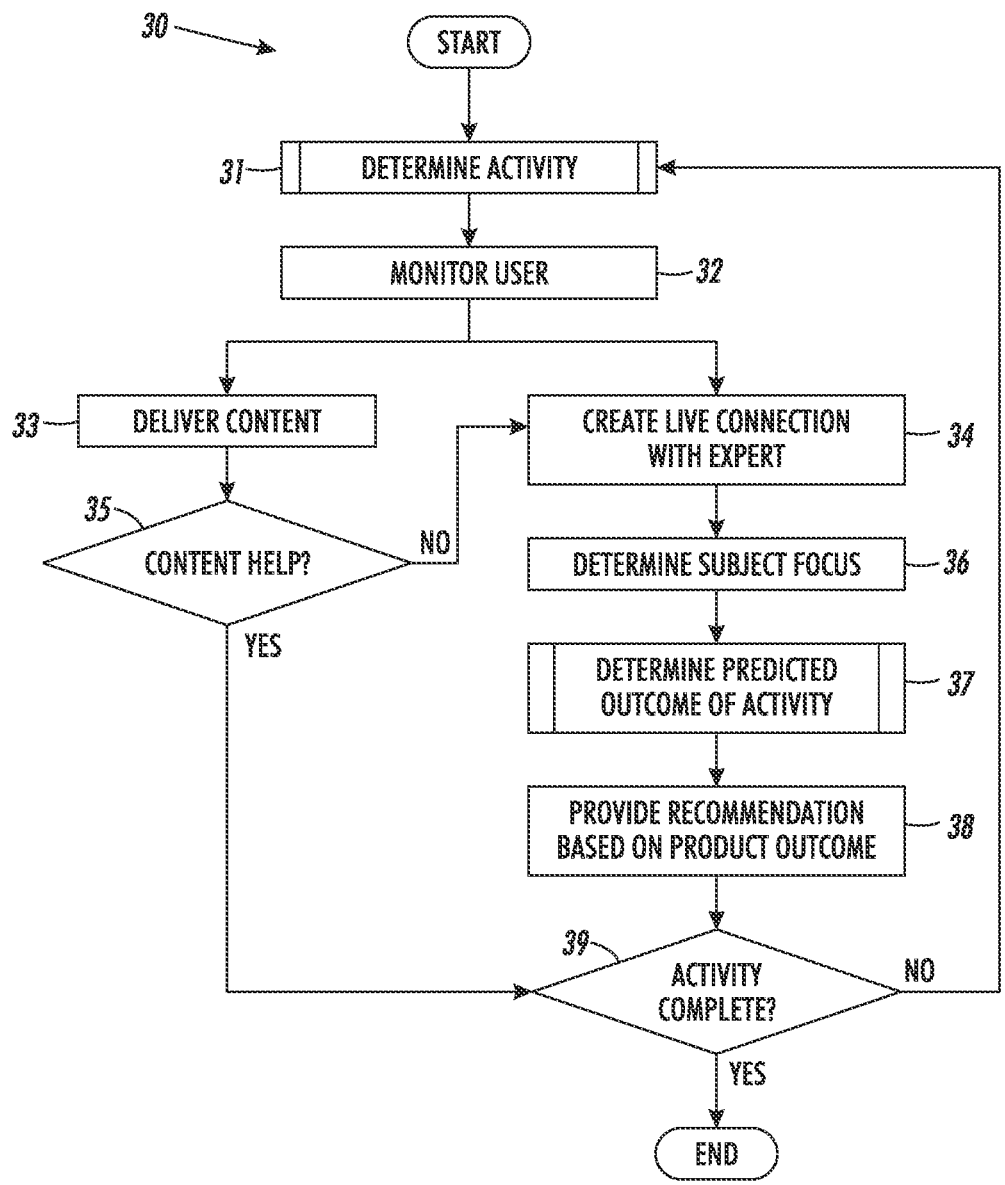
FIG. 2 is a flow diagram showing a computer-implemented method for predicting activity outcome based on user attention, in accordance with one embodiment.

Determining a subject of focus for a service provider can provide valuable knowledge regarding an outcome of an activity, which can be used to increase productivity of a company and customer satisfaction. FIG. 2 is a flow diagram showing a computer-implemented method 30 for predicting activity outcome based on user attention, in accordance with one embodiment. An activity being performed by a service provider during a servicing job is determined (block 31) and monitoring of the service provider commences (block 32). In one example, a customer of a cable company submits a service request for cable installation. The request is assigned to a service provider for completion and the service provider enters the customer's house to perform the installation. During the installation, an activity being performed by the service provider is determined, such as connecting a cable box to a newly installed jack.

Based on the activity, servicing materials can be delivered (block 33) to the service provider to assist with the cable box connection or alternatively, remote assistance can be performed (block 34) by the connecting the service provider with an expert for live assistance. If servicing material is sent to the service provider, a determination (block 35) is made as to whether the servicing material is helpful to the service provider or whether the service provider requires additional assistance. If the servicing material is helpful, and no further assistance is necessary, a determination (block 39) is made as to whether the activity has been completed and if so, no further monitoring of the service provider is required for that particular activity, but monitoring may continue until the service is completed. However, if the activity has not been completed, further monitoring of the service provider is performed (block 32).

When the service provider requires further assistance, in addition to the servicing material, or in lieu of the servicing material, remote assistance can be initiated (block 34) to connect the service provider with a live expert or individual with knowledge or expertise with the activity or need of the service provider. During remote assistance, contextual data of the service provider is obtained and used to determine a subject of focus (block 36). Subsequently, an outcome of the activity performed by the service provider can be predicted (block 37). The outcome can include a positive outcome, neutral outcome, or negative outcome with respect to completion of the activity. Making a prediction regarding activity completion is further described below with reference to FIG. 4.

Based on the predicted outcome, a relevant recommendation can be identified and provided (block 38) to the service provider to ensure that the service provider successfully completes the activity. The recommendation can include servicing material, such as reference materials, training manuals, or step-by-step instructions, as well as helpful hints or tips, and examples. The recommendation can be selected based on the activity being performed, the subject of focus of the service provider, and the predicted outcome of the activity. Finally, a determination (block 39) is made as to whether the activity has been successfully completed. If so, then the process ends and no further monitoring of the service provider is required since the service requested has been fulfilled. However, if further activities remain, the next activity is determined (block 31).

Returning to the above example regarding cable installation, the service provider is determined to be connecting the new cable box to the jack. The service provider is connected with a live expert who can see what the service provider is looking at while communicating verbally with the service provider. Contextual data of the service provider is collected during the interaction and used to determine one or more outcome factors for predicting whether the cable box will be properly connected to the jack. Subsequently, a recommendation can be provided to further assist the service provider with the connection when the outcome is unsuccessful, such as by step-to-step instructions, a video showing a cable box connection, or an example. However, if the outcome is predicted to be successful, the recommendation can include a request that the service provider perform an additional activity to please the customer or a reminder for the service provider to set the settings for the cable box.

Figure 3:
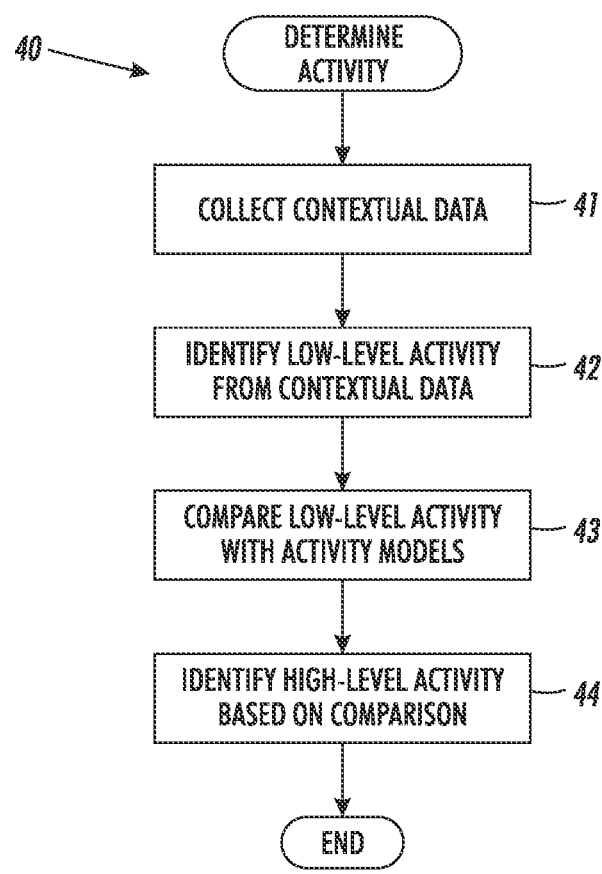
FIG. 3 is a flow diagram showing, by way of example, a process for determining a user activity.

To determine an outcome of an activity, the activity must first be identified. Monitoring and determining a user's activities helps anticipate a need of the user in real-time for providing relevant assistance and resolution, as described in commonly-owned U.S. Patent Application Publication No. 2018/0012229, abandoned, the disclosure of which is incorporated by reference. Identifying such activities can be performed based on data collected about the user's surroundings. FIG. 3 is a flow diagram showing, by way of example, a process 40 for determining a user activity. Contextual data is collected (block 41) from sensors encompassed by mobile computing devices associated with the user. The mobile devices can include one or more of a smart phone, smart watch, and head-mounted computing device, as well as other types of mobile computing devices. Each of the mobile devices can include multiple sensors to measure contextual data, including speed, location, acceleration, physical movement, eye gaze, object presence, inventory, scenery, and traffic. Further, video, photo, and audio data can be collected using a video recorder, camera, and audio recorder, respectively.

One or more low-level activities being performed by the user can be identified (block 42) directly from the contextual data. Each low-level activity describes a raw action being performed by the user. For instance, if an accelerometer provides a reading of zero, then the user is determined to be still, and not accelerating or moving to a different location. However, a different sensor may identify movement of the user's finger by the pressing of a button on one of the mobile devices. The low-level activities are then compared (block 43) with a set of activity models to determine (block 44) a high-level activity of the model. A high-level activity describes a specific action being performed by the user based on the raw actions detected. For instance, returning to the example above, the user is determined to be still, but moving a finger with respect to the mobile device button selection, which may indicate some sort of work being conducted on the mobile device. Combined with data for tracking computer use, the user activity is determined to be pressing send on an email.

In one embodiment, each high-level activity can be stored as a model that includes one or more raw actions, or low-level activities, to identify that specific high-level activity. Those models that most closely resemble the detected raw actions of the user are identified and selected as the high-level activity identified as being performed by the user. Each activity model can be focused on the specific user based on actions performed by that user over time, as well as on background information regarding the user's job title and skill set. Alternatively, the activity models can be based on a population of users with the same or similar job titles and skills as the user. In one embodiment, the low-level activities can each be detected by the mobile devices associated with the user, while the high-level activities can be determined by a remote server using the activity models.

In a further embodiment, distributed activity detection can be used to identify activities performed by the user. Distributed activity detection helps offset some of the processing typically required by a server and can result in faster and more accurate identification of an activity using high frequency data. First, contextual data is collected for a user via one or more mobile computing devices. Features are extracted from the data to generate a feature vector. The feature vector is then compared with one or more activity models stored on at least one of the mobile computing devices and a similarity measure is determined for each model. If one of the models satisfies a predefined amount of similarity to the feature vector, an identification label for the activity associated with that model is assigned to the feature vector. However, if none of the models satisfy the similarity, the user is requested to assign an activity label to the activity represented by the feature vector and the activity label is transmitted to a server with the feature vector for training a new model. Once trained, the server transmits the new model to the mobile computing device for running. Distributed activity detection is described in further detail in commonly-owned U.S. Patent Application Publication No. 2018/0013843, pending, the disclosure of which is incorporated by reference.

Figure 4:
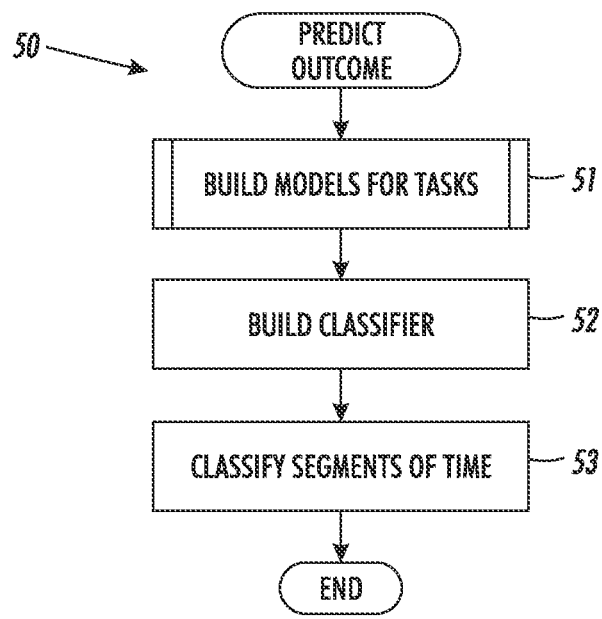
FIG. 4 is a flow diagram showing, by way of example, a process for predicting the outcome of a user activity.

Upon determining an activity of the service provider, an outcome of that activity can be determined based on a subject of focus of the service provider during the activity. FIG. 4 is a flow diagram showing, by way of example, a process 50 for predicting the outcome of a user activity. One or more outcome models are built (block 51) for each different type of activity. Each outcome model can include a name of the activity represented along with a list of outcome features, which can be determined from the contextual data collected via one or more mobile computing devices associated with the service provider. The outcome features can include a distance from a user to a known object, a visual focus on an aspect of an object, a visual focus on a person, a focus on a piece of content, the current activity, an average time to complete the activity, and a rating for an outcome of the activity based on the other outcome features.

The distance of a service provider from a known object can be identified using Bluetooth beacons. For example, a Bluetooth beacon can be placed on one or more pieces of equipment or machinery, such as a hot water heater for installation. When the service provider, who is associated with at least one mobile computing device with Bluetooth capability, enters a particular range of the Bluetooth beacon on the hot water heater, the computing device can determine that the service provider is in immediate proximity to the hot water heater. The visual focus of an aspect of the object can be identified using a camera on at least one of the mobile computing device associated with the service provider, such as a mobile headset or smart glasses. Video data or photographs captured by the camera can be used to identify an object at which the service provider is looking or focusing on. For instance, video data collected from a pair of smart glasses worn by the service provider identify that the service provider is looking at a front panel of the hot water heater.

Additionally, the visual focus of a person by the service provider can also be determined using video data, photographs, or audio data to determine whether the service provider is speaking to and facing another person with whom a conversation is occurring. Further, a service provider's focus on a piece of content, such as a step within the activity or other procedure, can be determined using a combination of data, such as video data photographs, audio data, and at least one procedure outline, which can include training guidelines, step-by-step instructions, or a list of activities to be performed for the activity.

Figure 5:
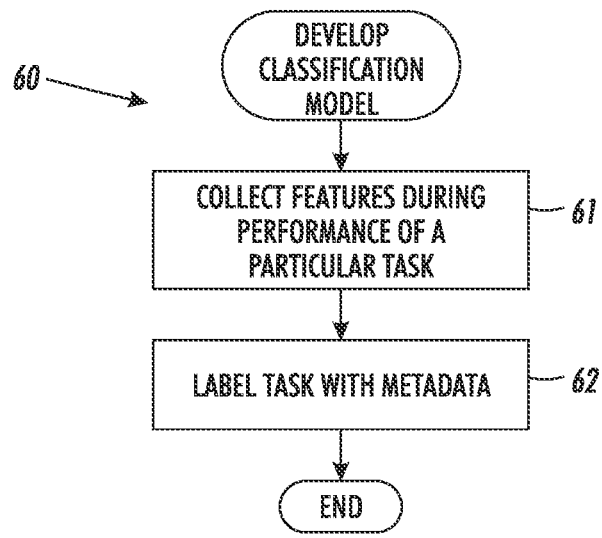
FIG. 5 is a flow diagram showing, by way of example, a process for developing an outcome classification model.

The outcome models can each be generated from the data collected for the outcome features. FIG. 5 is a flow diagram showing, by way of example, a process 60 for developing an outcome classification model. Data for one or more outcome features are collected (block 61) during a time period in which a user is performing a known activity. The outcome features include a distance from a user to a known object, a visual focus on an aspect of an object, a visual focus on a person, a focus on a piece of content, and the current activity. However, other outcome features are possible. Domain experts then label (block 62) the features from the time period with a name of the activity being performed while the features were collected, an average time to complete the activity being performed, and a rating for an outcome of the activity. The outcome rating can include successfully completed or not completed, as well as a range of values with one end of the range highly successful and the other end, not successful. The models can then be used to help identify qualities and techniques of the most effective service providers and those techniques can be used to help other service providers to become effective, such as via a recommendation.

Returning to the discussion with respect to FIG. 4, once the models have been generated, a classifier is built (block 52) based on the models. The classifier then classifies (block 53) activities with a predicted outcome for completion. For example, standard installation of a hot water heater takes on average 2.5 hours to complete. The service provider performing the installation is equipped with an installation guideline, which briefly lists steps of activities to be performed during the installation. Specifically, the guideline includes three main steps: remove the old hot water heater, position the new heater in place, and connect the new heater. Under each of the three main steps are sub-steps. Removing the old hot water heater includes disconnecting a power source to the old hot water heater, draining a tank of the old hot water heater, disconnecting water supply lines to the old heater, and physical removal of the old heater. Positioning the new heater in place includes bringing the new heater to the correct location, removing the new heater from the packing, if any, and maneuvering the new heater into the proper location. Finally, connecting the new heater includes connecting the new heater to the water supply lines and connecting the new heater to the power supply source, and adjusting the settings on the new heater.

Based on the data collected from the mobile computing devices associated with the service provider, the service provider is determined to be performing the step of disconnecting of the water supply lines to the old heater. Based on the outcome model for installing a hot water heater, five minutes of visual focus on the water supply wires is associated with a successful outcome. However, if a service provider receives a telephone call and steps away from the water supply wires prior to the completion of the five minutes, a distraction can be detected that they lead to an unsuccessful outcome. In one embodiment, a recommendation, such as a reminder to focus on the water supply wires, can be sent to the service provider. Conversely, focus of the service provider on a particular part of the new hot water heater during installation, such as the drain valve, can be associated with unsuccessful performance of the installation since the drain valve is not generally relevant to actual installation of the heater.

In a further embodiment, the outcome model can represent the action of disconnecting the water lines and an outcome of the action could be predicted based on the outcome features determined. Each time the service provider performs another step of the installation, a new outcome model can be applied and the outcome of the installation activity can be revised.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for predicting activity outcome and generating recommended tasks during service delivery, comprising:
    a database to store a set of outcome models; and
    a server comprising a central processing unit, memory, an input port to receive one or more of the outcome models from the database, and an output port, the central processing unit configured to perform the following steps:
        measure physical features associated with a user while the user is performing an activity in a physical environment, including receiving contextual data of the user in relation to the physical environment from each of one or more mobile computing devices associated with the user and each of one or more beacons arranged in the physical environment, and analyzing the contextual data to determine a distance of the user from a known object and determine a visual focus of the user on one or more of: an object in the physical environment or a person in the physical environment;
        identify an activity being performed by the user based on the measured physical features, wherein the central processing unit determines a subject of focus of the user based on at least the distance of the user from the known object and the visual focus of the user;
        generate, using a classifier built using the set of outcome models, a predicted outcome for completion of the activity by providing the activity, the measured physical features, and the subject of focus of the user as input to the classifier, wherein the classifier identifies one of the outcome models associated with the activity by comparing a feature vector generated from the measured physical feature to the set of outcome models based upon a similarity measure and applies the identified outcome model to the subject of focus of the user to generate the predicted outcome;
        predict that the activity will not be successfully completed by the user without assistance based on the predicted outcome; and
        provide the user with one or more tasks for completion of the activity via at least one of the one or more computing devices associated with the user.

2. A system according to claim 1, wherein the central processing unit identifies one or more individuals qualified to assist the user with one of the tasks or the activity.

3. A system according to claim 2, wherein the central processing unit notifies the identified individuals regarding providing assistance to the user.

4. A system according to claim 2, wherein the central processing unit connects at least one of the identified individuals with the user.

5. A system according to claim 1, wherein the central processing unit provides the user with one or more resources to complete at least one of the tasks.

6. A system according to claim 1, wherein each resource comprises one of articles, manuals, training material, and step-by-step guidelines.

7. A system according to claim 1, wherein each outcome model comprises an identity of an activity and one or more outcome features.

8. A system according to claim 7, wherein each outcome feature can be determined based on the contextual data.

9. A system according to claim 1, wherein each outcome feature is associated with an indication of success of activity completion.

10. The system according to claim 1, wherein providing the user with one or more tasks for completion of the activity comprises:
    generating visual indicia that identifies an object in the physical environment and directs the user to perform the one or more tasks on the identified object; and
    transmitting the visual indicia to one of the mobile computing devices associated with the user for display.

11. A computer-implemented method for predicting activity outcome and generating recommended tasks during service delivery, comprising:
    maintaining a set of outcome models;
    measuring physical features associated with a user while the user is performing an activity in a physical environment, including receiving contextual data of the user in relation to the physical environment from each of one or more mobile computing devices associated with the user and each of one or more beacons arranged in the physical environment, and analyzing the contextual data to determine a distance of the user from a known object and determine a visual focus of the user on one or more of: an object in the physical environment or a person in the physical environment;
    identifying an activity being performed by the user based on the measured physical features;
    determining a subject of focus of the user based on at least the distance of the user from the known object and the visual focus of the user;
    generating, using a classifier built using the set of outcome models, a predicted outcome for completion of the activity by providing the activity, the measured physical features, and the subject of focus of the user as input to the classifier, wherein the classifier identifies one of the outcome models associated with the activity by comparing a feature vector generated from the measured physical feature to the set of outcome models based upon a similarity measure and applies the identified outcome model to the subject of focus of the user to generate the predicted outcome;

predicting that the activity will not be successfully completed by the user without assistance based on the predicted outcome; and providing the user with one or more tasks for completion of the activity via at least one of the one or more computing devices associated with the user.

12. A method according to claim 11, further comprising: identifying one or more individuals qualified to assist the user with one of the tasks or the activity.

13. A method according to claim 12, further comprising: notifying the identified individuals regarding providing assistance to the user.

14. A method according to claim 12, further comprising: connecting at least one of the identified individuals regarding providing assistance to the user.

15. A method according to claim 11, further comprising: providing the user with one or more resources to complete at least one of the tasks.

16. A method according to claim 11, wherein each resource comprises one of articles, manuals, training material, and step-by-step guidelines.

17. A method according to claim 11, wherein each outcome model comprises an identity of an activity and one or more outcome features.

18. A method according to claim 17, wherein each outcome feature can be determined based on the contextual data.

19. A method according to claim 11, wherein each outcome feature is associated with an indication of success of activity completion.

20. The method according to claim 11, wherein providing the user with one or more tasks for completion of the activity comprises:

generating visual indicia that identifies an object in the physical environment and directs the user to perform the one or more tasks on the identified object; and transmitting the visual indicia to one of the mobile computing devices associated with the user for display.

* * * * *